(12) United States Patent
Walker et al.

(10) Patent No.: US 11,631,434 B2
(45) Date of Patent: *Apr. 18, 2023

(54) SELECTING AND PERFORMING OPERATIONS ON HIERARCHICAL CLUSTERS OF VIDEO SEGMENTS

(71) Applicant: ADOBE INC., San Jose, CA (US)

(72) Inventors: Seth Walker, Oakland, CA (US); Joy Oakyung Kim, Menlo Park, CA (US); Aseem Agarwala, Seattle, WA (US); Joel R. Brandt, Venice, CA (US); Jovan Popović, Seattle, WA (US); Lubomira Dontcheva, Seattle, WA (US); Dingzeyu Li, Seattle, WA (US); Hijung Shin, Arlington, MA (US); Xue Bai, Bellevue, WA (US)

(73) Assignee: Adobe Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/017,362

(22) Filed: Sep. 10, 2020

(65) Prior Publication Data

US 2022/0076705 A1 Mar. 10, 2022

(51) Int. Cl.
*G11B 27/034* (2006.01)
*G11B 27/34* (2006.01)
(Continued)

(52) U.S. Cl.
CPC .......... *G11B 27/034* (2013.01); *G06F 3/0485* (2013.01); *G06F 16/75* (2019.01);
(Continued)

(58) Field of Classification Search
CPC ....... G11B 27/034; G11B 27/34; G06F 16/75; G06F 3/0485; G06F 16/783; G06K 9/00718; G06K 9/00765
See application file for complete search history.

(56) References Cited

U.S. PATENT DOCUMENTS 6,104,398 A    8/2000 Cox, Jr. et al.
6,400,378 B1   6/2002 Snook
(Continued)

OTHER PUBLICATIONS

Co-Pending U.S. Appl. No. 16/879,362, filed May 20, 2020.
(Continued)

*Primary Examiner* — Girumsew Wendmagegn
(74) *Attorney, Agent, or Firm* — Shook, Hardy & Bacon L.L.P.

(57) ABSTRACT

Embodiments are directed to techniques for interacting with a hierarchical video segmentation. In some embodiments, the finest level of the hierarchical segmentation identifies the smallest interaction unit of a video—semantically defined video segments of unequal duration called clip atoms. Each level of the hierarchical segmentation clusters the clip atoms with a corresponding degree of granularity into a corresponding set of video segments. A presented video timeline is segmented based on one of the levels, and one or more segments are selected through interactions with the video timeline (e.g., clicks, drags), by performing a metadata search, or through selection of corresponding metadata segments from a metadata panel. Navigating to a different level of the hierarchy transforms the selection into corresponding coarser or finer video segments defined by the level. Any operation can be performed on selected video segments, including playing back, trimming, or editing.

20 Claims, 33 Drawing Sheets

(51) Int. Cl.
    *G06F 16/783* (2019.01)
    *G06F 3/0485* (2022.01)
    *G06F 16/75* (2019.01)
    *G06V 20/40* (2022.01)

(52) U.S. Cl.
    CPC ............ *G06F 16/783* (2019.01); *G06V 20/41* (2022.01); *G06V 20/49* (2022.01); *G11B 27/34* (2013.01)

(56) References Cited

U.S. PATENT DOCUMENTS

| | | | |
|---|---|---|---|
| 7,480,442 | B2 | 1/2009 | Girgensohn et al. |
| 7,796,857 | B2 | 9/2010 | Hiroi et al. |
| 7,805,678 | B1 | 9/2010 | Niles et al. |
| 8,290,345 | B2 | 10/2012 | Numoto |
| 8,306,402 | B2 | 11/2012 | Ishihara |
| 8,620,893 | B2 | 12/2013 | Howard et al. |
| 8,874,584 | B1 | 10/2014 | Chen et al. |
| 9,110,562 | B1 | 8/2015 | Eldawy |
| 9,583,140 | B1 | 2/2017 | Rady |
| 10,750,245 | B1 | 8/2020 | Zeiler et al. |
| 11,120,490 | B1 | 9/2021 | Pham et al. |
| 2002/0061136 | A1 | 5/2002 | Shibata et al. |
| 2002/0186234 | A1 | 12/2002 | Van De Streek et al. |
| 2003/0234805 | A1 | 12/2003 | Toyama et al. |
| 2004/0125124 | A1 | 7/2004 | Kim et al. |
| 2005/0203927 | A1 | 9/2005 | Sull et al. |
| 2006/0224983 | A1 | 10/2006 | Albrecht et al. |
| 2007/0022159 | A1 | 1/2007 | Zhu et al. |
| 2007/0025614 | A1 | 2/2007 | Qian |
| 2007/0044010 | A1* | 2/2007 | Sull .................. G06F 16/71 709/201 |
| 2007/0106693 | A1 | 5/2007 | Houh et al. |
| 2008/0215552 | A1 | 9/2008 | Safoutin |
| 2009/0231271 | A1 | 9/2009 | Heubel et al. |
| 2010/0070483 | A1 | 3/2010 | Delgo et al. |
| 2010/0111417 | A1 | 5/2010 | Ward et al. |
| 2010/0281372 | A1 | 11/2010 | Lyons et al. |
| 2011/0307084 | A1 | 12/2011 | Gehring et al. |
| 2013/0027412 | A1 | 1/2013 | Roddy |
| 2013/0236162 | A1 | 9/2013 | Kim et al. |
| 2013/0294642 | A1 | 11/2013 | Wang et al. |
| 2014/0105571 | A1 | 4/2014 | Chang et al. |
| 2014/0173484 | A1 | 6/2014 | Hicks |
| 2014/0270708 | A1* | 9/2014 | Girgensohn ............. H04N 9/79 386/282 |
| 2014/0340204 | A1 | 11/2014 | O'Shea et al. |
| 2014/0358807 | A1 | 12/2014 | Chinnappan et al. |
| 2015/0005646 | A1 | 1/2015 | Balakrishnan et al. |
| 2015/0052465 | A1 | 2/2015 | Altin et al. |
| 2015/0370806 | A1 | 12/2015 | White et al. |
| 2018/0113579 | A1 | 4/2018 | Johnston et al. |
| 2020/0066305 | A1 | 2/2020 | Spence et al. |

OTHER PUBLICATIONS

Co-Pending U.S. Appl. No. 16/679,013, filed Nov. 8, 2019.
Alcázar, J.L., et al., "Active Speakers in Context," Proceedings of the IEEE/CVF Conference on Computer Vision and Pattern Recognition (CVPR), pp. 12465-12474 (2020).
Chinfat, "E15—The Tool Bar/The Selection Tool—Adobe Premiere Pro CC 2018," accessed at https://www.youtube.com/watch?v=IJRhzOqrMzA, p. 1 (May 8, 2018).
"Transient oscillation video matching," accessed at https://www.google.com/search?q=transient+oscillation+video+matching&hl=en&biw=1225&bih=675&tbm=pts&sxsrf=AOaemvJjtgRC6aa4ltvNUFxJa6 . . . , accessed on Dec. 2, 2021, pp. 2.
"Hierarchical Segmentation of video timeline and matching searh data," accessed https://www.google.com/search?q=hierarchical+segmentation+of+video+timeline+and+matching+search+data&hl=en&blw=1142&bih=547&tbm=pts&s . . . , accessed on Dec. 2, 2021, pp. 2.
Preinterview First Office Action dated Sep. 27, 2021 in U.S. Appl. No. 17/017,366, 5 pages.
Restriction Requirement dated Oct. 18, 2021 in U.S. Appl. No. 17/017,344, 5 pages.
Non-Final Office Action dated Nov. 9, 2021 in U.S. Appl. No. 17/017,344, 9 pages.
First Action Interview—Office Action dated Dec. 3, 2021 in U.S. Appl. No. 17/017,366, 4 pages.
Non-Final Office Action dated Dec. 7, 2021 in U.S. Appl. No. 17/017,370, 26 pages.
Final Office Action dated May 9, 2022 in U.S. Appl. No. 17/017,366, 14 pages.
Non-Final Office Action dated Jun. 2, 2022 in U.S. Appl. No. 17/330,689, 9 pages.
Final Office Action dated Feb. 28, 2022 in U.S. Appl. No. 17/017,370, 32 pages.
Notice of Allowance dated Mar. 23, 2022 in U.S. Appl. No. 17/017,344, 7 pages.
Notice of Allowance dated Apr. 6, 2022 in U.S. Appl. No. 17/330,667, 8 pages.
Corrected Notice of Allowability dated Apr. 25, 2022 in U.S. Appl. No. 17/017,344, 2 pages.
Restriction Requirement dated Apr. 26, 2022 in U.S. Appl. No. 17/330,689, 6 pages.
Notice of Allowance dated Jul. 13, 2022 in U.S. Appl. No. 17/017,366, 7 pages.
Non-Final Office Action dated Jul. 29, 2022 in U.S. Appl. No. 17/017,370, 37 pages.
Preinterview first office action dated Aug. 18, 2022 in U.S. Appl. No. 17/017,353, 5 pages.
Non-Final Office Action dated Sep. 29, 2022 in U.S. Appl. No. 17/330,677, 12 pages.
Non-Final Office Action dated Oct. 24, 2022 in U.S. Appl. No. 17/330,702, 9 pages.
Non-Final Office Action dated Oct. 24, 2022 in U.S. Appl. No. 17/330,718, 10 pages.
Non-Final Office Action dated Oct. 26, 2022 in U.S. Appl. No. 17/330,702, 8 pages.
Final Office Action dated Oct. 27, 2022 in U.S. Appl. No. 17/330,689, 8 pages.
First Action Interview Office Action dated Nov. 22, 2022 in U.S. Appl. No. 17/017,353, 4 pages.
Final Office Action dated Jan. 4, 2023 in U.S. Appl. No. 17/330,677, 12 pages.
"Apple, Final Cut Pro 7 User Guide", 2020, Retrieved from Internet URL: https://prohelp.apple.com/finalcutpro_helpr01/English/en/finalcutpro/usermanual/index.html#chapter=7%26section=1), pp. 11 (Year: 2010).
Notice of Allowance dated Feb. 8, 2023 in U.S. Appl. No. 17/017,366, 5 pages.
Non-Final Office Action dated Jan. 24, 2023 in U.S. Appl. No. 17/330,689, 13 pages.
Notice of Allowance dated Feb. 2, 2023 in U.S. Appl. No. 17/017,370, 6 pages.
Non-Final Office Action dated Feb. 16, 2023 in U.S. Appl. No. 17/969,536, 16 pages.

* cited by examiner

SELECTING AND PERFORMING OPERATIONS ON HIERARCHICAL CLUSTERS OF VIDEO SEGMENTS

BACKGROUND

Recent years have seen a proliferation in the use of video, which has applications in practically every industry from film and television to advertising and social media. Businesses and individuals routinely create and share video content in a variety of contexts, such as presentations, tutorials, commentary, news and sports segments, blogs, product reviews, testimonials, comedy, dance, music, movies, and video games, to name a few examples. Video can be captured using a camera, generated using animation or rendering tools, edited with various types of video editing software, and shared through a variety of outlets. Indeed, recent advancements in digital cameras, smartphones, social media, and other technologies have provided a number of new ways that make it easier for even novices to capture and share video. With these new ways to capture and share video comes an increasing demand for video editing features.

Conventionally, video editing involves selecting video frames and performing some type of action on the frames or associated audio. Some common operations include importing, trimming, cropping, rearranging, applying transitions and effects, adjusting color, adding titles and graphics, exporting, and others. Video editing software, such as ADOBE® PREMIERE® PRO and ADOBE PREMIERE ELEMENTS, typically includes a graphical user interface (GUI) that presents a video timeline that represents the video frames in the video and allows the user to select particular frames and the operations to perform on the frames. However, conventional video editing can be tedious, challenging, and even beyond the skill level of many users.

SUMMARY

Embodiments of the present invention are directed to segmentation and hierarchical clustering of video. In an example implementation, a video is ingested to generate a multi-level hierarchical segmentation of the video. In some embodiments, the finest level of the hierarchy consists of or otherwise identifies a smallest interaction unit of the video—semantically defined video segments of unequal duration called clip atoms. Clip atom boundaries are detected in various ways. For example, speech boundaries are detected from audio of the video, scene boundaries are detected from video frames of the video, and event boundaries are detected from a temporal log associated with the video (e.g., a software usage log generated while screen capturing or screencasting). The detected boundaries are used to define the clip atoms, which are hierarchically clustered to form a multi-level hierarchical representation of the video. In some cases, the hierarchical segmentation identifies a static, pre-computed, hierarchical set of video segments, where each level of the hierarchical segmentation identifies a complete set (i.e., covering the entire range of the video) of disjoint (i.e., non-overlapping) video segments with a corresponding amount of granularity. Hierarchical video segmentation enables new ways to create, edit, and consume video.

For example, some embodiments are directed to techniques for interacting with a hierarchical video segmentation using a video timeline. A presented video timeline can be segmented into selectable video segments defined by one of the levels of the hierarchical segmentation, and one or more video segments can be selected through interactions with the video timeline. For example, a click or tap on a video segment or a drag operation dragging along the timeline snaps selection boundaries to corresponding segment boundaries defined by the level. Navigating to a different level of the hierarchy transforms the selection into coarser or finer video segments defined by the level, enabling a refined selection of a desired portion of a video. Any operation can be performed on selected video segments, including playing back, trimming, or editing.

Some embodiments are directed to techniques for interacting with a hierarchical video segmentation using a metadata panel presenting a composite list of video metadata. Generally, various types of metadata can be extracted from a video, such as a transcript of audio of the video, keywords from the transcript, content or action tags visually extracted from video frames, and action tags extracted from an associated temporal log. A composite list of the extracted metadata can be segmented into selectable metadata segments at locations corresponding to boundaries of video segments defined by a particular level of the hierarchical segmentation. One or more metadata segments can be selected from the metadata panel in various ways, such as by clicking or tapping on a metadata segment, or an interaction element associated with the metadata segment. When a metadata segment is selected, a corresponding video segment is emphasized on the video timeline, a playback cursor is moved to the first video frame of the video segment, and the first video frame is presented. Navigating to a different level of the hierarchy updates the composite list into coarser or finer metadata segments corresponding to the boundaries defined by the level, enabling a refined selection of a desired portion of the extracted metadata and a corresponding portion of the video.

Some embodiments are directed to techniques for interacting with a hierarchical video segmentation by performing a metadata search. Generally, extracted metadata can be segmented into metadata segments and associated with corresponding video segments defined by a hierarchical video segmentation. As such, a metadata search can be performed to identify matching metadata segments and corresponding matching video segments defined by a particular level of the hierarchical segmentation. Matching metadata segments are emphasized in a composite list of the extracted metadata, and matching video segments are emphasized on the video timeline. Navigating to a different level of the hierarchy transforms the search results into corresponding coarser or finer segments defined by the level, enabling a refined selection of a desired portion of the video.

As such, hierarchical video segmentation enables new ways to create, edit, and consume video, and gives creators and consumers a more intuitive structure for interacting with video.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Overview

Figure 1:
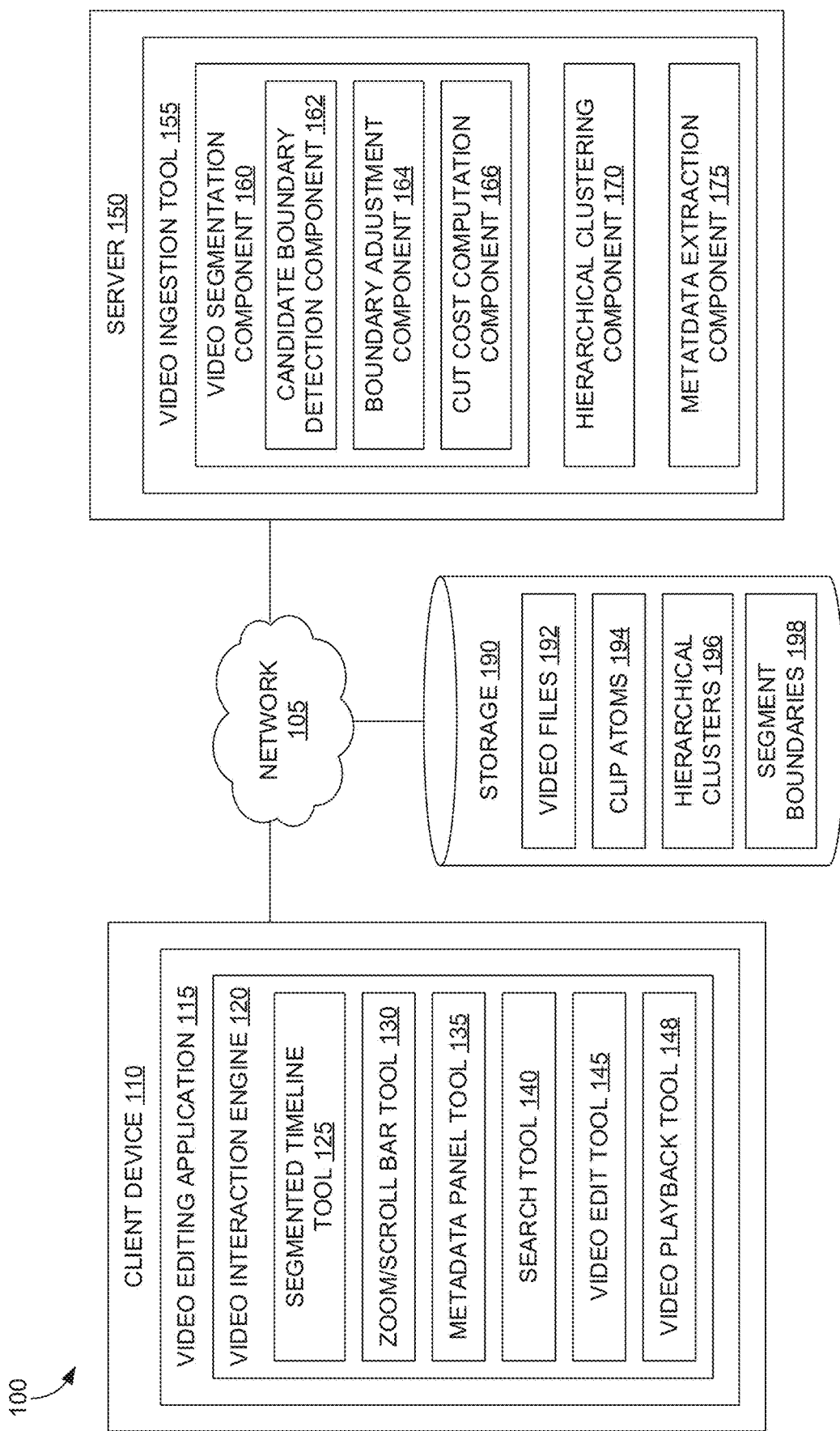
FIG. 1 is a block diagram of an example computing system for video editing or playback, in accordance with embodiments of the present invention.

A video file, clip, or project can usually be split up into visual and audio elements. For example, a video might encode or otherwise identify a video track comprising a sequence of still images (e.g., video frames) and an accompanying audio track comprising one or more audio signals. Conventionally, video editing tools provide an interface that lets users perform time-based editing on selected video frames. In other words, conventional video editing generally involves representing a video as a sequence of fixed units of equal duration (e.g., video frames) and presenting a video timeline that allows the user to select and interact with particular video frames. However, interaction modalities that rely on a selection of particular video frames or a corresponding time range are inherently slow and fine-grained, resulting in editing workflows that are often considered tedious, challenging, or even beyond the skill level of many users. In other words, time-based video editing that requires selecting particular video frames or time ranges provides an interaction modality with a fixed granularity, resulting in an inflexible and inefficient interface. As such, there is a need for an improved interface and improved interaction modalities for video editing tools.

Accordingly, embodiments of the present invention are directed to segmentation and hierarchical clustering of video, and various interaction modalities for video editing and playback based on hierarchical clusters of video segments. In an example implementation, a video is ingested to generate a multi-level hierarchical segmentation of the video. In some cases, the hierarchical segmentation identifies a static, pre-computed, hierarchical set of video segments, where each level of the hierarchical segmentation includes or otherwise identifies a complete set (i.e., covering the entire range of the video) of disjoint (i.e., non-overlapping) video segments. In some embodiments, the finest level of the hierarchy consists of or otherwise identifies a smallest interaction unit of the video—semantically defined video segments of unequal duration called clip atoms, and the clip atoms are hierarchically clustered to form a multi-level hierarchical representation of the video. Hierarchical video segmentation enables new ways to create, edit, and consume video. As explained in more detail below, it gives creators and consumers a more intuitive structure for interacting with video.

More specifically, hierarchical segmentation gives creators and consumers a new interaction modality that can be used to browse, edit, and playback videos. Depending on the implementation, a video is hierarchically segmented into hierarchical clusters of video segments (e.g., clip atoms), where the boundary locations for the video segments are determined based on the content of the video (e.g., the presence of speech, scene transitions, associated software events such as software tool events depicted in the video). Thus, in some embodiments, boundaries for video segments are placed at semantically meaningful parts of the video, and the hierarchical segmentation clusters the resulting video segments with multiple levels of granularity.

To interact with these hierarchical clusters, one or more interaction elements (e.g., a video timeline, zoom bar, scroll bar, metadata panel, search bar, clip detail tool for changing an active hierarchy level, and/or others) allow users to make a refined selection of video segments that snaps to semantically meaningful portions of the video with a desired level of granularity. For example, rather than simply providing a video timeline segmented by some fixed unit of equal duration (e.g., a frame, a second) in a manner that is divorced from semantic meaning, interactions with hierarchical clusters of semantic video segments provide a more flexible and efficient interaction modality and user interface, allowing users to quickly identify, select, and operate on portions of a video that are likely to be of interest. As such, editors can now work more quickly and consumers can now jump to the section of interest without having to watch the video.

Ingestion, Segmentation, and Hierarchical Clustering of Video

In an example high-level process, a video is ingested by segmenting the video into clip atoms, hierarchically clustering the clip atoms to form video segments, extracting metadata about the video, and associating the extracted metadata with corresponding video segments.

In some embodiments, a hierarchical segmentation of a video is generated by computing an over-segmentation of the video's timeline to identify boundaries for the clip atoms, and the clip atoms are hierarchically clustered to form the hierarchical segmentation. In an example implementation, an over-segmentation of the video timeline is computed by applying one or more detection techniques to detect candidate boundaries for clip atoms, applying one or more adjustment techniques to adjust the candidate boundaries to identify the clip atom boundaries, and generating or otherwise storing a representation of the clip atom boundaries and/or the corresponding clip atoms. In some embodiments, the clip atoms form the finest (lowest) level of the hierarchical segmentation, and higher levels are formed by merging clusters of consecutive clip atoms into larger video segments (corresponding to larger chunks on the timeline). In some embodiments, one or more cut costs are computed and assigned (e.g., as metadata) or otherwise associated with each boundary, a cost function is defined based on the cut costs for each boundary, and a line breaking, dynamic programming, or other segmentation algorithm is used to compute an optimal segmentation based on the cost function. The segmentation algorithm is repeatedly applied to successive levels of the hierarchy, clustering the video segments from a particular level into coarser and longer segments until reaching a desired top level, for example, when the entire timeline becomes a single chunk, until the number of video segments in a hierarchy level is smaller than some number (e.g., 10), or otherwise. The output is a multi-level hierarchical representation of the video.

In some embodiments, candidate boundaries for video segments (e.g., clip atoms) are detected using one or more detection techniques. In various embodiments, any number and combination of detection techniques are applied to identify speech boundaries (e.g., utterance boundaries, word boundaries, sentence boundaries), scene boundaries, event boundaries derived from software log events, and/or other types of boundaries.

For example, in some embodiments, any known speech-to-text algorithm is applied to an audio track associated with a video to generate a transcript of speech, detect speech segments (e.g., corresponding to words, sentences, utterances of continuous speech separated by audio gaps, etc.), detect non-speech segments (e.g., pauses, silence, or non-speech audio), and/or the like. In various embodiments, the transcript is associated with the video timeline, speech segments of the transcript are mapped to locations on the video timeline, and locations of candidate speech boundaries (e.g., utterance boundaries, word boundaries, sentence boundaries) are identified at the start and end of corresponding speech segments. In some cases, the transcript is parsed into speech segments and/or non-speech segments, for example, by applying natural language processing based on linguistic features of the transcript (e.g., using boundary detection logic), using a natural language processing model (e.g., a machine learning model), some other kind of segmentation technique, and/or other techniques. In some embodiments, to segment the video's timeline into a complete and disjoint set of speech segments, gaps between speech segments are considered to be speech segments (e.g., with a silence label applied) and/or considered to be silence segments (or silence gaps).

In another example embodiment, scene boundaries are detected from video frames of the video. A scene boundary (also called a shot boundary) is a video cut or other visible scene transition in the video. In some cases, a video cut is a hard cut between two adjacent video frames, a multi-frame video cut that spans a sequence of multiple video frames (e.g., a fade or a wipe), and/or other types. Depending on the implementation, a scene boundary can be generated by recording a video with consecutive takes, by concatenating two different takes (e.g., using video editing software), by applying a visual transition (e.g., using video editing software), by switching between multiple cameras, and/or other ways. In some embodiments, scene boundaries are identified by detecting abrupt visual changes in video frames using any known technique. In some situations where a detected scene boundary is based on a video cut between two adjacent video frames, the scene boundary is identified at a location on the video timeline between the video frames. In some embodiments where a detected scene boundary is based on a multi-frame video cut that spans a sequence of more than two video frames, the scene boundary is identified at a location on the video timeline that is centered (or at some other location) in the sequence of video frames.

In another example of possible candidate boundaries for video segments, in some embodiments, one or more usage logs associated with the video are accessed and used to detect log events and corresponding event boundaries. Depending on the implementation, various types of log events are detected from various types of usage logs. For example, in one implementation involving screen captured or screencast videos of tutorials for creative software such as ADOBE PHOTOSHOP® or ADOBE FRESCO®, a software usage log generated by the creative software while screen capturing or screencasting is read to identify the times when detected log events such as tool events (e.g., indicating a selection, change, or use of a particular software tool, such as select brush, create layer, etc.) occurred. In an example gaming implementation, a software usage log is read to identify event boundaries for detected software log events such as leveling up or beating an enemy. In an example cooking implementation, a usage log is read to identify event boundaries for visually detected events in the video such as a user picking up a different pot or cooking tool. In some cases, the log need not correspond to events derived from video frames. For example, in an example implementation with a live chat or chat stream associated with a livestreamed video, a corresponding user chat log or session is read to identify event boundaries such as chat messages about a particular topic. In an example video streaming implementation (whether livestreaming or viewing archived video), a usage log representing how a user(s) has viewed the video is read to identify event boundaries for detected interaction events such as navigational events (e.g., play, pause, skip). Generally, any type of temporal log and/or metadata can be read to identify event boundaries.

In some cases (e.g., if a log does not report times relative to the video timeline), an event timeline represented in the log is converted, mapped, or otherwise associated with the video timeline. As such, in some embodiments, the times of log events captured by a log are extracted (e.g., by reading from structured data fields, by applying search patterns, natural language processing, and/or other rules to unstructured data, etc.), the times of the log events are mapped to locations on the video timeline (if necessary), and event boundaries (e.g., tool boundaries identifying locations of tool events) are identified at the corresponding locations on the video timeline.

In some embodiments, detected candidate boundaries are adjusted using one or more adjustment techniques. In some cases, certain types of candidate boundaries are adjusted using certain types of adjustment techniques. In various implementations, candidate boundaries derived from an audio track of the video that includes speech (i.e., speech boundaries, such as utterance or sentence boundaries) are adjusted using voice-activity-detection (VAD) and/or snapped to proximate scene boundaries (e.g., when a scene boundary falls within a silence), event boundaries derived from log events are adjusted (e.g., tool boundaries that fall within a short silence, such as less than one second, are snapped to the closest non-tool boundary), and/or other adjustment techniques are applied.

In some embodiments, candidate boundaries for video segments are adjusted using VAD. VAD is an audio technique that detects the presence (or likelihood of the presence) of human voice in an audio signal at a particular time. In some cases, VAD scores are normalized to a continuous range, for example, on [0, 1] such that VAD=1 means there is human voice and VAD=0 means no human voice. As such, in some embodiments, to avoid placing a video segment boundary (e.g., a clip atom boundary) in the middle of speech, VAD score is used as a cut cost to adjust the location of certain boundaries (e.g., by adjusting boundaries with high VAD cost and/or permitting boundaries with low VAD cost). For example, in some cases, candidate speech boundaries are refined by snapping the candidate boundaries to locations within a neighborhood of the candidate boundaries where VAD scores are at a minimum. In another example, a gap of silence between two speech chunks (e.g., a silence gap that is shorter than some duration d, such as one second) may be closed by searching the silence gap for the lowest VAD score and merging the candidate speech boundaries surrounding the silence gap into an adjusted boundary at the location of the lowest VAD score.

In some embodiments, smoothing is applied to the VAD scores prior to adjusting candidate speech boundaries. Instead of cutting or otherwise defining a video segment boundary right at the end of the speech, smoothing the VAD prior to snapping boundaries to local VAD minima effectively adds a temporal buffer to speech boundaries, thereby cutting or otherwise defining boundaries for speech chunks at some distance away from the unsmoothed boundaries, which generates more natural transitions between video segments. In an example embodiment, any known VAD technique is applied to some or all of an audio track associated with video to calculate VAD scores, smoothing is applied (e.g., using a kernel such as a Gaussian or Cauchy kernel, by applying a filter, etc.) to the VAD scores, and the locations of candidate speech boundaries are adjusted based on the smoothed VAD scores. In some embodiments, smoothing is only applied to the VAD scores at the location of (e.g., centered around) candidate speech boundaries. In some cases, the width of a smoothing kernel or filter corresponds with, or sets a minimum for, the neighborhood to search. Since smoothing a signal generally leaves a tail, and the size of the tail generally corresponds to the size of the kernel or filter (e.g., width r), some embodiments set the neighborhood to search greater than or equal to the size of the kernel, filter, or tail (e.g., for each audio-derived candidate boundary such as each candidate speech boundary, search the lowest VAD value in a neighborhood of width r). These are just a few examples, and other embodiments apply additional or alternative smoothing techniques.

In some embodiments, candidate speech boundaries are adjusted by snapping the candidate speech boundaries to proximate scene boundaries. In various embodiments, speech boundaries (e.g., utterance boundaries, sentence boundaries) are determined by analyzing audio associated with the video (e.g., transcribing speech from the audio and detecting utterance, word, and/or sentence boundaries from the transcript), while scene boundaries are determined by analyzing video frames of the video. In some cases, there can be slight discrepancies between the two types of boundaries. If the video is cut (or a boundary placed) just before or after a scene boundary, it causes a jarring effect (a sudden jump at the beginning or end of the cut or segment). To avoid such jarring cuts and to account for discrepancies, in some embodiments, the locations of some or all audio-derived candidate boundaries (e.g., speech boundaries) are adjusted. In an example implementation, scene boundaries that fall within a silence are detected (e.g., based on looking up and finding no word at a corresponding portion of an associated transcript, based on an associated VAD score being below some threshold value), and proximate speech boundaries (which can also be thought of as silence boundaries since these speech boundaries divide speech and silence) are snapped to the scene boundaries. That is, in some embodiments, silence boundaries that are proximate to (e.g., separated by less than some threshold duration such as within 500 milliseconds of) a scene boundary that falls within silence are snapped to the scene boundary. In some cases, if both silence boundaries surrounding a silence gap are close (e.g., both within 500 milliseconds of an interceding scene boundary in the silence gap), the silence boundaries are collapsed and merged to the scene boundary. In this example, if the scene boundary is far enough from either silence boundary, no adjustment is made.

These are just a few examples, and other implementations additionally or alternatively use other techniques for adjusting or even removing candidate boundaries. For example, in certain contexts, such as video narration where a scene boundary without an associated transcript word (e.g., a scene boundary coinciding with a non-speech segment) might indicate a useful location for a video segment boundary, some embodiments snap speech boundaries to proximate non-speech boundaries (e.g., scene boundaries, tool boundaries). In some cases, to avoid placing boundaries or cuts in the middle of speech (e.g., words), candidate boundaries (e.g., scene boundaries, tool boundaries) that fall within a speech segment are removed. In some contexts such as video with background music, it may be desirable to allow boundaries or cuts in the middle of speech (e.g., song vocals), so in some embodiments, some or all candidate boundaries that fall within a speech segment are not removed. In some embodiments, tool boundaries derived from software tool selections, transitions, and/or uses that fall within a short silence or other non-speech segment (e.g., less than one second) are snapped to the closest non-tool boundary. As such, in various embodiments, the type of adjustment rule is tailored based on the context, and/or cut costs for certain boundaries are defined or weighted appropriately, as described in more detail below.

In order to compute a hierarchical video segmentation, some embodiments compute and/or assign one or more cut costs for candidate boundaries. For example, as explained in more detail below, in order to compute an optimal segmentation for one or more levels of the hierarchical segmentation, in some embodiments, a cost function is defined and/or evaluated for a candidate segmentation using one or more cut costs associated with each candidate boundary associated with the candidate segmentation. In some cases, cut costs for each candidate boundary are computed and assigned to each candidate boundary (e.g., as metadata) prior to computing the hierarchy. Examples of different types of cut costs for candidate boundaries include VAD cut cost, silence cut cost, sentence cut cost, scene cut cost, tool cut cost, and/or others. In some embodiments, for some or all cut costs used in the cost function, a low cut cost for a particular candidate boundary means the boundary would be a good location to cut the video or otherwise define a boundary for a video segment.

For example, in some embodiments, a VAD cut cost is assigned to, or otherwise determined for, candidate boundaries. Depending on the embodiment, the VAD cut cost for a candidate boundary is a VAD score (e.g., a computed, normalized, and/or smoothed VAD score) of the audio of the video at the time of the boundary. In some embodiments where higher VAD scores indicate the presence of speech, using a VAD score as a VAD cut cost in the cost function discourages segmentation at boundaries located during speech.

In another example, in some embodiments, one or more silence cut costs are assigned to, or otherwise determined for candidate boundaries. To encourage placing cuts at the beginning or end of long silence gaps (e.g., or other non-speech segments), the duration of a silence gap that is adjacent to (e.g., preceding and/or following) a candidate boundary is used to determine a silence cut cost for the boundary. In some embodiments, the silence duration is normalized, for example, by the maximum length of a video segment (e.g., maximum length of a clip atom, pre-defined target maximum length of a video segment in a particular hierarchy level). In some implementations, silence cut cost is inversely proportional to the duration of an adjacent silence. Therefore, a relatively long silence duration results in a relatively low silence cut cost, encouraging segmentation at boundaries that are adjacent to long silences. On the other hand, a relatively short silence duration results in a relatively large silence cut cost, discouraging segmentation at boundaries that are adjacent to short silences, thereby encouraging short silence segments to be merged with adjacent non-silence segments. In some embodiments that pre-compute a portion of the cost function prior to computing the hierarchy, each candidate boundary is assigned one or more values, such as silence duration(s) (e.g., for preceding silence, subsequent silence, maximum adjacent silence, zero if there is no adjacent silence), normalized silence duration(s), silence cut cost(s) (e.g., corresponding to multiple adjacent silence durations, for one or more hierarchy levels), some other intermediate value, and/or other values.

In another example, in some embodiments, a sentence cut cost is assigned to, or otherwise determined for candidate boundaries. For example, in some embodiments, a candidate boundary is assigned a sentence cut cost of zero if it is a sentence boundary, and other types of boundaries (e.g., utterance boundaries or scene boundaries that do not coincide with sentence boundaries) are assigned a sentence cut cost of one (or some other normalized value). Thus, in some embodiments, using a sentence cut cost in the cost function encourages segmentation at sentence boundaries and discourages segmentation at other types of boundaries.

In another example, in some embodiments, a scene cut cost is assigned to, or otherwise determined for candidate boundaries. For example, in some embodiments, for each scene boundary, histogram similarity of the pixels in the two video frames adjacent to the boundary (before and after) is computed and assigned as the scene cut cost for the scene boundary. Generally, histogram similarity is computed using any known techniques, for example, by computing a histogram distribution of pixel intensity values for the two frames on either side of boundary, and calculating the distance between the two histogram distributions using any suitable distance metric (e.g., correlation, Chi-squared, intersection, Hellinger/Bhattacharyya distance, Euclidean distance, Chebyshev distance, Manhattan distance). To encourage segmentation at scene boundaries between video frames with more significant visual changes, in some embodiments, scene cut cost is inversely proportional to histogram similarity. In this manner, the more different the two adjacent video frames are, the larger the histogram similarity (distance between their histogram distributions), and the lower the scene cut cost. In some implementations, other types of boundaries (e.g., utterance and sentence boundaries that do not coincide with scene boundaries) are assigned a scene cut cost of one (or some other normalized value). Thus, in various embodiments, using a scene cut cost in the cost function encourages segmentation at scene boundaries where the adjacent video frames are more visually different.

In some embodiments, a custom cut cost is defined for certain boundary types. For example, in some embodiments, tool boundaries derived from tool events such as software tool selections, transitions, and/or uses are assigned a tool cut cost. In various implementations, the tool cut cost is defined to place more emphasis on tool boundaries for tool events that have a longer gap until the next tool event, for example, by defining tool cut cost to be inversely proportional to the duration between tool boundaries. In some embodiments, the duration between tool boundaries is normalized (e.g., by the maximum duration between tool boundaries). Additionally or alternatively, the tool cut cost is defined to place more emphasis on tool boundaries that signal a larger semantic change using encoded importance values for software tools. For example, in some embodiments where tool boundaries indicate a selection, change, and/or use of a software tool in creative software (e.g., while screen capturing or screencasting video of software usage), the importance of different types of software tools is quantified and encoded. In some embodiments, importance values for software tools are normalized (e.g., on [0.1]), with larger importance values indicating a larger semantic change. In an example embodiment, layer changes or changes in a navigational menu are encoded to indicate a larger semantic shift in video content. In another example embodiment, opening up software is scored with a higher tool importance value than drawing a stroke. Thus, in various embodiments, for each tool boundary, the tool that was selected or used at that time is looked up (e.g., from a software usage log), mapped to a corresponding importance value (e.g., based on a pre-defined mapping), and the importance value is used to compute tool cut cost. Thus, in some embodiments, using a tool cut cost in the cost function encourages segmentation at tool boundaries for tool events that have a longer gap until the next tool event and/or at tool boundaries that signal a larger semantic change in video content.

Having defined and/or computed various cut costs for candidate boundaries, in some embodiments, the detected and/or adjusted candidate boundaries are used as boundaries for a segmentation of the video. For example, in some embodiments, the candidate boundaries are combined, de-duplicated, and/or used to segment or otherwise define start and end points for clip atoms, the most granular segmentation of the video. Using the clip atoms, some embodiments generate a hierarchical segmentation of the video by hierarchically clustering the clip atoms into video segments at multiple levels of granularity. To accomplish this, in some embodiments, a set of the candidate boundaries is selected to form a complete and disjoint set of video segments at each of a plurality of levels of a hierarchical segmentation. Selecting a set of the candidate boundaries for a particular level of the hierarchical segmentation can also be thought of as clustering a corresponding set of the clip atoms into the particular level of the hierarchical segmentation. In some cases, higher levels segment the video into coarser segments, and lower levels segments the video into finer segments. In some embodiments, video segment boundaries in coarser hierarchy levels (e.g., longer clips) are a strict subset of video segment boundaries in finer hierarchy levels (e.g., shorter clips).

Generally, depending on the implementation, any suitable segmentation and/or clustering technique is applied to generate segmentations at any number of hierarchy levels. The following is a non-limiting example of a potential hierarchical segmentation.

The lowest level (level 0) of the hierarchy is formed by the clip atoms (e.g., defined based on the detected and/or adjusted candidate boundaries). In this example, level 0 is the most granular segmentation of the video.

The next level (level 1) of the hierarchy is formed by merging short non-speech clip atoms (e.g., non-speech atoms that have a duration below some threshold, such as one second) with adjacent (e.g., preceding, subsequent) clip atoms. Additionally or alternatively, speech boundaries (e.g., word and/or utterance boundaries) that fall inside a sentence are removed. As such, in some embodiments, level 1 is formed with video segments such as sentence clips, non-speech clips (e.g., silence clips) that are longer than some threshold, and/or clips cut or otherwise defined by scene boundaries.

From level 2 and up, an optimal video segmentation is computed using a line breaking algorithm (e.g., Knuth and Plass' line breaking algorithm), a dynamic programming, or some other segmentation algorithm that evaluates a cost function for candidate segmentations to compute an optimal segmentation for a particular level of the hierarchy. In some embodiments, the segmentation algorithm is repeatedly applied at successive levels of the hierarchy (e.g., level 2 and up), clustering the video segments from a particular level into coarser and longer segments until reaching a desired top level, for example, when the entire timeline becomes a single chunk. In this example, the output is a multi-level hierarchical representation of the video.

In some embodiments, the cost function for the segmentation algorithm is defined for a candidate segmentation based on cut costs for associated boundaries. More specifically, for a particular hierarchy level, a set of boundaries for a candidate segmentation are selected from the set of clip atom boundaries (and/or from the set of video segment boundaries that define a preceding hierarchy level), and the selected boundaries form candidate video segments for the candidate segmentation. In some embodiments, a cut cost is defined for each candidate segment, and the cut cost for the candidate segmentation is defined as the sum of the cut costs for its candidate segments. Example cut costs for a candidate segment include a length cut cost based on the length of the candidate segment, cut costs assigned to boundaries of the candidate segment, consistency cut cost that penalizes candidate segments that contain scene boundaries, and/or others. Additionally or alternatively to summing cut costs for the candidate segments in a candidate segmentation, in some embodiments, a cut cost for a candidate segmentation is computed by summing the cut costs assigned to each boundary in the candidate segmentation. These are just a few examples, and other cost functions may be implemented within the scope of the present disclosure.

In some embodiments, to encourage minimum and maximum lengths for video segments at a particular hierarchy level, a length cut cost is defined based on pre-defined target minimum and maximum lengths. In one example implementation, if the length of a candidate segment is within the target length range, length cut cost is zero. If the length of a candidate segment is larger than a pre-defined target maximum length for a given hierarchy level, the length cut cost for the candidate segment is proportional to the length of the segment (e.g., and normalized by the pre-defined target maximum length for the level). If the length of a candidate segment is less than a pre-defined target minimum length for a given hierarchy level, the length cut cost for the candidate segment is set to some arbitrary value (e.g., a relatively large constant). As such, in this example, the length cut cost penalizes segmentations with candidates segments that have durations outside a pre-defined target range.

In some embodiments, the boundary cost of a candidate segment is a weighed sum of boundary costs (e.g., silence, sentence and scene cut costs) assigned to each boundary associated with the candidate segment. Depending on the embodiment and/or the type of boundary cut cost, the boundaries associated with a candidate segment used to compute the boundary cut cost are the end points of the candidate segment, the clip atom boundaries enclosed by the candidate segment, and/or both. In some implementations, the boundary costs for a candidate segment (e.g., silence, sentence, scene cut costs, tool cut costs) are weighted to favor certain boundaries, such as boundaries (e.g., sentence boundaries, scene boundaries) that are adjacent to a long silence. In some cases, scene boundaries are favored since, in certain contexts, scene boundaries usually signal larger semantic shift in the video content. In some embodiments, the boundary cut cost for a candidate segmentation is the sum of the boundary cut costs computed for each of its candidate segments. Additionally or alternatively, the boundary cut cost for a candidate segmentation is the sum of the boundary cut costs assigned to each boundary in the candidate segmentation.

In some embodiments, the consistency cost of a candidate segment is given by the sum of the scene cut costs for all clip atoms boundaries that fall within the candidate segment (e.g., excluding the clip atom boundaries at the start and end points of the candidate segment). This consistency cost effectively penalizes candidate segments that contain scene boundaries in somewhere in within the candidate segment.

As such, in various implementations, the cost function of a segmentation algorithm (e.g., a line breaking algorithm, a dynamic programming algorithm) computes multiple cut costs for a candidate segment, combines the multiple cut costs to compute a total cut cost for the candidate segment, and/or sums the cut costs for the candidate segments in a candidate segmentation. In this manner, the line breaking algorithm evaluates candidate segmentations and identifies, for example, the candidate segmentation that minimizes the cost function as the optimal video segmentation at a particular hierarchy level (e.g., level 2 and up). In an example implementation, the input into the segmentation algorithm is the segmentation (e.g., a list of boundaries) from a previous level of the hierarchy, and the segmentation algorithm identifies an optimal segmentation for the next hierarchy level by evaluating the cost function for sets of boundaries sampled from the previous level. In some embodiments, a segmentation at a given hierarchy level is represented by a list of IDs and/or time values associated with (i) clip atom boundaries that define the segmentation, (ii) clusters of clip atoms that form the video segments for the segmentation, and/or (iii) the video segments for the segmentation. In some implementations, the segmentation algorithm is iteratively applied to compute segmentations for successive levels of the hierarchy, for example, until the number of video segments in a hierarchy level is smaller than some number (e.g., 10), until the segmentation algorithm returns a single chunk for a hierarchy level, and/or other criteria. As such, in various embodiments, a hierarchical segmentation is computed with a plurality of levels, where each successive level segments the video into video segments with an increasing (or decreasing) amount of granularity.

In various embodiments, the hierarchical segmentation is represented using one or more data structures. In an example implementation, the hierarchical segmentation is represented using a two dimension array, where the dimensions of the array correspond to the different levels of the hierarchy, and the values stored in each dimension of the array represent the video segments in a corresponding hierarchy level. In some cases, video segments are represented by values representing, or references to, timeline locations (e.g., startTime and/or endTime, for example, in milliseconds), clip atoms (e.g., IDs), clip atom boundaries (e.g., IDs), and/or other representations. In some cases, a single copy of the video and a representation of boundary locations are maintained. In some embodiments, separate copies of video and/or separate copies of the video segments (e.g., chunks) are maintained for each level of the hierarchy. Generally, embodiments that maintain separate copies provide for faster access, scrubbing, trimming, and/or the like. These are just a few examples, and other representations may be implemented within the scope of the present disclosure.

In some embodiments, ingesting a video includes extracting metadata about the video. Examples of different types of metadata extraction include transcribing associated audio, visually extracting content or action tags from video (e.g., by performing object detection, for example, using one or more neural networks), extracting software log events from an associated temporal log (e.g., software usage log, such one generated while screencasting an ADOBE BEHANCE® live stream), and/or others. In some cases, transcribed audio is stored or otherwise associated with a corresponding video segment (e.g., in the hierarchical segmentation). Additionally or alternatively, transcribed audio is analyzed for term frequency, and some or all terms (e.g., the most frequent n terms) are stored as searchable metadata tags associated with corresponding video segments. As such, in some embodiments, an audio transcript, keywords from an audio transcript, visually extracted content or action tags, action tags corresponding to extracted software events, and/or other extracted features are stored, associated with corresponding locations on the video timeline (or otherwise associated with corresponding video segments), and used as searchable metadata. Generally, extracting video features from video segments and using the extracted features as searchable metadata makes selecting and browsing video segments easier, as explained in more detail below.

Interacting with Hierarchical Clusters of Video

In some embodiments, a user interface provides one or more interaction elements that provide an interaction modality for selecting, navigating, playing, and/or editing a video based on a hierarchical segmentation of a video. As explained above, a hierarchical segmentation of a video hierarchically clusters clip atoms (the smallest interaction unit of the video) into video segments at multiple levels of granularity. Rather than simply interacting with the video based on selections of particular video frames or time ranges, various implementations provide one or more interaction elements that allow users to interact with higher level semantic chunks of the video (the hierarchical clusters). Example interactions include selecting, searching, playing, and/or editing particular video segments (e.g., clusters of clip atoms) represented by the hierarchical segmentation. Example interaction elements include a video timeline segmented by the boundaries of the hierarchical clusters, a zoom bar for zooming in and out of the hierarchical clusters, a scroll bar for scrolling across the hierarchical clusters, a metadata panel showing transcribed audio and extracted metadata tags for each hierarchical cluster, and/or a search bar for searching extracted metadata tags of the hierarchical clusters, to name a few possibilities.

For example, in some embodiments, a video timeline corresponding to the length of the video is segmented by the boundaries of the hierarchical clusters. In some cases, an interaction element allows a user to select a level of the hierarchy, and the boundaries for the corresponding level of the hierarchy are used to segment the video timeline into a set of video segments defined by the level. When the user selects a portion of the video timeline, in some embodiments, the selection snaps to the boundaries of a corresponding video segment (e.g., cluster of clip atoms) defined by an active level of the hierarchy. For example, if the user clicks or taps on a video segment, the video segment is selected (or de-selected). In another example, if the user clicks and drags (or taps, holds, and drags) across multiple video segments on the video timeline, the drag operation adds video segments to the selection (e.g., as an expanding selection crosses a corresponding boundary) or removes video segments from a selection (e.g., as a decreasing selection crosses a corresponding boundary). Thus, a user can drag across the video timeline to make a selection that snaps to video segment (cluster) boundaries. In some embodiments, when the user navigates to a different hierarchy level, the video timeline and the selection of video segments are transformed or otherwise updated to reflect the boundaries of the selected hierarchy level, allowing for a refined selection of a portion of the video through selection of video segments with different levels of granularity.

In some embodiments, a zoom bar and/or a scroll bar is provided to control a window view of the video timeline. For example, in some embodiments, the zoom bar includes a thumb (or bar) that can be dragged along a track (or trough). In some cases, the thumb has independently moveable (e.g., draggable) endpoints that control a corresponding location on the video timeline presented in the video timeline window. Thus, in some embodiments, resizing the thumb zooms in and out of the video timeline, and/or dragging the thumb along the track scrolls the video timeline through the timeline window.

In some embodiments, a metadata panel presents metadata (e.g., transcribed audio and extracted metadata tags) for each video segment (cluster of clip atoms). In some cases, the metadata panel includes a composite list of the metadata for all video segments, and the composite list is segmented into metadata segments at locations that correspond to the boundaries of the level of the hierarchy being viewed. In some embodiments, each of the metadata segments is independently selectable, which emphasizes (e.g., highlights) the selected metadata segment, emphasizes the corresponding video segment on the video timeline, moves a cursor to the first video frame of the corresponding video segment, and/or displays the video frame in a video player. Similarly, in some embodiments, selecting a particular video segment on the video timeline highlights the video segment on the video timeline, emphasizes a corresponding metadata segment in the metadata panel, moves a cursor to the first video frame of the corresponding video segment, and/or displays the video frame in a video player. In some embodiments, when the user navigates to a different hierarchy level, the metadata panel and the selection of metadata segments are updated to reflect the boundaries of the selected hierarchy level, allowing for a refined selection of a portion of the video through selection of corresponding metadata segments with different levels of granularity.

In some embodiments, a search bar is provided for searching metadata tags and other extracted metadata. In some cases, a user enters one or more search criteria such as keywords, and extracted metadata associated with the video segments (e.g., clusters of clip atoms) are searched for matches with the search criteria. Examples of extracted metadata include a transcript of speech in an audio track, (frequent) transcript terms, visually extracted content or action tags, extracted action tags corresponding to extracted software events, and/or other extracted features. In some embodiments, corresponding matching video segments (i.e., segments with matching metadata) are emphasized (e.g., highlighted) on the video timeline, and/or corresponding matching metadata segments are emphasized (e.g., highlighted) in the metadata panel. In some embodiments, when the user navigates to a different hierarchy level, the video timeline and/or the metadata panel are transformed or otherwise updated to reflect the boundaries of the selected hierarchy level, and the search results (matching video segments and/or metadata segments) are updated based on the boundaries of the selected hierarchy level. Thus, in some embodiments, changing the level of hierarchy during an active search (e.g., with highlighted search results) can provide search results with different levels of granularity, allowing for a more flexible and efficient search experience.

In some embodiments, different types of emphasis are applied to different selection states for video segments (e.g., clusters of clip atoms). For example, some embodiments may apply different types of emphasis to unselected video segments, a video segment corresponding to a current playback position, a video or metadata segment being hovered over, clicked or highlighted video or metadata segments, video or metadata segments with metadata tags that match a keyword search, video segments (and corresponding metadata segments) that have been added to an operational queue (e.g., a playback queue), some combination thereof, and/or others. Examples of different types of emphasis include different colors, gradients, patterns, outlines, shadows, and/or others.

Depending on the implementation, any number and variety of operations are performed on selected video segments (and/or a corresponding portion of the video). For example, in various embodiments, based on a selection of a corresponding interaction element(s), the selected video segments are played back (e.g., by playing only the selected video segments), trimmed (e.g., by removing the unselected video segments), edited in some other way (e.g., by rearranging, cropping, applying transitions or effects, adjusting color, adding titles or graphics), exported, and/or other operations.

Example Video Editing Environment

Referring now to FIG. 1, a block diagram of example environment 100 suitable for use in implementing embodiments of the invention is shown. Generally, environment 100 is suitable for video editing or playback, and, among other things, facilitates hierarchical segmentation of video and interactions with resulting hierarchical clusters of video segments. Environment 100 includes client device 110 and server 150. In various embodiments, client device 110 and/or server 150 are any kind of computing device capable of facilitating video editing or playback, such as computing device 2600 described below with reference to FIG. 26. Examples of computing devices include a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, some combination thereof, or any other suitable computer device.

Environment 100 also includes storage 190. Storage 190 generally stores information including data, data structures, computer instructions (e.g., software program instructions, routines, or services), and/or models (e.g., machine learning models) used in some embodiments of the technologies described herein. In an embodiment, storage 190 comprises a data store (or computer data memory). Further, although depicted as a single data store component, in some embodiments, storage 190 is implemented as one or more data stores (e.g., a distributed storage network) and/or in the cloud.

The components of environment 100 communicate with each other via a network 105. In some embodiments, network 105 includes one or more local area networks (LANs), wide area networks (WANs), and/or other networks. Such networking environments are commonplace in offices, enterprise-wide computer networks, intranets, and the Internet.

In the example illustrated in FIG. 1, client device 110 includes video interaction engine 120, and server 150 includes video ingestion tool 155. In various embodiments, video interaction engine 120, video ingestion tool 155, and/or any of the elements illustrated in FIG. 1 are incorporated, or integrated, into an application(s) (e.g., a corresponding application on client device 110 and server 150, respectively), or an add-on(s) or plug-in(s) to an application(s). In some embodiments, the application(s) is any application capable of facilitating video editing or playback, such as a stand-alone application, a mobile application, a web application, and/or the like. In some implementations, the application(s) comprises a web application, for example, that is accessible through a web browser, hosted at least partially server-side, and/or the like. Additionally or alternatively, the application(s) include a dedicated application. In some cases, the application is integrated into an operating system (e.g., as a service). Example video editing applications include ADOBE PREMIERE PRO and ADOBE PREMIERE ELEMENTS.

In various embodiments, the functionality described herein is allocated across any number of devices. In some embodiments, video editing application 115 is hosted at least partially server-side, such that video interaction engine 120 and video ingestion tool 155 coordinate (e.g., via network 105) to perform the functionality described herein. In another example, video interaction engine 120 and video ingestion tool 155 (or some portion thereof) are integrated into a common application executable on a single device. Although some embodiments are described with respect to an application(s), in some embodiments, any of the functionality described herein is additionally or alternatively integrated into an operating system (e.g., as a service), a server (e.g., a remote server), a distributed computing environment (e.g., as a cloud service), and/or otherwise. These are just examples, and any suitable allocation of functionality among these or other devices may be implemented within the scope of the present disclosure.

To begin with a high-level overview of an example workflow through the configuration illustrated in FIG. 1, client device 110 is a desktop, laptop, or mobile device such as a tablet or smart phone, and video editing application 115 provides a video editing interface. In some cases, a user records a video using video recording capabilities of client device 110 (or some other device) and/or some application executing at least partially on the device (e.g., ADOBE BEHANCE). In some cases, a user accesses a video through video editing application 115, and/or otherwise uses video editing application 115 to identify the location where a video is stored (whether local to client device 110, at some remote location such as storage 190, or otherwise). In some cases, video editing application 115 uploads the video or otherwise communicates the location of the video to server 150, and video ingestion tool 155 performs one or more ingestion functions on the video. In some embodiments, video ingestion tool 155 (e.g., video segmentation component 160 and/or hierarchical clustering component 170) creates a hierarchical segmentation of the video, for example, by identifying segment boundaries for hierarchical clusters of video segments, generating a representation of a hierarchical segmentation of the video, and/or breaking up the video into corresponding video segments. In another example, video ingestion tool 155 (e.g., metadata extraction component 175) extracts metadata about the video, for example, by transcribing associated audio, visually extracting content or action tags from video (e.g., using one or more neural networks), extracting software log events from an associated temporal log, and/or other ways). In some cases, video editing application 115 and/or video ingestion tool 155 store the video (e.g., as one of video files 192), clip atoms of the video (e.g., clip atoms 194), video segments formed by hierarchical clusters of the clip atoms (e.g., hierarchical clusters 196), segment boundaries for clip atoms and/or higher level video segments (e.g., segment boundaries 198), and/or some representation thereof in any suitable storage location, such as storage 190, client device 110, server 150, some combination thereof, and/or other locations.

In some embodiments, once a video is ingested, video editing application 115 (e.g., video interaction engine 120) provides a user interface with one or more interaction elements that allow a user to interact with the ingested video, and more specifically, with hierarchical clusters of video segments of the video. Some non-limiting examples of interaction elements include a video timeline segmented by the boundaries of the hierarchical clusters (e.g., segmented timeline tool 125), a zoom bar for zooming in and out of the hierarchical clusters (e.g., zoom/scroll bar tool 130), a scroll bar for scrolling across the hierarchical clusters (e.g., zoom/scroll bar tool 130), a metadata panel showing transcribed audio and extracted metadata tags for each hierarchical cluster (e.g., metadata panel tool 135), a search bar for searching extracted metadata tags of the hierarchical clusters (e.g., search tool 140), one or more editing tools for operating on selected video segments (e.g., video edit tool 145), and/or a playback window that plays back selected video segments (e.g., video playback tool 148), to name a few possibilities. Thus, in various embodiments, video interaction engine 120 provides a user interface that allows a user to select, navigate, play, and/or edit a video based on interactions with hierarchical clusters of video segments.

In the sections that follow, the example workflow through the configuration illustrated in FIG. 1 is described in more detail, starting with video ingestion and followed by various ways of interacting with the video.

Ingestion, Segmentation, and Hierarchical Clustering of Video

Continuing with the preceding example, in some embodiments, video ingestion tool 155 ingests a video (e.g., a video file, a portion of a video file, video represented or otherwise identified by a project file). In some embodiments, ingesting a video includes generating a hierarchical segmentation of the video that identifies clip atoms of the video (e.g., clip atoms 194), video segments formed by hierarchical clusters of the clip atoms (e.g., hierarchical clusters 196), and/or segment boundaries for clip atoms and/or higher-level video segments (e.g., segment boundaries 198). Additionally or alternatively, in some embodiments, ingesting a video includes extracting metadata about the video and associating the extracted metadata with corresponding portions of the video (e.g., corresponding clip atoms, higher-level video segments, portions of the video timeline).

In the example illustrated in FIG. 1, video ingestion tool 155 includes video segmentation component 160, hierarchical clustering component 170, and metadata extraction component 175. In an implementation, video segmentation component 160 computes an over-segmentation of the video's timeline to identify boundaries for clip atoms of the video, and hierarchical clustering component 170 hierarchically clusters the clip atoms to form a hierarchical segmentation of the video. Metadata extraction component 175 extracts and associates metadata about the video with corresponding video segments (e.g., clip atoms and/or higher-level video segments).

Generally, video segmentation component 160 computes over-segmentation of the video timeline of an identified video (e.g., being ingested). In the example illustrated in FIG. 1, video segmentation component 160 includes candidate boundary detection component 162, boundary adjustment component 164, and cut cost computation component 166. In this example, candidate boundary detection component 162 applies one or more detection techniques to detect candidate boundaries for clip atoms, boundary adjustment component 164 applies one or more adjustment techniques to adjust the candidate boundaries to finalize the clip atom boundaries, and video segmentation component 160 generates or otherwise stores a representation of the clip atom boundaries and/or the corresponding clip atoms. In order to support hierarchical clustering (e.g., by hierarchical clustering component 170), in some embodiments, cut cost computation component 166 computes one or more cut costs for candidate boundaries and associates candidate boundaries with associated cut costs. In some embodiments, the resulting representation of the clip atom boundaries, corresponding clip atoms, and/or corresponding cut costs forms the over-segmentation of the video timeline.

In some embodiments, candidate boundary detection component 162 detects candidate boundaries for clip atoms (and higher-level video segments) using one or more detection techniques. In various embodiments, candidate boundary detection component 162 uses any number and combination of detection techniques to identify speech boundaries (e.g., utterance boundaries, word boundaries, sentence boundaries), scene boundaries, event boundaries for software log events, and/or other types of boundaries.

For example, in some embodiments, candidate boundary detection component 162 identifies speech boundaries from a transcript of an audio track associated with the video. In some cases, candidate boundary detection component 162 applies any known speech-to-text algorithm to generate a transcript, detect speech segments (e.g., corresponding to words, sentences, utterances of continuous speech separated by audio gaps, etc.), detect non-speech segments (e.g., pauses, silence, or non-speech audio), and/or the like. In some cases, candidate boundary detection component 162 parses the transcript into speech segments and/or non-speech segments, for example, by applying natural language processing based on linguistic features of the transcript (e.g., using boundary detection logic), using a natural language processing model (e.g., a machine learning model), some other kind of segmentation technique, and/or other techniques. In some embodiments, candidate boundary detection component 162 associates the transcript with the timeline of the video, maps detected speech (and/or non-speech) segments to locations on the video timeline, and identifies locations of candidate speech boundaries (e.g., utterance boundaries, word boundaries, sentence boundaries) at the start and end of corresponding speech segments. In some embodiments, to segment the video's timeline into a complete and disjoint set of speech segments, gaps between speech segments are considered to be speech segments (e.g., with a silence label applied) and/or considered to be silence segments (or silence gaps).

In some embodiments, candidate boundary detection component 162 detects scene boundaries from video frames of the video. A scene boundary (also called a shot boundary) is a video cut or other detectible scene transition in the video. In some cases, a video cut is a hard cut between two adjacent video frames, a multi-frame video cut that spans a sequence of multiple video frames (e.g., a fade or a wipe), and/or other types. Depending on how a video was generated, a scene boundary can be created by recording consecutive takes, by concatenating two different takes (e.g., using video editing software), by generating a transition (e.g., using video editing software), and/or other ways.

In some embodiments, candidate boundary detection component 162 detects scene boundaries by detecting abrupt changes in video frames, for example, using any known technique. In some situations where a detected scene boundary is based on a video cut between two adjacent video frames, candidate boundary detection component 162 identifies the scene boundary at a location on the video timeline between the video frames. In some embodiments where a detected scene boundary is based on a multi-frame video cut that spans a sequence of more than two video frames, candidate boundary detection component 162 identifies the scene boundary at a location on the video timeline that is centered (or at some other location) in the sequence of video frames. These and other possible ways to detect scene boundaries (e.g., video cuts) within the scope of present disclosure are described in co-pending U.S. application Ser. No. 16/879,362, filed on May 20, 2020, the contents of which are hereby incorporated by reference in their entirety.

In some embodiments, candidate boundary detection component 162 identifies the event boundaries from log events represented in one or more temporal logs, such as software usage logs associated with the video. For example, in some embodiments, candidate boundary detection component 162 accesses one or more temporal logs associated with the video, and detects log events and corresponding event boundaries based on the logs.

Various implementations involve different types of temporal logs and/or log events. For example, in one implementation involving screen captured or screencast videos of tutorials for creative software such as ADOBE PHOTOSHOP or ADOBE FRESCO, a software usage log generated by the creative software while screen capturing or screencasting is read to identify the times of event boundaries when detected log events such as tool events (e.g., indicating a selection, change, or use of a particular software tool, such as select brush, create layer, etc.) occurred. In an example gaming implementation, a software usage log is read to identify the times of event boundaries for detected software log events such as leveling up or beating an enemy. In an example cooking implementation, a usage log is read to identify the times of event boundaries for logged events (e.g., manually, visually detected) in the video such as a user picking up a different pot or cooking tool. Although the foregoing examples involve temporal logs with log events derived from video frames, this need not be the case. For example, in an implementation with a live chat or chat stream associated with a livestreamed video, a corresponding user chat log or session is read to identify times of event boundaries such as chat messages about a particular topic. In an example video streaming implementation (whether livestreaming or viewing archived video), a usage log representing how a user(s) has viewed the video is read to identify the times of event boundaries for detected interaction events such as navigational events (e.g., play, pause, skip). Generally, any type of temporal log and/or metadata can be read to identify times for event boundaries.

In some cases, if a log does not report times relative to the video timeline, candidate boundary detection component 162 converts, maps, or otherwise associates an event timeline represented in the log with the video timeline. As such, in some embodiments, candidate boundary detection component 162 extracts the times of log events captured by a log (e.g., by reading from structured data fields, by applying search patterns, natural language processing, and/or other rules to unstructured data, etc.), maps the times of the log events to locations on the video timeline (if necessary), and identifies event boundaries (e.g., tool boundaries identifying locations of tool events) at the corresponding locations on the video timeline.

In some embodiments, boundary adjustment component 164 adjusts the locations of detected candidate boundaries using one or more adjustment techniques. In some cases, certain types of candidate boundaries are adjusted using certain types of adjustment techniques. In various implementations, boundary adjustment component 164 adjusts candidate boundaries derived from an audio track of the video that includes speech (i.e., speech boundaries, such as utterance or sentence boundaries) using voice activity detection (VAD), adjusts speech boundaries by snapping them to proximate scene boundaries (e.g., when a scene boundary falls within a silence), adjusts event boundaries derived from log events (e.g., by snapping tool boundaries that fall within a short silence, such as less than one second, to the closest non-tool boundary), and/or using other adjustment techniques.

In some embodiments, to avoid placing a video segment boundary (e.g., a clip atom boundary) in the middle of speech, boundary adjustment component 164 adjusts candidate boundaries for video segments using VAD. VAD is an audio technique that detects the presence (or likelihood of the presence) of human voice in an audio signal at a particular time. In some embodiments, VAD outputs VAD scores that are normalized to a continuous range, for example, on [0, 1] such that VAD=1 means there is human voice and VAD=0 means no human voice. As such, in some cases, boundary adjustment component 164 computes VAD scores for an associated audio track of the video, and uses the VAD scores at locations of candidate boundaries as a cut cost to identify adjustments that place the candidate boundaries in optimal locations (e.g., by adjusting boundaries with high VAD cost and/or permitting boundaries with low VAD cost). For example, in some cases, boundary adjustment component 164 refines candidate speech boundaries by snapping the candidate boundaries to proximate locations within a neighborhood of each boundary where VAD scores are at a minimum. In another example, boundary adjustment component 164 closes a silence gap between two speech chunks (e.g., that is shorter than some duration d, such as one second) by searching the silence gap for the lowest VAD score and merging the candidate speech boundaries surrounding the silence gap into an adjusted boundary at the location of the lowest VAD score.

Figure 2B:
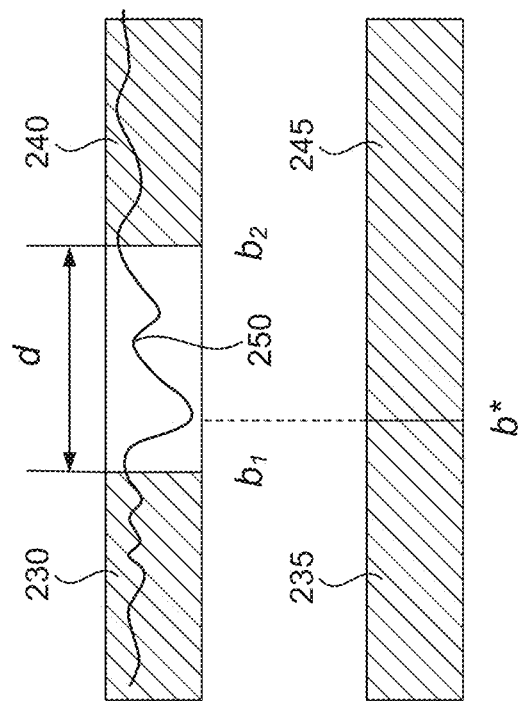
FIGS. 2A-2B are illustrations of example boundary adjustments for video segments based on voice activity detection, in accordance with embodiments of the present invention.
Figure 2A:
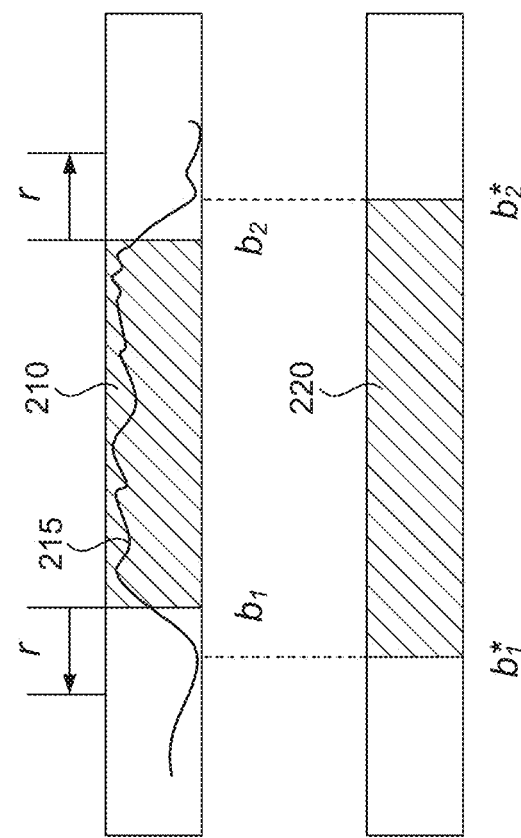

FIGS. 2A and 2B are illustrations of example boundary adjustments for video segments based on voice activity detection. For example, FIG. 2A shows speech segment 210 defined by boundaries $b_1$ and $b_2$, and a plot of VAD scores 215 indicating the presence of human voice with respect to speech segment 210. For each boundary $b_1$ and $b_2$, boundary adjustment component 164 searches a neighborhood r (e.g., on both sides) of the boundary for the location at which VAD score 215 is minimized (e.g., indicating the absence of human voice). The resulting locations are used as the locations for updated boundaries $b_1^*$ and $b_2^*$ for adjusted speech segment 220.

FIG. 2B shows speech segment 230 with right boundary $b_1$ and speech segment 240 with left boundary $b_1$, separated by a silence gap with duration d, a plot of VAD scores 250 indicating the presence of human voice with respect to speech segments 230 and 240. In this example, boundary adjustment component 164 determines whether the silence gap is less than (or equal to) some threshold duration, and if so, searches the silence gap for the location at which VAD score 215 is minimized. Boundary adjustment component 164 merges the two boundaries $b_1$ and $b_2$, in FIG. 2B into a new boundary b* between adjusted speech segments 235 and 245.

In some embodiments, boundary adjustment component 164 applies smoothing to the VAD scores prior to adjusting candidate speech boundaries. Instead of cutting or otherwise defining a video segment boundary right at the end of the speech, smoothing the VAD scores prior to snapping boundaries to local VAD minima effectively adds a temporal buffer to speech boundaries, thereby cutting or otherwise defining boundaries for speech chunks at some distance away from the unsmoothed boundaries, which generates more natural transitions between video segments. In an example embodiment, boundary adjustment component 164 applies any known VAD technique to some or all of an audio track associated with video to calculate VAD scores, applies smoothing to the VAD scores (e.g., using a kernel such as a Gaussian or Cauchy kernel, by applying an audio filter, etc.), and adjusts the locations of candidate speech boundaries based on the smoothed VAD scores. In some embodiments, smoothing is only applied to the VAD scores at the location of (e.g., centered around) candidate speech boundaries. In some cases, the width of a smoothing kernel or filter corresponds with, or sets a minimum value for, the neighborhood to search. Since smoothing a signal generally leaves a tail, and the size of the tail generally corresponds to the size of the kernel or filter (e.g., width r), some embodiments set the neighborhood to search greater than or equal to the size of the kernel, filter, or tail (e.g., for each audio-derived candidate boundary such as each candidate speech boundary, search the lowest VAD value in a neighborhood of width r). These are just a few examples, and other embodiments apply additional or alternative smoothing techniques.

In some embodiments, boundary adjustment component 164 adjusts candidate speech boundaries by snapping the candidate speech boundaries to proximate scene boundaries. Since in some embodiments, speech boundaries (e.g., utterance boundaries, sentence boundaries) are derived from audio associated with the video (e.g., transcribing speech from the audio and detecting utterance, word, and/or sentence boundaries from the transcript), while scene boundaries are derived from video frames of the video, there can be slight discrepancies between the two types of boundaries. If the video is cut (or a boundary placed) just before or after a scene boundary, it causes a jarring effect (a sudden jump at the beginning or end of the cut or segment). To avoid such jarring cuts and to account for discrepancies, in some embodiments, the locations of some or all audio-derived candidate boundaries (e.g., speech boundaries) are adjusted.

In an example implementation, boundary adjustment component 164 detects scene boundaries that fall within a silence or other non-speech segment (e.g., based on looking up and finding no word at a corresponding portion of an associated transcript, based on an associated VAD score being below some threshold value), and boundary adjustment component 164 snaps proximate speech and/or silence boundaries to the detected scene boundaries. In this example, since detected scene boundaries are located within a silence gap, a proximate speech boundary is can also be thought of as a silence boundary for the silence gap. Thus, in some embodiments, silence boundaries that are proximate to (e.g., within some neighborhood such as 500 milliseconds of) a scene boundary that falls within a silence gap are snapped to the scene boundary. In some cases, if both silence boundaries surrounding a silence gap are close (e.g., both within 500 milliseconds of an interceding scene boundary in the silence gap), the silence boundaries are collapsed and merged to the scene boundary. On the other hand, in some embodiments, if the scene boundary is far enough from either silence boundary, no adjustment is made.

These are just a few examples, and in other implementations, boundary adjustment component 164 additionally or alternatively uses other techniques to adjust or even remove candidate boundaries. For example, in certain contexts, such as video narration where a scene boundary without an associated transcript word (e.g., a scene boundary coinciding with a non-speech segment) might indicate a useful location for a video segment boundary, some embodiments snap speech boundaries to proximate non-speech boundaries (e.g., scene boundaries, tool boundaries). In some cases, to avoid placing boundaries or cuts in the middle of speech (e.g., words), candidate boundaries (e.g., scene boundaries, tool boundaries) that fall within a speech segment are removed. In some contexts such as video with background music, it may be desirable to allow boundaries or cuts in the middle of speech (e.g., song vocals), so in some embodiments, some or all candidate boundaries that fall within a speech segment are not removed. In some embodiments, tool boundaries derived from software tool selections, transitions, and/or uses that fall within a short silence or other non-speech segment (e.g., less than one second) are snapped to the closest non-tool boundary. As such, in various embodiments, the type of adjustment rule implemented by boundary adjustment component 164 is tailored based on the context, and/or cut costs for certain boundaries are defined or weighted appropriately, as described in more detail below.

Accordingly, candidate boundary detection component 162 and/or boundary adjustment component 164 identifies candidate boundaries (e.g., locations on the video timeline) for an over-segmentation of the video. In order to support hierarchical clustering (e.g., by hierarchical clustering component 170), in some embodiments, cut cost computation component 166 computes one or more cut costs for candidate boundaries and associates candidate boundaries with corresponding cut costs. For example, as explained in more detail below, in order to compute an optimal segmentation for one or more levels of a hierarchical segmentation, in some embodiments, a cost function is defined and/or evaluated using one or more cut costs associated with each candidate boundary. In some cases, prior to computing the hierarchy, cut cost computation component 166 computes the cut costs and associates corresponding values with each candidate boundary (e.g., as metadata). Examples of different types of cut costs for candidate boundaries include VAD cut cost, silence cut cost, sentence cut cost, scene cut cost, tool cut cost, and/or others. Depending on the implementation, for some or all cut costs, a low cut cost for a particular candidate boundary means the boundary would be a good location to cut the video or otherwise define a boundary for a video segment.

For example, in some embodiments, cut cost computation component 166 determines and/or assigns a VAD cut cost for candidate boundaries. In some cases, the VAD cut cost for a candidate boundary is a VAD score (e.g., a computed, normalized, and/or smoothed VAD score) at the time where the boundary is located. In some embodiments where higher VAD scores indicate the presence of speech, using a VAD score as a VAD cut cost in the cost function discourages segmentation at boundaries located during speech.

In another example, in some embodiments, cut cost computation component 166 determines and/or assigns one or more silence cut costs for candidate boundaries. To encourage placing cuts at the beginning or end of long silence gaps (e.g., or other non-speech segments), cut cost computation component 166 uses the duration of a silence gap that is adjacent to (e.g., preceding and/or following) a candidate boundary to determine a silence cut cost for the boundary. In some embodiments, the silence duration is normalized, for example, by the maximum length of a video segment (e.g., maximum length of a clip atom, pre-defined target maximum length of a video segment in a particular hierarchy level). For example, in some embodiments, a silence cut cost is defined as $1.0 - dur_{silence}/MAXLENGTH$, such that a relatively long silence duration results in a relatively low silence cut cost, encouraging segmentation at boundaries that are adjacent to long silences. On the other hand, a relatively short silence duration results in a relatively large silence cut cost, discouraging segmentation at boundaries that are adjacent to short silences, thereby encouraging short silence segments to be merged with adjacent non-silence segments. In some embodiments that pre-compute a portion of the cost function prior to computing the hierarchy, cut cost computation component 166 assigns to each candidate boundary one or more values, such as silence duration(s) (e.g., for preceding silence, subsequent silence, maximum adjacent silence, zero if there is no adjacent silence), normalized silence duration(s), silence cut cost(s) (e.g., corresponding to multiple adjacent silence durations, for one or more hierarchy levels), some other intermediate value, and/or other values.

In another example, in some embodiments, cut cost computation component 166 determines and/or assigns a sentence cut cost for candidate boundaries. For example, in some embodiments, a candidate boundary is assigned a sentence cut cost of zero if it is a sentence boundary, and other types of boundaries (e.g., utterance boundaries or scene boundaries that do not coincide with sentence boundaries) are assigned a sentence cut cost of one (or some other normalized value). Thus, in some embodiments, using a sentence cut cost in the cost function encourages segmentation at sentence boundaries and discourages segmentation at other types of boundaries.

In another example, in some embodiments, cut cost computation component 166 determines and/or assigns a scene cut cost for candidate boundaries. For example, in some embodiments, for each scene boundary, cut cost computation component 166 computes histogram similarity of the pixels in the two video frames adjacent to the boundary (before and after) and assigns the resulting value as the scene cut cost for the scene boundary. Generally, histogram similarity is computed using any known techniques, for example, by computing a histogram distribution of pixel intensity values for the two frames on either side of boundary, and calculating the distance between the two histogram distributions using any suitable distance metric (e.g., correlation, Chi-squared, intersection, Hellinger/Bhattacharyya distance, Euclidean distance, Chebyshev distance, Manhattan distance). To encourage segmentation at scene boundaries between video frames with more significant visual changes, some embodiments use the inverse of histogram similarity to compute scene cut cost. For example, in some embodiments, scene cut cost $cost_{scene}$ is given by:

$$cost_{scene}=1.0-\text{histogram\_similarity}/(\text{frame\_height}*\text{frame\_width}) \quad (1)$$

In this example, the more different the two adjacent video frames are, the larger the histogram_similarity (distance between their histogram distributions), and the lower the scene cut cost. In some implementations, other types of boundaries (e.g., utterance and sentence boundaries that do not coincide with scene boundaries) are assigned a scene cut cost of one (or some other normalized value). Thus, in various embodiments, using a scene cut cost in the cost function encourages segmentation at scene boundaries where the adjacent video frames are more visually different.

In some embodiments, cut cost computation component 166 determines and/or assigns a custom cut cost for certain boundary types. For example, in some embodiments, cut cost computation component 166 determines and/or assigns a tool cut cost for tool boundaries derived from tool events identified from a software usage log (e.g., software tool selections, transitions, and/or uses). In some cases, tool cut cost is defined to place more emphasis on tool boundaries for tool events that have a longer gap until the next tool event, for example, by using the duration of time between tool boundaries to compute tool cut cost. In some embodiments, the duration between tool boundaries is normalized (e.g., by the maximum duration between tool boundaries for the video).

Additionally or alternatively, tool cut cost is defined to place more emphasis on tool boundaries that signal a larger semantic change. For example, in some embodiments where tool boundaries corresponding to selections, changes, and/or uses of software tools, the importance of each software tool is quantified and encoded (e.g., onto a range) to generate a (pre-determined) mapping of software tools to corresponding importance values. In some embodiments, importance values for software tools are normalized (e.g., on [0.1]), with larger importance values indicating a larger semantic change. In an example embodiment, layer changes or changes in a navigational menu are encoded to indicate a larger semantic shift in video content (e.g., relatively larger importance values). In another example embodiment, opening up software is scored with a higher importance value than drawing a stroke. Thus, in various embodiments, for each tool boundary, cut cost computation component 166 identifies a corresponding software tool (e.g., from a software usage log), map the identified software tool to a corresponding importance value (e.g., based on a pre-defined mapping), and uses the importance value to compute tool cut cost.

In a non-limiting example embodiment that places more emphasis on tool boundaries for tool events that have a longer gap until the next tool event and on tool importance, cut cost computation component 166 computes tool cut cost as:

$$cost_{tool}=(1.0-\text{TimeToNextTool}/\max(\text{TimeToNextTool}))*tool_{importance} \quad (2)$$

where TimeToNextTool measures the time difference between a particular tool boundary and the next tool event, Max(TimeToNextTool) is the maximum value of TimeToNextTool across all tool boundaries, and $tool_{importance}$ is a value between [0,1]. Thus, in some embodiments, using a tool cut cost in the cost function encourages segmentation tool boundaries for tool events that have a longer gap until the next tool event and/or at tool boundaries that signal a larger semantic change in video content.

As such, video segmentation component 160 identifies boundary locations for an over-segmentation of the video timeline and computes cut costs for the boundaries. Hierarchical clustering component 170 uses the identified boundaries and cut costs to compute a hierarchical segmentation of the video. Generally, depending on the implementation, any suitable segmentation and/or clustering technique is applied to identify segment boundaries at any number of hierarchy levels. In one example, hierarchical clustering component 170 uses the detected and/or adjusted candidate boundaries identified by video segmentation component 160 as boundaries for clip atoms for the video. For example, in some embodiments, the candidate boundaries are combined, deduplicated, and/or used to segment or otherwise define start and end points for clip atoms, the most granular segmentation of the video. In some embodiments, hierarchical clustering component 170 uses the clip atoms (and/or clip atom boundaries) to generate a hierarchical segmentation of the video by hierarchically clustering and merging the clip atoms into video segments at multiple levels of granularity.

Figure 3:
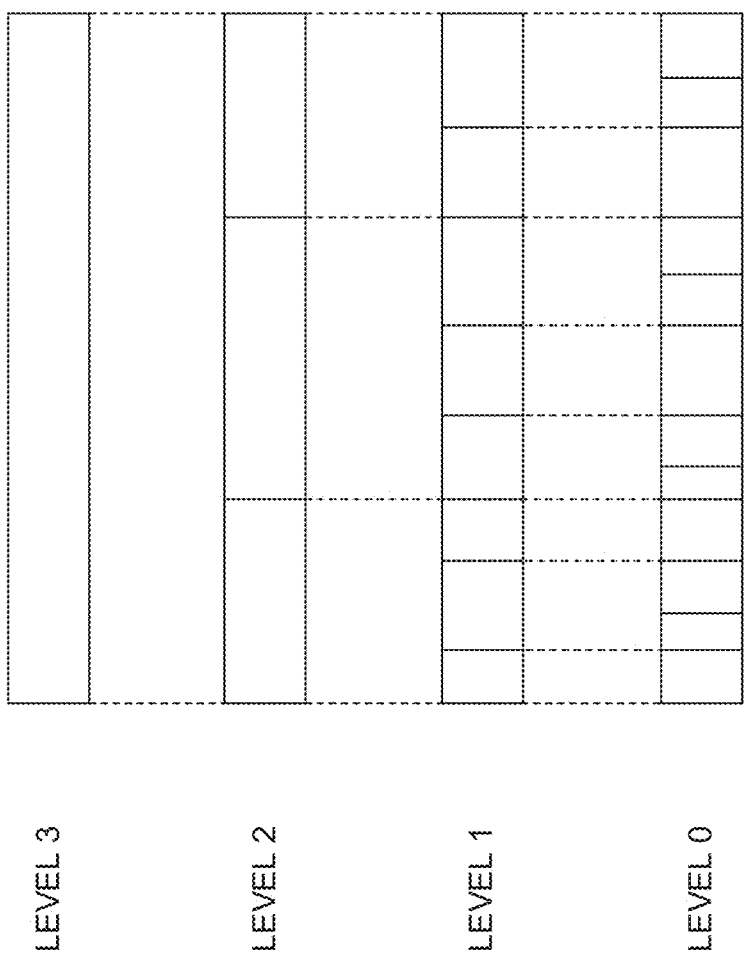
FIG. 3 is an illustration of an example hierarchical segmentation of a video, in accordance with embodiments of the present invention.

To accomplish this, in some embodiments, hierarchical clustering component 170 selects a set of the clip atom boundaries to form a complete and disjoint set of video segments at each of a plurality of levels of a hierarchical segmentation. Selecting a set of a set of the clip atom boundaries for a particular level of the hierarchical segmentation can also be thought of as clustering a corresponding set of the clip atoms into video segments for the particular level. FIG. 3 illustrates an example hierarchical segmentation of a video, in accordance with embodiments of the present invention. In FIG. 3, higher levels of the hierarchy segment the video into coarser segments, and lower levels segments the video into finer segments. In this example, level 0 segments the video into the finest granularity, the video's clip atoms. Furthermore, in FIG. 3, video segment boundaries in coarser hierarchy levels (e.g., longer clips) are a strict subset of video segment boundaries in finer hierarchy levels (e.g., shorter clips).

In some embodiments, hierarchical clustering component 170 uses the clip atoms as the finest (lowest) level of the hierarchical segmentation, and forms higher levels by merging clusters of consecutive clip atoms into larger video segments (corresponding to larger chunks on the timeline). For example, in some cases, hierarchical clustering component 170 forms a level of the hierarchical segmentation (e.g., level 1) by merging short non-speech clip atoms (e.g., non-speech atoms that have a duration below some threshold, such as one second) with adjacent (e.g., preceding, subsequent) clip atoms. Additionally or alternatively, hierarchical clustering component 170 forms a level of the hierarchical segmentation (e.g., level 1) by removing speech boundaries (e.g., word and/or utterance boundaries) that fall inside a sentence. As such, in some embodiments, level 1 is formed with video segments such as sentence clips, non-speech clips (e.g., silence clips) that are longer than some threshold, and/or clips cut or otherwise defined by scene boundaries.

In embodiments, a cost function is defined based on cut costs for segment boundaries, and hierarchical clustering component 170 executes a segmentation algorithm to compute an optimal segmentation for one or more levels of the hierarchy by evaluating the cost function for candidate segmentations at each level. In some cases, hierarchical clustering component 170 repeatedly applies a segmentation algorithm such as a line breaking or dynamic programming algorithm to successive levels of the hierarchy (e.g., level 2 and up), clustering the video segments from a particular level into coarser and longer segments until reaching a desired top level, for example, when the entire timeline becomes a single chunk. In this example, the output is a multi-level hierarchical representation of the video.

In some embodiments, the cost function for the segmentation algorithm is defined for a candidate segmentation based on cut costs for associated boundaries. More specifically, for a particular hierarchy level, hierarchical clustering component 170 selects boundaries for a candidate segmentation from the set of clip atom boundaries and/or from the set of video segment boundaries that define a preceding hierarchy level), and the selected boundaries form candidate video segments for the candidate segmentation. In some embodiments, a cut cost is defined for each candidate segment, and the cut cost for the candidate segmentation is defined as the sum of the cut costs for its candidate segments. Additionally or alternatively, a cut cost is defined for a candidate segmentation as the sum of the cut costs for each boundary in the candidate segmentation. Example cut costs for a candidate segmentation include length cut cost based on the length of candidate segments, cut costs for boundaries in the candidate segmentation, consistency cut cost that penalizes candidate segments in a candidate segmentation that contain scene boundaries in within a candidate segment, and/or others.

In some embodiments, to encourage minimum and maximum lengths for video segments at a particular hierarchy level, hierarchical clustering component 170 computes length cut cost based on pre-defined target minimum and maximum lengths. In an example embodiment, hierarchical clustering component 170 computes length cut cost for a candidate segment as:

$$cost_{length} = \begin{cases} \frac{\text{length}(seq) - MAXLENGTH}{MAXLENGTH}, & \text{if length}(seq) > MAXLENGTH \\ C_{MAXCOST}, & \text{if length}(seq) < MINLENGTH \\ 0, & \text{otherwise} \end{cases} \quad (3)$$

where length(seg) is the duration of the candidate segment (e.g., in milliseconds), MAXLENGTH and MINLENGTH are pre-defined target minimum and maximum lengths for a particular level of the hierarchy, and $C_{MAXCOST}$ is a large constant (e.g., 5000). In an example implementation, MAXLENGTH and MINLENGTH are given by:

$$MINLENGTH=500 \cdot 2^{level} \quad (4)$$

$$MAXLENGTH=2 \cdot MINLENGTH \quad (5)$$

For example, for level 2, MINLENGTH=500*4=2000 milliseconds, and MAXLENGTH=4000 milliseconds. In an example embodiment, hierarchical clustering component 170 computes the length cut cost for a candidate segmentation as the sum of the length cut costs for each of the candidate segments in the candidate segmentation. As such, in some embodiments, the length cut cost penalizes segmentations with candidates segments with durations outside a pre-defined target range.

In some embodiments, hierarchical clustering component 170 computes a boundary cut cost for a candidate segment based on a weighed sum of the boundary cut costs (e.g., silence, sentence, scene, tool, custom, and/or other cut costs) for each of the boundaries associated with the candidate segment. Depending on the embodiment and/or the type of boundary cut cost, the boundaries associated with a candidate segment used to compute the boundary cut cost are the end points of the candidate segment, the clip atom boundaries enclosed by the candidate segment, and/or both. In some implementations, the boundary cut costs for a candidate segment (e.g., silence, sentence and scene cut costs) are weighted to favor certain types of boundaries, such as (e.g., sentence or scene) boundaries that are adjacent to a long silence. In some cases, scene boundaries are favored since, in certain contexts, scene boundaries usually signal a relatively larger semantic shift in the video content. In an example implementation that weights different types of boundary cut costs for different types of boundaries, the boundary cut cost for a candidate segment is given by:

$$cost_{boundary} = cost_{silence} + cost_{sentence} + 3 * cost_{scene} \quad (6)$$

where $cost_{silence}$ is the sum of silence cut costs, $cost_{sentence}$ is the sum of sentence cut costs, and $cost_{scene}$ is the sum of scene cut costs assigned to the boundaries associated with the candidate segment (e.g., the boundaries at the beginning and end of the candidate segment), as described in more detail with respect to cut cost computation component 166 above. In some cases, a boundary has two silence cut costs (e.g., corresponding to adjacent silence durations, preceding and following the boundary), in which case, some implementations sum both silence cut costs for each boundary. In some embodiments, hierarchical clustering component 170 computes the boundary cut cost for a candidate segmentation as the sum of the boundary cut costs computed for each of its candidate segments. Additionally or alternatively, hierarchical clustering component 170 computes the boundary cut cost for a candidate segmentation as the sum of the boundary cut costs assigned to each boundary in the candidate segmentation.

As explained in more detail above, in some cases, silence cut cost is dependent on the hierarchy level. As such, some implementations compute silence cut cost based on silence duration $dur_{silence}$, normalized by a pre-defined target MAXLENGTH of video segments, which in some embodiments is specific each level. Incorporating an example level-dependent silence cut cost into equation (6), an example boundary cut cost for a candidate segment at a particular hierarchy level is given by:

$$cost_{boundary} = (1.0 - dur_{silence}/MAXLENGTH) + cost_{sentence} + 3 * cost_{scene} \quad (7)$$

As with equation (6), in some embodiments in which each boundary has two associated silence cut costs (e.g., corresponding to adjacent silence durations, preceding and following the boundary), equation (7) is updated to include (e.g., sum) silence cut costs for each boundary.

In some implementations where other categories of boundaries are additionally or alternatively defined, a corresponding cut cost is included and/or weighted, for example, according to how important that type of boundary is (e.g., based on the context). For example, in some implementations with tool boundaries, tool cut cost is included in the boundary cut cost for a candidate segment, such as:

$$cost_{boundary} = cost_{silence} + cost_{sentence} + 3 * cost_{scene} + 0.5 * cost_{tool} \quad (8)$$

In some embodiments, hierarchical clustering component 170 computes the consistency cost of a candidate segment based on the sum of the scene cut costs for all clip atoms boundaries that fall within the candidate segment (e.g., excluding the clip atom boundaries at the start and end points of the candidate segment). This consistency cost effectively penalizes candidate segments that contain scene boundaries in somewhere in the middle of the candidate segment. For example, in an implementation, consistency cost for a candidate segment is given by:

$$\text{cost}_{consistency}(seg) = \Sigma_{b \in seg} 1 - \text{cost}_{scene}(b) \qquad (9)$$

where $\text{cost}_{scene}(b)$ is the scene cut cost for clip atom boundary b, and b∈S is all clip atom boundaries in candidate segment S, excluding the start and end boundaries of S.

Thus, in some embodiments, hierarchical clustering component 170 computes multiple cut costs for a candidate segment, and combines the multiple cut costs to compute a total cut cost for the candidate segment. In an example embodiment, hierarchical clustering component 170 computes cut cost for a candidate video segment as:

$$\text{cost}_{clip} = (1 + \text{cost}_{length} + \text{cost}_{boundary} + \text{cost}_{consistency})^2 \qquad (10)$$

where $\text{cost}_{length}$, $\text{cost}_{boundary}$, and $\text{cost}_{consistency}$ are the length cut cost, boundary cut cost, and consistency cut cost for a candidate segment described above. Thus, in some embodiments, hierarchical clustering component 170 computes cut costs for each candidate segment in a segmentation, and the cost function for a candidate segmentation sums the cut costs for its candidate segments. Additionally or alternatively, the cost function for a candidate segmentation sums some or all cut costs for boundaries associated with the candidate segmentation. These are just a few examples of possible cost functions, and other variations are contemplated within the scope of the present disclosure.

As such, in some embodiments, hierarchical clustering component 170 uses a segmentation algorithm (e.g., a line breaking algorithm such as Knuth and Plass' line breaking algorithm, a dynamic programming algorithm) that incorporates any suitable cost function to compute an optimal video segmentation at a particular hierarchy level (e.g., level 2 and up). In an example implementation, the input into the segmentation algorithm for a particular hierarchy level is the segmentation from the previous level of the hierarchy, and the segmentation algorithm determines an optimal segmentation for the level based on the cost function (e.g., for the level). In some embodiments, a segmentation at a given hierarchy level is represented by a list of IDs and/or time values associated with (i) clip atom boundaries that define the segmentation, (ii) clusters of clip atoms that form the video segments for the segmentation, and/or (iii) the video segments for the segmentation. In some implementations, hierarchical clustering component 170 iteratively applies the segmentation algorithm to compute segmentations for successive levels of the hierarchy, for example, until the number of video segments in a hierarchy level is smaller than some number (e.g., 10), until the segmentation algorithm returns a single chunk for a hierarchy level, and/or other criteria. As such, in various embodiments, hierarchical clustering component 170 computes a hierarchical segmentation with a plurality of levels, where each successive level segments the video into video segments with an increasing (or decreasing) amount of granularity.

In various embodiments, hierarchical clustering component 170 generates a representation of the hierarchical segmentation using one or more data structures. In an example implementation, the hierarchical segmentation is represented using a two dimension array, where the dimensions of the array correspond to the different levels of the hierarchy, and the values stored in each dimension of the array represent video segments in a corresponding hierarchy level (e.g., time ranges and/or an identification of hierarchical clusters 196 of clip atoms 194 that define the video segments). For example, in some embodiments, levels[0] represents the video segments in the coarsest level of the hierarchy, and levels[levels.length−1] represents the video segments in the finest level. In some cases, video segments are represented by values representing, or references to, timeline locations (e.g., startTime and/or endTime, for example, in milliseconds), clip atoms (e.g., IDs), clip atom boundaries (e.g., IDs), and/or other representations. In some cases, a single copy of the video and a representation of boundary locations are maintained (e.g., as one or more video files 192 and segment boundaries 198 in storage 190). In other cases, separate copies of video (e.g., video files 192) and/or separate copies of the video segments (e.g., chunks of video files 192, such as clip atoms 194 and/or hierarchical clusters 196) are maintained for each level of the hierarchy. Generally, embodiments that maintain separate copies provide for faster access, scrubbing, trimming, and/or the like.

In some embodiments, video ingestion tool 155 includes metadata extraction component 175, which extracts metadata about a video. For example, in various embodiments, metadata extraction component 175 transcribes audio associated with a video (e.g., using any known audio transcription technique), visually extracts content or action tags from video frames of the video (e.g., by performing object detection, for example, using one or more neural networks), extracts software log events from a temporal log associated with the video (e.g., a software usage log, such as one generated while screen capturing or screencasting), and/or others. In some cases, transcribed audio is stored or otherwise associated with a corresponding video segment (e.g., in a data structure representing the hierarchical segmentation). Additionally or alternatively, transcribed audio is analyzed for term frequency, and some or all terms (e.g., the most frequent n terms) are stored as searchable metadata tags associated with corresponding video segments. As such, in some embodiments, metadata extraction component 175 extracts video features such as transcription text, keywords from an audio transcript, visually extracted content or action tags, and/or action tags corresponding to extracted log events (e.g., software tool events), and stores or otherwise associates the extracted video features with corresponding video segments. For example, in some embodiments, metadata extraction component 175 includes transcription text, keywords, visually extracted content or action tags, and/or action tags corresponding to extracted log event tags (or some representation thereof such as an ID or reference) in a representation of the hierarchical segmentation (e.g., a 2D array). As such, the extracted video features can be used as searchable metadata tags. Generally, extracting video features from video segments and using the extracted features as searchable metadata tags makes selecting and browsing video segments easier, as explained in more detail below.

Interacting with Hierarchical Clusters of Video

The prior section described an example technique for ingesting a video, for example, to prepare for video editing or other video interactions. By segmenting the video at semantically meaningful locations, hierarchically clustering the resulting semantic video segments to form a hierarchical segmentation, and/or generating searchable metadata tags about the hierarchical clusters, video ingestion tool 155 generates a structured representation of the video that provides an efficient and intuitive structure for interacting with the video, for example, via video interaction engine 120 of video editing application 115 in FIG. 1.

In the example illustrated in FIG. 1, video interaction engine 120 provides a user interface that includes one or more interaction elements providing various interaction modalities for selecting, navigating, playing, and/or editing a video based on a hierarchical segmentation of the video. In FIG. 1, video interaction engine 120 includes various tools, such as segmented timeline tool 125, zoom/scroll bar tool 130, metadata panel tool 135, search tool 140, video edit tool 145, and video playback tool 148. In various embodiments, these tools are implemented using code that causes a presentation of a corresponding interaction element(s), and detects and interprets inputs interacting with the interaction element(s). For example, segmented timeline tool 125 controls a video timeline segmented by the boundaries of the hierarchical clusters, zoom/scroll bar tool 130 controls a zoom/scroll bar that zooms in and out and scrolls across the hierarchical clusters presented on the video timeline, metadata panel tool 135 controls a metadata panel showing extracted metadata such as transcribed audio and extracted metadata tags for each hierarchical cluster, search tool 140 controls a search bar and corresponding search functionality for searching extracted metadata associated with the hierarchical clusters, video edit tool 145 performs an editing operation on selected hierarchical clusters of video segments, and video playback tool 148 play back selected hierarchical clusters of video segments. The functionality of these and other example video interaction tools is described in more detail below with respect FIGS. 4-7.

Figure 4:
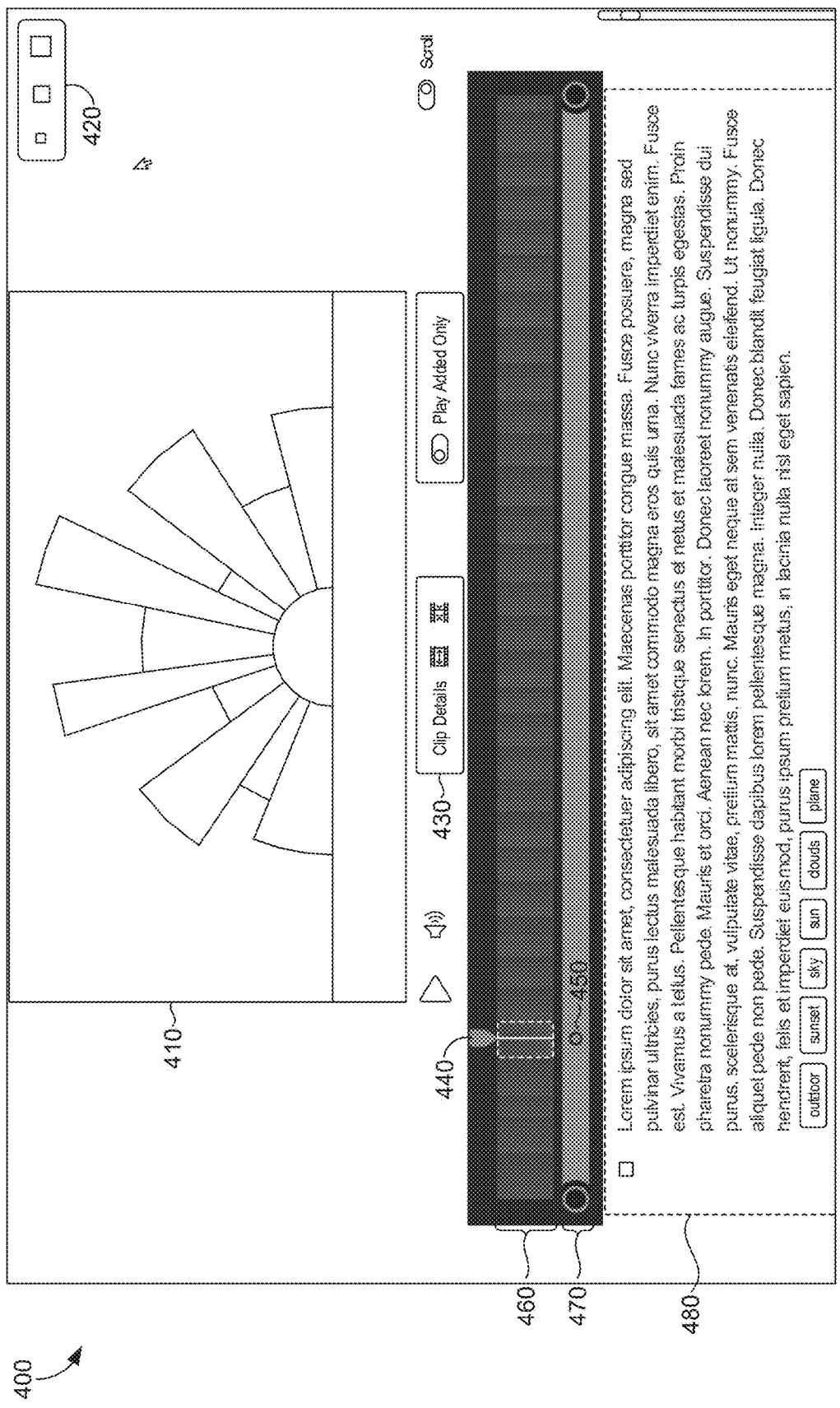
FIG. 4 is an illustration of an example user interface for interacting with hierarchical clusters of video segments, in accordance with embodiments of the present invention.

Turning now to FIG. 4, FIG. 4 illustrates an example user interface 400 for interacting with hierarchical clusters of video segments, in accordance with embodiments of the present invention. In some embodiments, user interface 400 is generated by video interaction engine 120 of FIG. 1. In FIG. 4, user interface 400 includes video playback panel 410, video playback sizing control 420, clip detail control 430, playback cursors 440 and 450, video timeline window 460, zoom/scroll bar 470, and metadata panel 480.

In an example use case, a user loads a video for editing, for example, using a file explorer to identify the location of the video (not depicted). In some cases, upon receiving a command to load the video, the video is ingested to generate a hierarchical segmentation of the video (if not previously ingested), and the hierarchical segmentation is loaded. Generally, the total length of video content corresponds to the total length of a corresponding timeline for the video, and the video timeline is segmented according to the hierarchical segmentation. Video timeline window 460 presents a view of the video timeline, and more specifically, a view of a particular level of the hierarchical segmentation of the video timeline. In some embodiments, video timeline window 460 displays a portion of the video timeline with lines, tick marks, transitions, or some other indication of the boundaries of video segments of a particular level of the hierarchical segmentation. In some cases, a particular level is loaded by default (e.g., a pre-determined level, a least granular level, a most granular level, a level with video segments that do not exceed a threshold duration, a level with an average video segment duration that does not exceed a threshold duration, etc.). In some embodiments, an interaction element such as clip detail control 430 is used to navigate and change the level of the hierarchy viewed on video timeline window 460. As such, video timeline window 460 displays a view of a selected level of the hierarchical segmentation of the video.

In some embodiments, metadata panel 480 presents metadata about video segments of the hierarchical segmentation, such as transcribed audio, keywords, extracted visual tags, extracted log event tags, and/or the like. In some embodiments, metadata panel 480 presents a (scrollable) composite list of extracted metadata for all video segments, and segments the composite list into corresponding metadata segments based on a selected level of the hierarchical segmentation. In some embodiments, an interaction element such as clip detail control 430 is used to navigate and change the level of the hierarchy used to segment the composite list of extracted metadata presented in metadata panel 480.

Continuing with a high-level overview, once a video is loaded, video playback panel 410 presents a video frame corresponding to a selected location on the presented video timeline and/or a current location of playback cursor 440. In some embodiments, a user can select a portion of the video timeline presented in video timeline window 460 (e.g., by clicking or tapping on a corresponding portion of the presented video timeline, dragging playback cursor 440, etc.) to cause presentation of a corresponding video frame in video playback panel 410. Additionally or alternatively, selecting a portion of the video timeline causes the view of the composite list of extracted metadata in metadata panel 480 to jump to a corresponding metadata segment in the composite list. In some embodiments, clicking or tapping a playback button or other control element causes a linear playback of the video in the video playback panel 410, playback cursor 440 advances along the video timeline presented in video timeline window 460 as video playback advances, and/or the composite list of metadata presented in metadata panel 480 advances (e.g., automatically scrolls) to a metadata segment corresponding to the video segment being played as video playback advances.

In some embodiments, video timeline window 460 and/or zoom/scroll bar 470 allow a user to select one or more video segments defined by a hierarchical segmentation. As explained above, in some embodiments, the finest granularity of a hierarchical segmentation defines a set of video segments (also called clip atoms), and coarser levels of the hierarchy define video segments that can be thought of clusters video segments from finer levels. Although some embodiments refer to video segments, it should be understood that, in some cases, a video segment at a particular level of hierarchical segmentation is a cluster of video segments from a finer level. Thus, in some embodiments, interactions with video segments should be understood to include interactions with hierarchical clusters of (more granular) video segments.

In some embodiments, an interaction element such as clip detail control 430 of FIG. 4 is provided to allow the user to navigate to a different level of a hierarchical segmentation of a video timeline. In the example in FIG. 4, clip detail control 430 includes two buttons, one that transitions to a lower level (e.g., finer video segments) and one that transitions to a higher level (e.g., coarser video segments). Other non-limiting examples of possible interaction elements for controlling the level of the hierarchy include a slider, scroll bar, dial, drop-down menu, input field, and/or others. In another example, the level of the hierarchy is adjusted level based on the zoom level (e.g., as the user zooms in, the hierarchy level becomes finer). In various embodiments, when the user navigates to a different hierarchy level, the video timeline, the selection of video segments displayed on the video timeline window, and/or the composite list of metadata segments presented in a metadata panel are updated to reflect the boundaries of the selected hierarchy level, allowing for a refined selection of a portion of the video through selection of video segments and/or metadata segments with different levels of granularity.

Figure 5A:
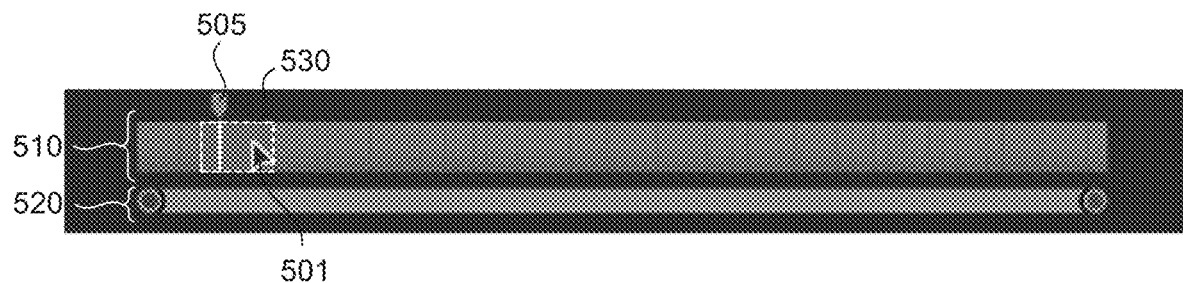
FIGS. 5A-5I are illustrations of example interactions with hierarchical clusters of video segments using a video timeline window and/or a zoom/scroll bar, in accordance with embodiments of the present invention.

FIGS. 5A-5I are illustrations of example interactions with hierarchical clusters of video segments using a video timeline window and/or a zoom/scroll bar, in accordance with embodiments of the present invention. For example, FIG. 5A shows an embodiment with video timeline window 510 segmented according to a particular level of a hierarchical segmentation, playback cursor 505 showing a current playback position of the video, and zoom/scroll bar 520 (described in more detail below). FIG. 5A also shows selection cursor 501 prior to the user making a selection. In this example, selection cursor 501 is illustrated as an arrow icon, indicating the user has not clicked or otherwise used selection cursor 501 to initiate a selection. In this embodiment, video segment 530 is outlined but not shaded, indicating selection cursor 501 is hovered over video segment 530 without selecting video segment 530. Various ways of emphasizing different selection states are described in more detail below.

In some embodiments, when a user selects a video segment presented on video timeline window 510 (e.g., by clicking or tapping a portion of the timeline between two boundaries), the video segment is selected and the selection snaps to the boundaries of the video segment. Various embodiments support selection of multiple video segments, for example, using a click (or tap and hold) and drag operation, by toggling a multiple selection (e.g., control+ multiple clicks), and/or other using other any suitable technique. In some embodiments, when the user selects a video segment (e.g., using a click, a drag operation, and/or otherwise), the first frame of the selected video segment is displayed in video playback panel 410 (e.g., as opposed to the frame in the middle of the segment corresponding to position on the timeline where the user clicked).

In some embodiments, video timeline window 510 supports a click and drag operation (or tap, hold, and drag operation) to select multiple video segments. In an example embodiment, an initial click (or tap) on a video segment that is not part of an existing selection serves to select and emphasize (e.g. highlight) the video segment. By clicking and dragging from a selected segment to an unselected segment, the selection is expanded to include the unselected segment. As the drag operation crosses the boundary between the selected and unselected segment, the selection expands, snapping to the segment boundary of the previously unselected segment. On the other hand, reversing direction and dragging from an outer or most recently selected segment to an inner or previously selected segment reduces the selection by deselecting the outer or most recently selected segment. As the drag operation crosses the boundary between an outer segment in the selection and an inner segment in the selection, the selection shrinks by snapping to the boundary between the inner and outer segments (de-selecting the outer segment). As such, if the user clicks and drags across multiple video segments on video timeline window 510, the drag operation adds video segments to the selection (e.g., as the drag operation expands the selection) or removes video segments from a selection (e.g., as the drag operation reduces the selection). Thus, a user can drag across a video timeline to make a selection that snaps to video segment (e.g., cluster) boundaries.

Figure 5B:
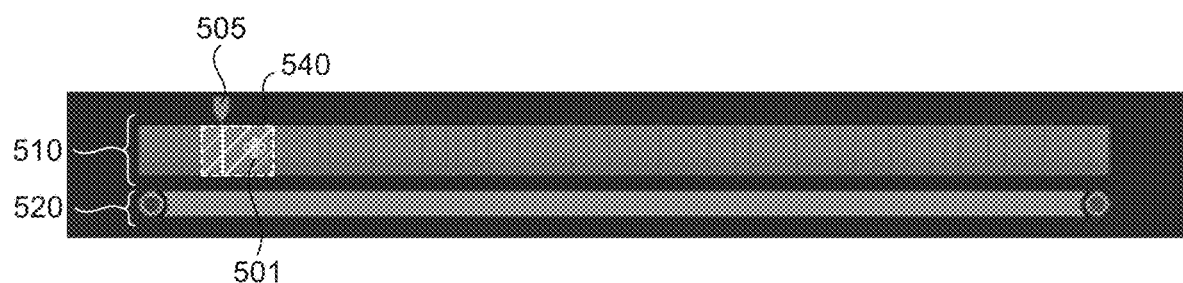
Figure 5C:
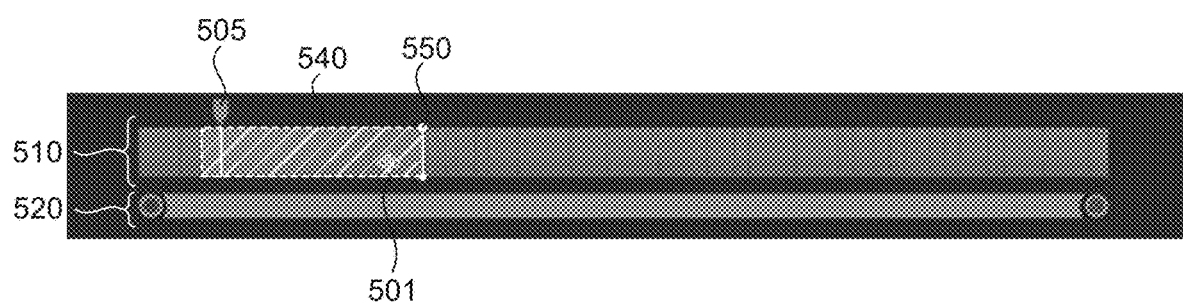

FIGS. 5B-5C illustrate an example click and drag operation. For example, in FIG. 5B, the user clicks on a video segment and holds, which selects the video segment, displays selection 540 emphasizing (e.g., highlighting) the selected video segment, and changes selection cursor 501 from an arrow icon in FIG. 5A to a selection icon in FIG. 5B. (In some embodiments, the icon used for selection cursor 501 depends on whether the user is making an active selection.) In FIG. 2C, the user continues the drag operation by dragging selection cursor 501 to the right along video timeline 510. As the user clicks and drags, when selection cursor 501 crosses a boundary of the hierarchical segmentation, selection 540 expands by snapping to the subsequent boundary for the selected segment. In the example illustrated in FIG. 5C, the boundary of selection 540 that is being moved (e.g., boundary 550) is emphasized in a different way than the other boundary of selection 540 that is not being moved. For example, boundary 550 is illustrated as a handle with two end points. As the drag operation crosses a segment boundary, the handle snaps the next segment boundary.

Figure 5D:
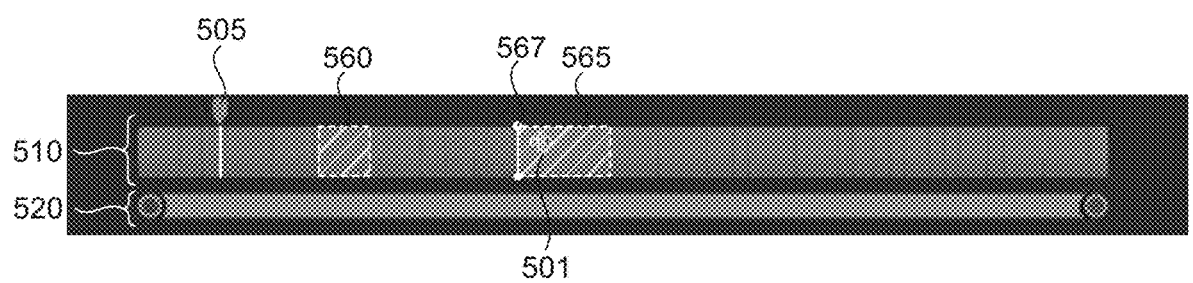

FIG. 5D illustrates multiple selections 560 and 565 of disjoint video segments. For example, a user might first click on a video segment highlighted by selection 560, input some command toggling a multiple selection (e.g., by holding the control key), and then initiating a click and drag operation to add selection 565 to the multiple selection. In this example, left boundary 567 of selection 565 is illustrated as a handle, indicating left boundary 567 of selection 565 is the selection boundary being modified (e.g., as the drag operation moves to the left). In some cases when there are multiple disjoint selections, when a drag operation defining one selection crosses into a second selection (or advances to the point that the first selection overlaps with the second selection), the two selections are collapsed into one composite selection. In some embodiments, the original disjoint selections are maintained such that reversing the drag operation removes the overlap and reinstates the original disjoint selections.

In another example, dragging across an initial click location in a drag operation and into an adjacent segment de-selects the initially clicked segment and selects the adjacent segment. In other words, in this example, if a user clicks a first segment (which selects the first segment) and drags right, but then changes direction and drags to the left of the first segment, the first segment is de-selected, and the segment to the left of the first segment is selected. As such, the drag operation can continue along either direction of the video timeline, snapping to segment boundaries while dragging along the timeline.

In some embodiments, a zoom bar and/or a scroll bar (such as zoom/scroll bar 520) controls the view of the video timeline presented in video timeline window 510. For example, in in the embodiment a zoom/scroll bar includes a thumb (or bar) that can be dragged along a track (or trough). In some cases, the thumb has independently moveable (e.g., draggable) endpoints that control a corresponding location on the video timeline presented in the window. Thus, in some embodiments, resizing the thumb zooms in and out of the timeline window, and/or dragging the thumb along the track scrolls the video timeline through video timeline window 510.

Figure 5E:
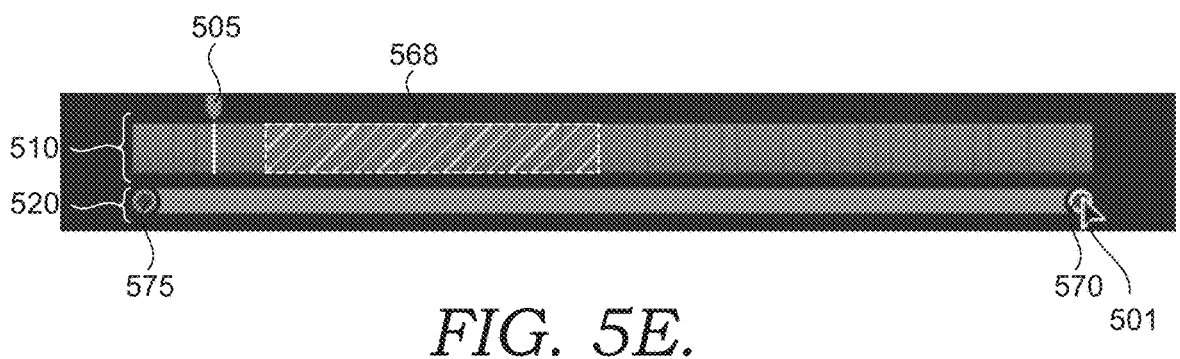
Figure 5F:
Figure 5G:
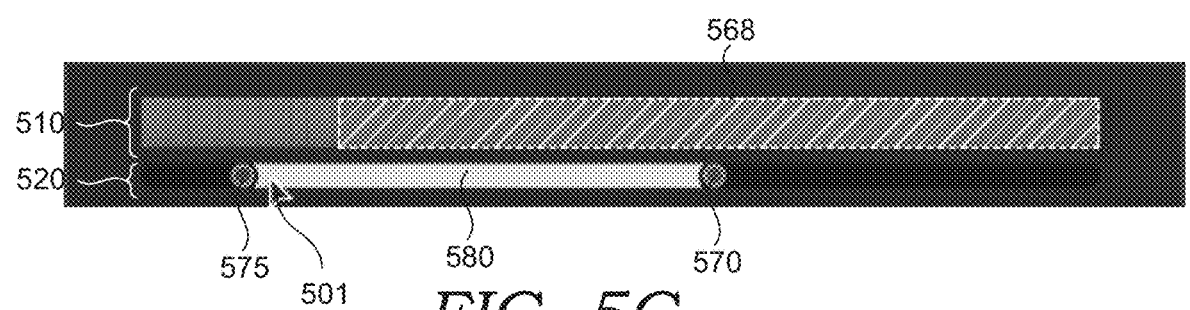

For example, continuing with the example illustrated in FIG. 5D, assume the user expands selection 565 to include selection 560, and the two selections are collapsed to form selection 568, as illustrated in FIG. 5E. FIGS. 5E-5G depict examples of zooming and scrolling across video timeline window 510 (and selection 568) using zoom/scroll bar 520. In FIG. 5E, zoom/scroll bar 520 is illustrated with a thumb having endpoints 570 and 575. In this example, the thumb takes up the entire track of zoom/scroll bar 520, so video timeline window 510 displays the entire video timeline, including selection 568. Assume the user moves selection cursor 501 over endpoint 570 of the thumb, as illustrated in FIG. 5E, and moves endpoint 570 from the position illustrated in FIG. 5E to the position illustrated in FIG. 5F. By shrinking the size of the thumb on zoom/scroll bar 520, the user zooms into the video timeline on video timeline window 510, illustrated in FIG. 5F. Accordingly, in FIG. 5F, the appearance of the video segments on video timeline window 510 and of selection 568 grows in size as the user zooms into the video timeline (although selection 568 is not expanded to include any additional video segments).

Assume now that the user further adjusts the locations of endpoints 570 and 575 from the locations illustrated in FIG. 5F to the locations illustrated in FIG. 5G. Accordingly, FIG. 5G illustrates a corresponding zoomed in view of the video timeline and selection 568 in video timeline window 510. In this case, selection 568 has been zoomed in by an amount that its right boundary is no longer visible on video timeline window 510. In this example, thumb 580 is selectable and can be dragged along the track of zoom/scroll bar 520, which serves to scroll the video timeline across video timeline window 510. As such, to view the right boundary of selection 568, the user can grab thumb 580 and drag, for example, to the right.

Figure 5H:
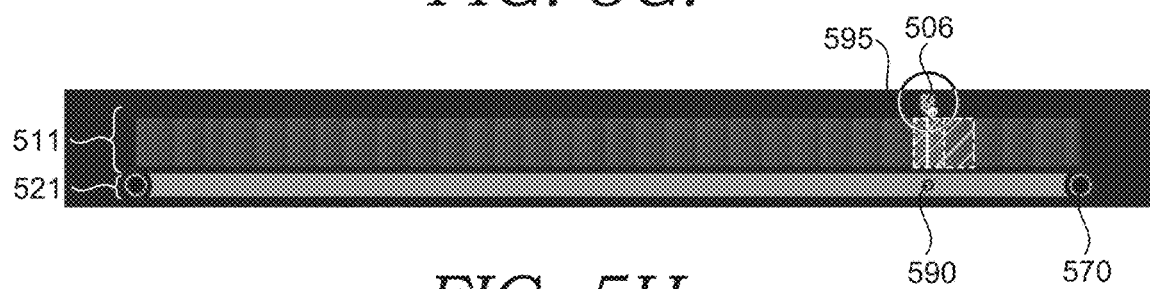
Figure 5I:

FIGS. 5H-5I illustrate another example embodiment that involves zooming/scrolling. For example, FIG. 5H includes video timeline window 511 showing a portion of the video timeline that includes playback cursor 506 and a selection of two video segments. FIG. 5H also includes zoom/scroll bar 521 with playback cursor 590. In this example, playback cursor 506 of video timeline window 511 shows the playback position of the video on the video timeline. Since the view of the video timeline in video timeline window 511 can be zoomed in and out and scrolled left or right, the location of playback cursor 506 indicating a stationary playback position (e.g., paused video) moves through video timeline window 511, depending on how the video timeline is zoomed or scrolled. By contrast, the position of playback cursor 590 on zoom/scroll bar 521 shows the relative location of the playback position with respect to the entire timeline. For example, when video timeline window 511 is zoomed out all the way so the entire video timeline is displayed, the positions of playback cursor 506 and playback cursor 590 track one another, so dragging one cursor has the effect of moving the other cursor the same distance. In FIG. 5H, the user selects playback cursor 506 (causing the mouse icon to change and selection effect 595 to be displayed), and drags to the left or right, which causes both playback cursor 506 and playback cursor 590 to move in synch.

Now assume the user resizes the thumb of zoom/scroll bar 520 by repositioning its endpoints. In some embodiments, when the user grabs on endpoint 570 (causing the mouse icon to change and selection effect 597 to be displayed, as illustrate in FIG. 5I) and moves endpoint 570 from the position illustrated in FIG. 5H to the position illustrated in FIG. 5I, the view of the video timeline presented in video timeline window 511 zooms in. Similarly, the view of the selected video segments zooms in. In this example, since the view of the video timeline is changing (zooming), the relative position of playback cursor 506 on video timeline window 511 moves as zooming changes the view (although the position of playback cursor 506 on the video timeline itself does not change).

By contrast, in this example, zooming into the video timeline (or scrolling the view across the video timeline) does not change the position of playback cursor 590 on zoom/scroll bar 521 because, in this example, the playback position does not change (e.g., because the video is paused). As such, the relative location of the playback position with respect to the entire timeline does not change, so the position of playback cursor 590 on zoom/scroll bar 521 does not change. In other words, in this embodiment, using zoom/scroll bar 521 to change the view of the video timeline on video timeline window 511 (e.g., whether moving the endpoints of the thumb or dragging the thumb across the track) changes the position of playback cursor 506 in the video timeline window 511, but not the position of playback cursor 590 on zoom/scroll bar 521. As such, in this example, playback cursor 506 on video timeline window 511 shows playback position with an adjustable time scale, while playback cursor 590 on zoom/scroll bar 520 shows playback position with a fixed time scale. Presenting multiple indications of playback position at different time scales (e.g., on parallel spectra) provides a simple way of presenting multiple perspectives, enhancing the user's ability to visualize and comprehend the video timeline. It should be understood that this is just an example, and other ways of presenting multiple time scales whether fixed or adjustable are possible. For example, in some embodiments, the position of playback cursor 590 is presented relative to the thumb of zoom/scroll bar 520, rather than (or in addition to) being presented relative to the entire track.

Turning now to FIGS. 6A-6J, FIGS. 6A-6J illustrate example user interfaces for interacting with hierarchical clusters of video segments using metadata panel 604 and/or a metadata search. Generally, metadata panel 604 presents metadata (e.g., transcribed audio and extracted metadata tags) for each video segment. In these examples, metadata panel 604 presents a scrollable, composite list of the metadata for all video segments, and the composite list is segmented into metadata segments at locations that correspond to the boundaries of the level of the hierarchy being viewed. In some embodiments, each of the metadata segments is independently selectable, which emphasizes (e.g., highlights) the selected metadata segment, emphasizes the corresponding video segment on the video timeline in video timeline window 602, moves playback cursors 610 and 612 to locations corresponding to the first video frame of the corresponding video segment, and/or displays the video frame in video player 601.

In some embodiments, a search bar (e.g., search bar 640 of FIGS. 6C-6J) is provided for searching metadata. In these embodiments, a user enters one or more keywords in search bar 640, and extracted metadata associated with the video segments is searched for words that match the keyword search. Examples of extracted metadata include transcribed audio, frequent transcript terms, visually extracted content or action tags, extracted action tags corresponding to extracted software events, and/or other extracted features. In some embodiments, matching video segments (i.e., segments with matching metadata) are emphasized (e.g., highlighted) on the video timeline in video timeline window 602, and/or corresponding matching metadata segments are emphasized (e.g., highlighted) in metadata panel 604. In some embodiments, when the user navigates to a different hierarchy level (e.g. using clip detail control 660 illustrated in FIGS. 6E-H), the video timeline displayed in video timeline window 602 and/or metadata panel 604 are updated to reflect the boundaries of the selected hierarchy level, and the search results (matching video segments and/or metadata segments) are updated based on the boundaries of the selected hierarchy level. Thus, in some embodiments, changing the level of hierarchy during an active search (e.g., with highlighted search results) can transform a set of search results into corresponding coarser or finer segments defined by a different level of the hierarchy, allowing for a more flexible and efficient search experience.

In various embodiments, different types of emphasis are applied to represent different selection states for video segments (e.g., clusters of clip atoms) presented in video timeline window 602 and/or corresponding metadata segments presented in panel 604. For example, some embodiments may apply different types of emphasis to unselected video segments, a video segment corresponding to a current playback position, a video or metadata segment being hovered over, clicked or highlighted video or metadata segments, video or metadata segments with metadata tags that match a keyword search, video segments (and corresponding metadata segments) that have been added to a selection queue (e.g., a playback queue), some combination thereof, and/or others. Examples of different types of emphasis include different colors, gradients, patterns, outlines, shadows, and/or others. In the examples illustrated in FIGS. 6A-6J, different selection states are illustrated with different outline types and/or different greyscale shades.

Figure 6A:
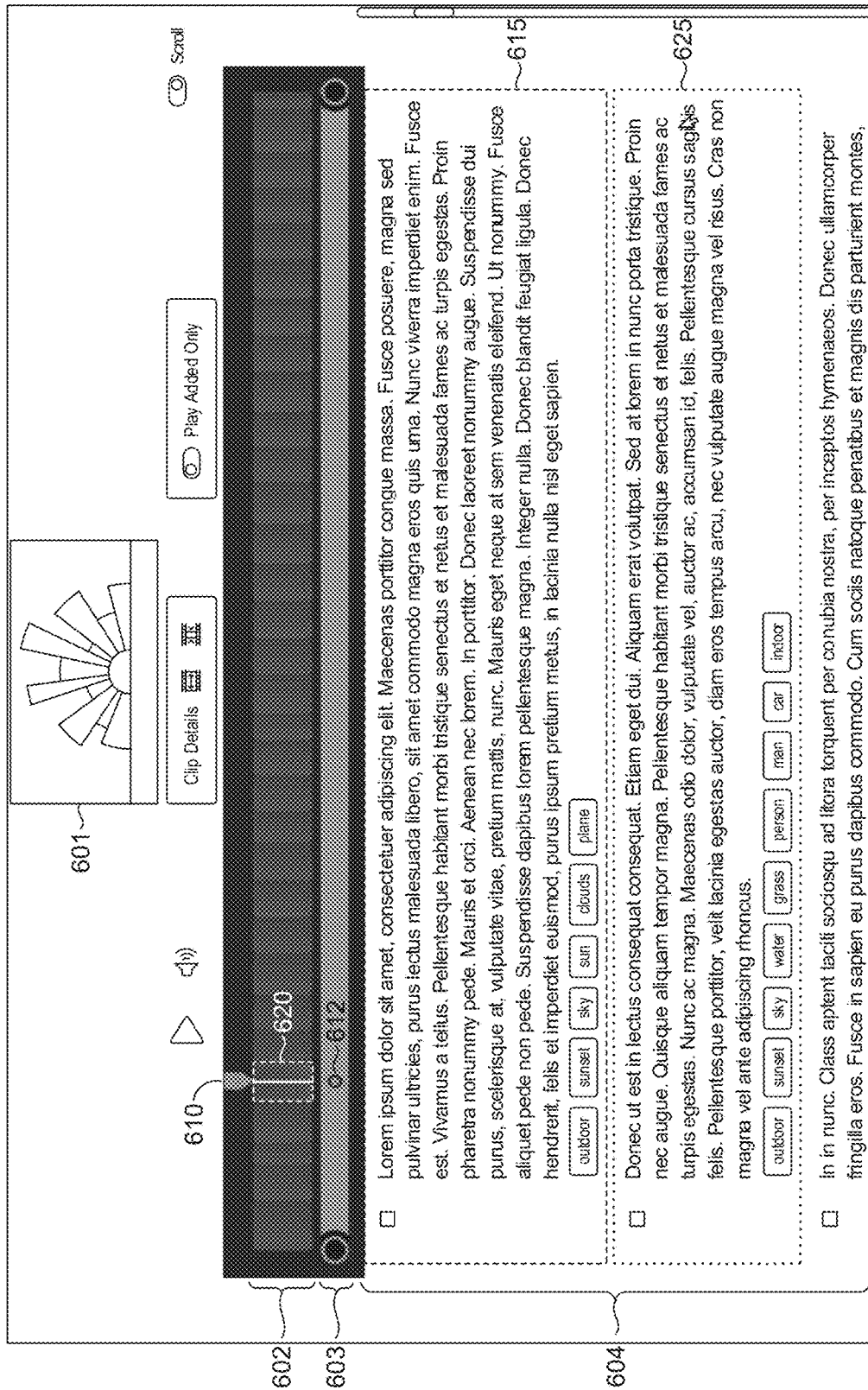
FIGS. 6A-6J are illustrations of example user interfaces for interacting with hierarchical clusters of video segments using a metadata panel and/or a metadata search, in accordance with embodiments of the present invention.

FIG. 6A illustrates an example user interface with video timeline window 602, zoom/scroll bar 603, and metadata panel 604. In this example, metadata panel 604 presents a composite list of metadata segments (e.g., metadata segments 615 and 625) that include extracted metadata such as transcribed audio visually extracted content or action tags. In this example, video segment 620 on video timeline window 602 corresponds to metadata segment 615, which includes a transcription of the voice over from the audio track of video segment 620, as well as visually extracted content or action tags extracted from video frames of video segment 620 (e.g., using one or more neural networks to perform object detection on the video frames). In this example, video segment 620 is outlined using a particular line type, indicating playback cursor 610 is located in video segment 620. Further, video segment 620 and corresponding metadata segment 615 are outlined using the same line type, reflecting their correspondence. As illustrated in FIG. 6A, the video frame in video player 601 corresponding to the position of playback cursor 610 includes a sunset, and corresponding metadata segment 615 includes a corresponding portion of the transcribed audio (illustrated as dummy text) and related content tags, such as outdoor, sunset, sky, sun, and clouds. In the example illustrated in FIG. 6A, metadata segment 625 is outlined using outlined using a line type (different than the line type for the outline of metadata segment 615) indicating metadata segment 625 is being moused over, but has not been selected.

Figure 6B:
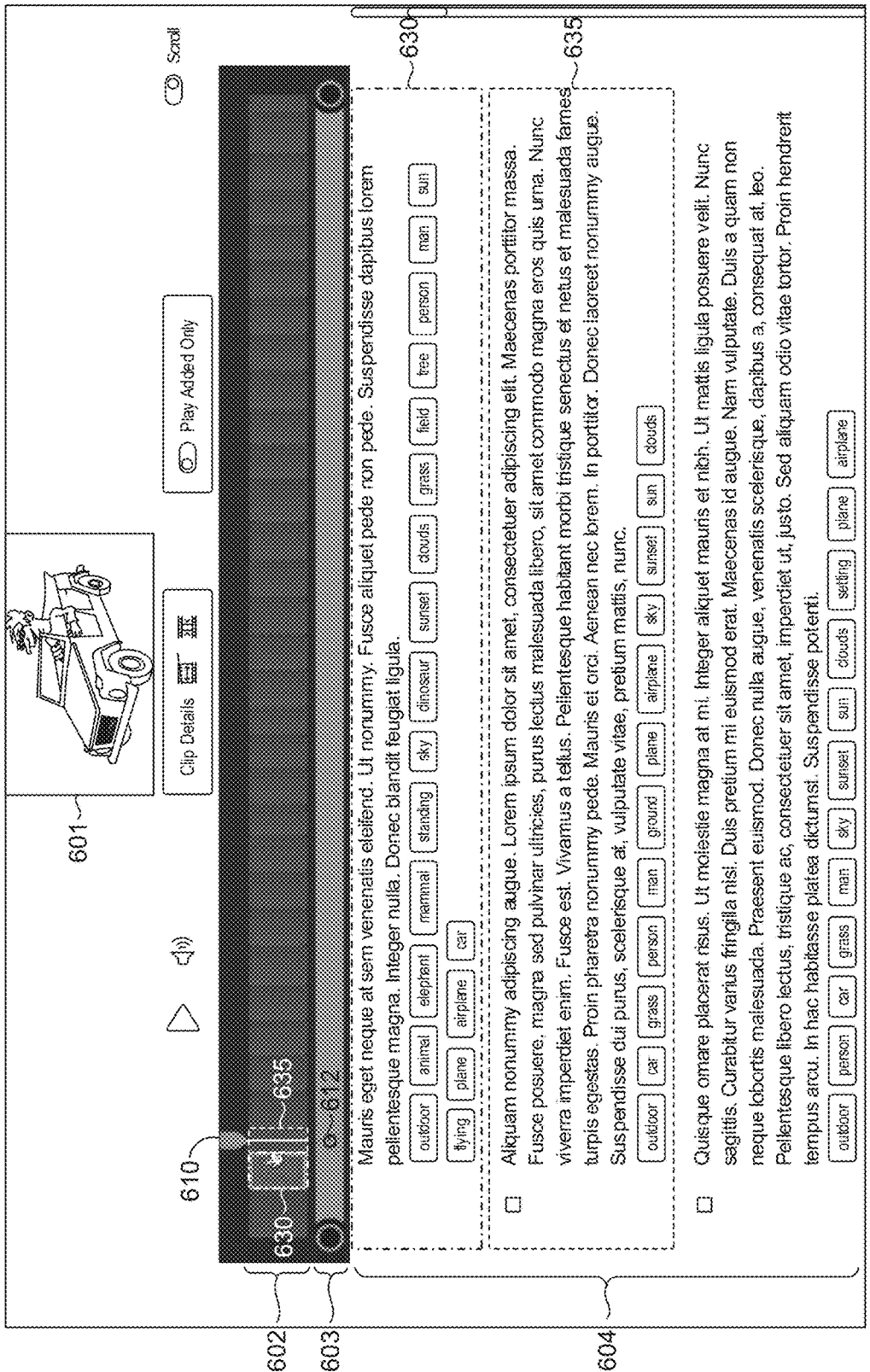

Turning now to FIG. 6B, assume the user clicks on video segment 630 on video timeline window 602 and moves playback cursor 610 to video segment 635. In some embodiments, dragging playback cursor 610 (and/or playback cursor 612) onto a particular video segment automatically scrolls the composite list of metadata in metadata panel 604 to the location of a metadata segment corresponding to the position of the playback cursor. Conversely, in some embodiments, clicking on a particular metadata segment automatically updates the position of playback cursor 610 and/or playback cursor 612 to location associate with a corresponding video segment. In order to illustrate the correspondence between video and metadata segments in FIG. 6B, corresponding segments are labeled with the same reference number and outlined using the same line type. Thus, video segment 635 in video timeline window 602 and corresponding metadata segment 635 in metadata panel 604 are outlined using a first line type indicating playback cursor 610 is located in video segment 635. Furthermore, video segment 630 in video timeline window 602 and corresponding metadata segment 630 in metadata panel 604 are outlined using a second line type indicating the user has clicked on one of the segments.

Figure 6C:
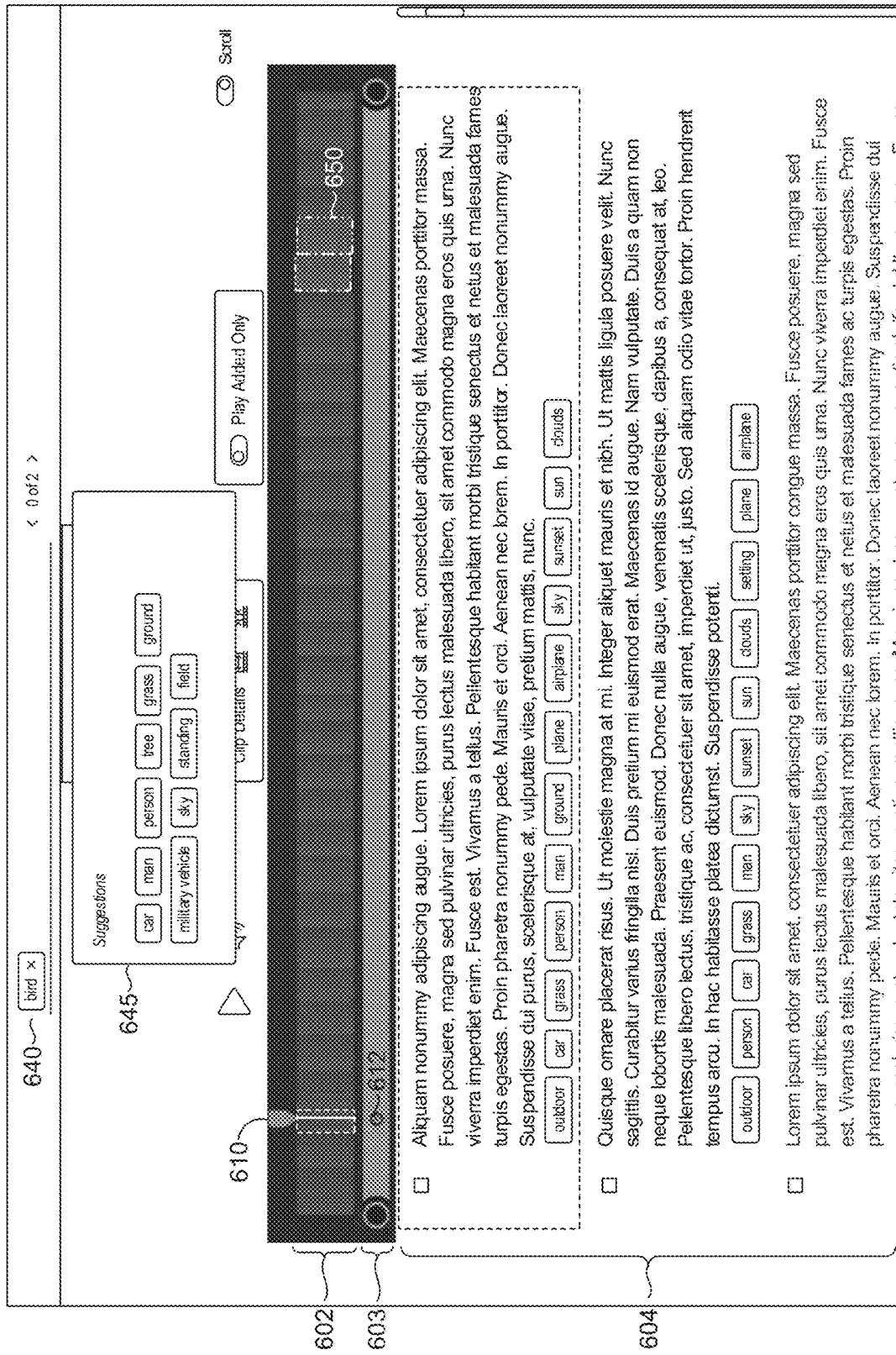

FIG. 6C illustrates an example keyword search of video metadata. In FIG. 6C, a user navigates to search bar 640 and starts typing. In some embodiments, when a user enters search bar 640 and/or starts typing, pop-up 645 is presented with keyword suggestions, for example, corresponding to the most frequent n keywords and/or metadata tags for the video. Depending the implementation, any suitable metric is used to identify top keywords or metadata tags (e.g., total number of keyword occurrences in the entire transcript, counting any number of occurrences of keywords in a particular metadata segment once, counting metadata tags once for each video frame from which a metadata tag was extracted, counting metadata tags once for each metadata segment that includes a tag, counting occurrences based on metadata segments corresponding to a particular hierarchy level such as an active level being viewed, and/or other examples).

Continuing with the example illustrated in FIG. 6C, assume the user types in the keyword "bird" into search bar 640 and executes the search. In this example, the metadata for the video (e.g., the composite list presented in metadata panel 604 and/or the transcript) is searched for matches. FIG. 6C illustrates an example in which video segments 650 have metadata that matches the keyword search. Note that in FIGS. 6A-6J, the metadata segments are illustrated using dummy text to represent transcribed audio, so matching keywords are not illustrated. In some embodiments, upon detecting a match, video segments 650 and/or corresponding metadata segments in metadata panel 604 are emphasized to indicate the match. In some cases, video segments 650 are outlined with a particular line type indicating video segments with metadata that matches a keyword search. In the example illustrated in FIG. 6C, all search results are emphasized the same way, but this need not be the case. For example, in some embodiments where the transcript is not part of the metadata, results from metadata-keyword matches are emphasized differently (e.g., in a different color) than results from transcript-keyword matches. In some embodiments, upon detecting matching video segments, the matching video segments are animated on video timeline window 602 (e.g., with a jitter or oscillation). In some cases, a transient jitter or oscillation is induced on matching video segments, where the movement is in a direction perpendicular or parallel to the direction of the video timeline. In some embodiments, the animations of matching video segments are synchronized, whether in phase or out of phase. For example, in some embodiments, a transient jitter or oscillation is induced on successive matching video segments at a particular interval, giving the appearance of a traveling wave down the video timeline, affecting only the matching video segments. In FIG. 6C, matching video segments 650 are illustrated with a slight displacement relative to one another to illustrate an example traveling wave effect.

Figure 6D:
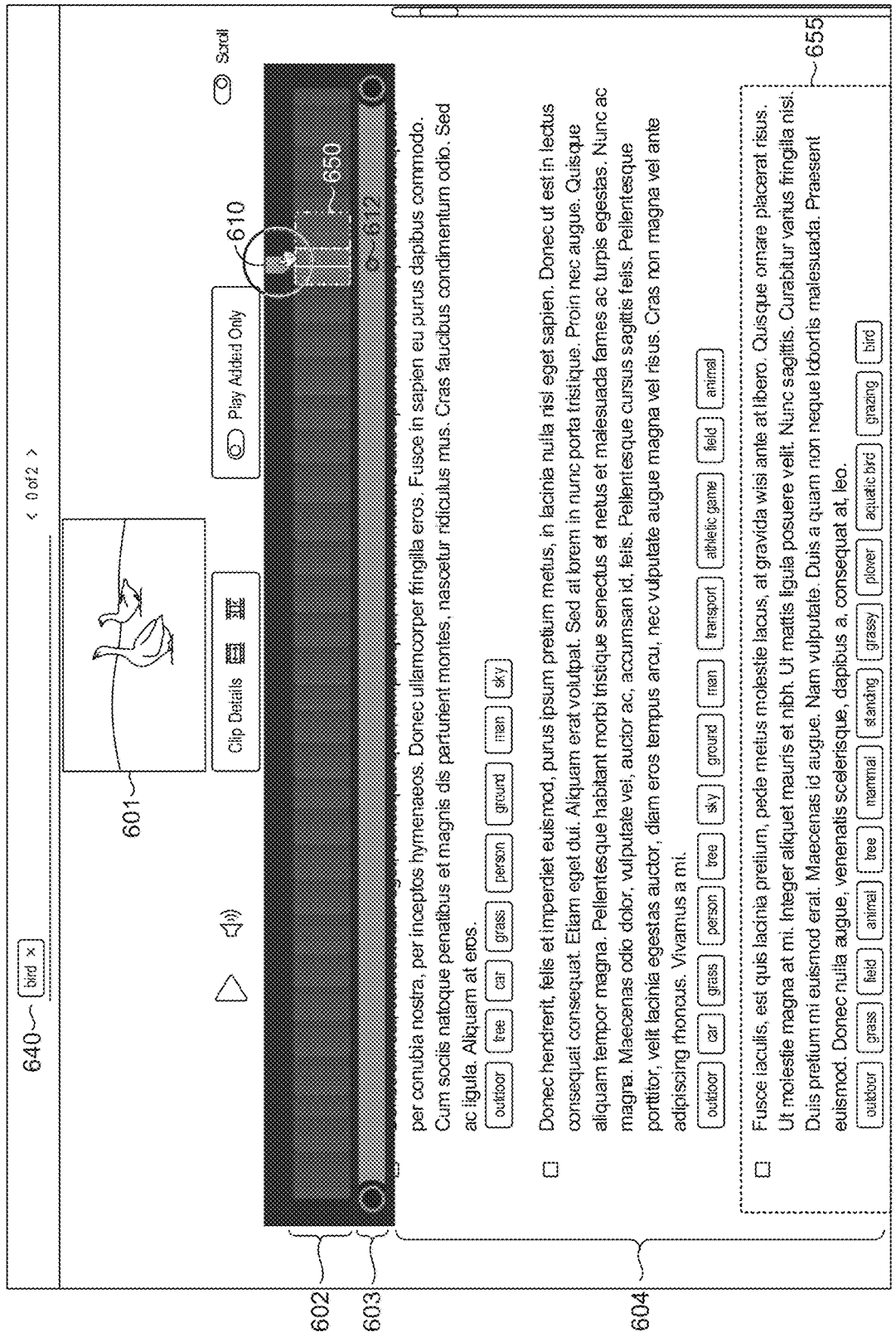

Turning now to FIG. 6D, assume the user drags playback cursor 610 over to matching video segments 650. In response, metadata panel 604 scrolls to display corresponding metadata segments (e.g., metadata segment 655). In some embodiments, different emphasis is applied to a matching segment when playback cursor 610 is located within the matching segment, as illustrated by the two different video segments of matching video segments 650 in FIG. 6D.

Figure 6E:
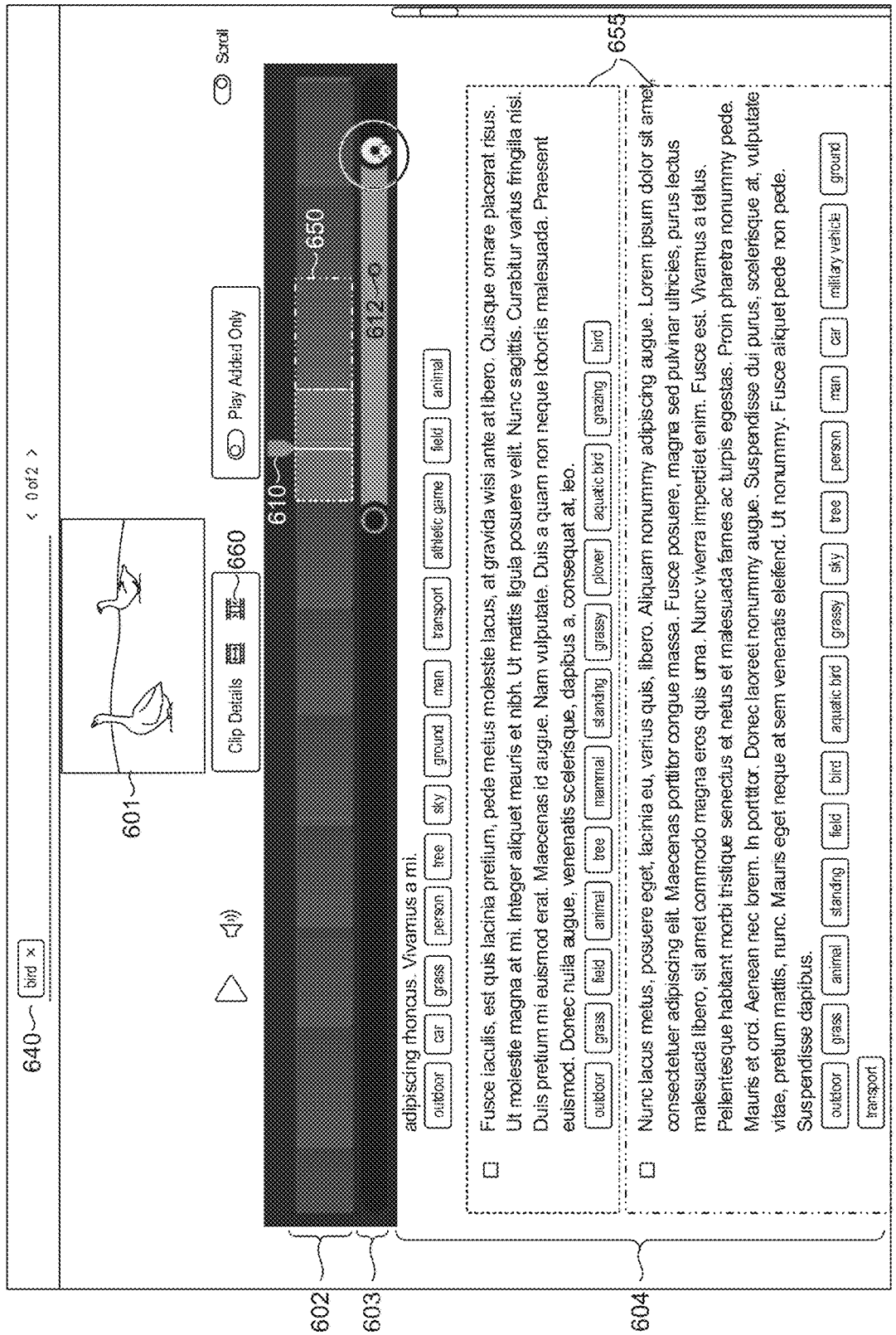
Figure 6F:
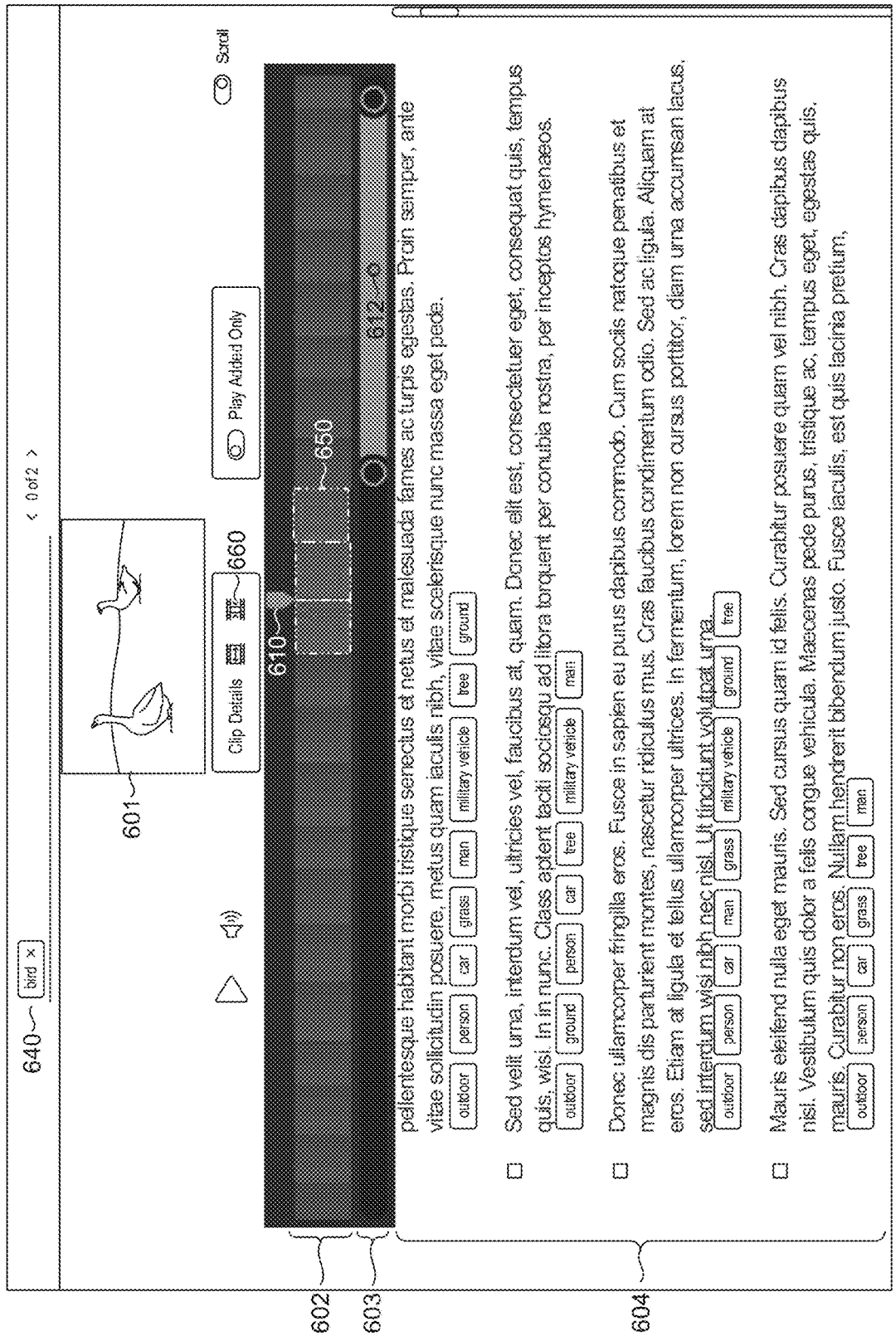
Figure 6G:
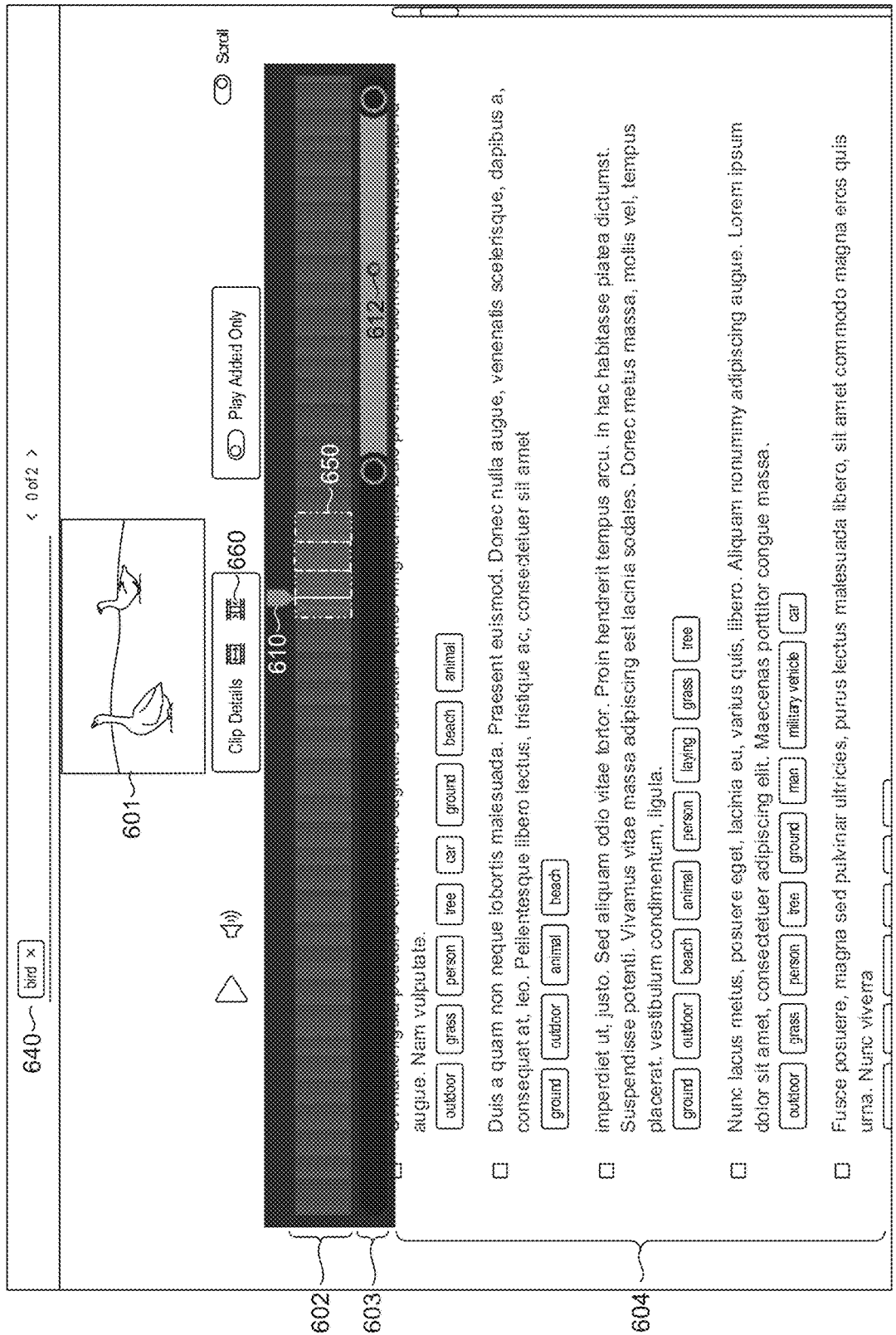
Figure 6H:
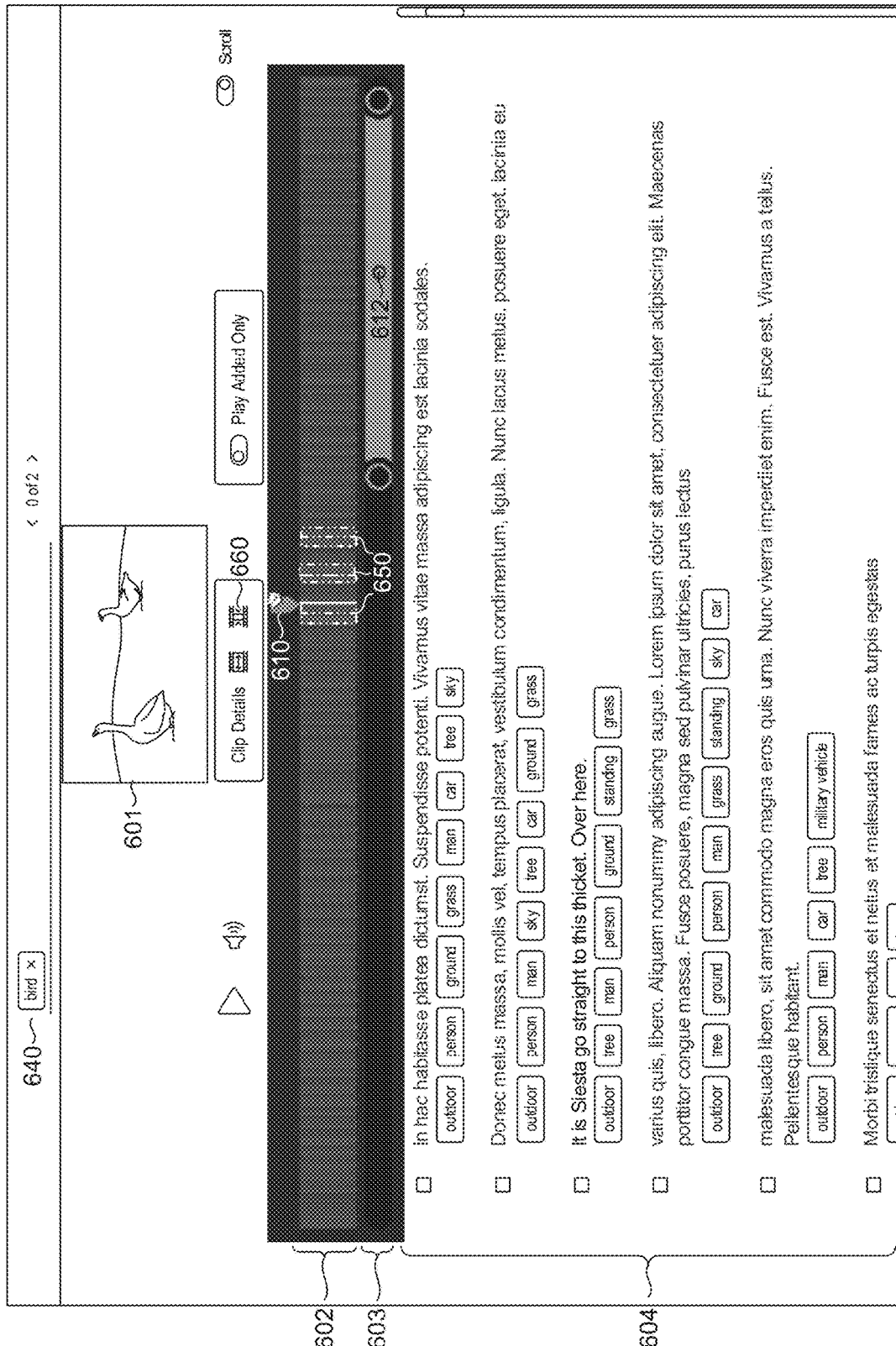

Assume now the user wants to take a closer look at the matching video segments. Accordingly, the user resizes the view of the video timeline in video timeline window 602 using zoom/scroll bar 603 to zoom into matching video segments 650, as illustrated in FIG. 6E. Note that in this example, matching video segments 650 are illustrated with different emphasis depending on whether playback cursor 610 is within a matching video segment. Similarly, corresponding matching metadata segments 655 are also illustrated with corresponding different emphases.

Until now, the user has been searching and interacting with video segments corresponding to a particular level of a hierarchical segmentation. Assume the user wants to view search results with a finer granularity. As such, the user can click on the right button in clip detail control 660 to change the level of the hierarchy to display video and metadata segments with finer granularity. In some cases, navigating to a finer level of granularity in a hierarchical segmentation is equivalent to displaying smaller (or finer) semantic clusters. In this example, changing from a coarser to a finer level of the hierarchy changes boundaries displayed on the video timeline in video timeline window 602 (including matching video segments 650) and the metadata in metadata panel 604 (including matching metadata segments 655) from the locations illustrated in FIG. 6E to the locations illustrated in FIG. 6F. Subsequent clicks of the right button in clip detail control 660 change the boundaries from the locations illustrated in FIG. 6F to the locations illustrated in FIG. 6G to the locations illustrated in FIG. 6H. Note that since transcribed audio is represented using dummy text in these figures, the correspondences between transcribed audio and corresponding video segments, and between coarser and finer metadata segments, are not illustrated. In some embodiments, when changing hierarchy levels, an animation (e.g., a jitter or oscillation) is applied to the matching video segments corresponding to an updated hierarchy levels.

Figure 6I:
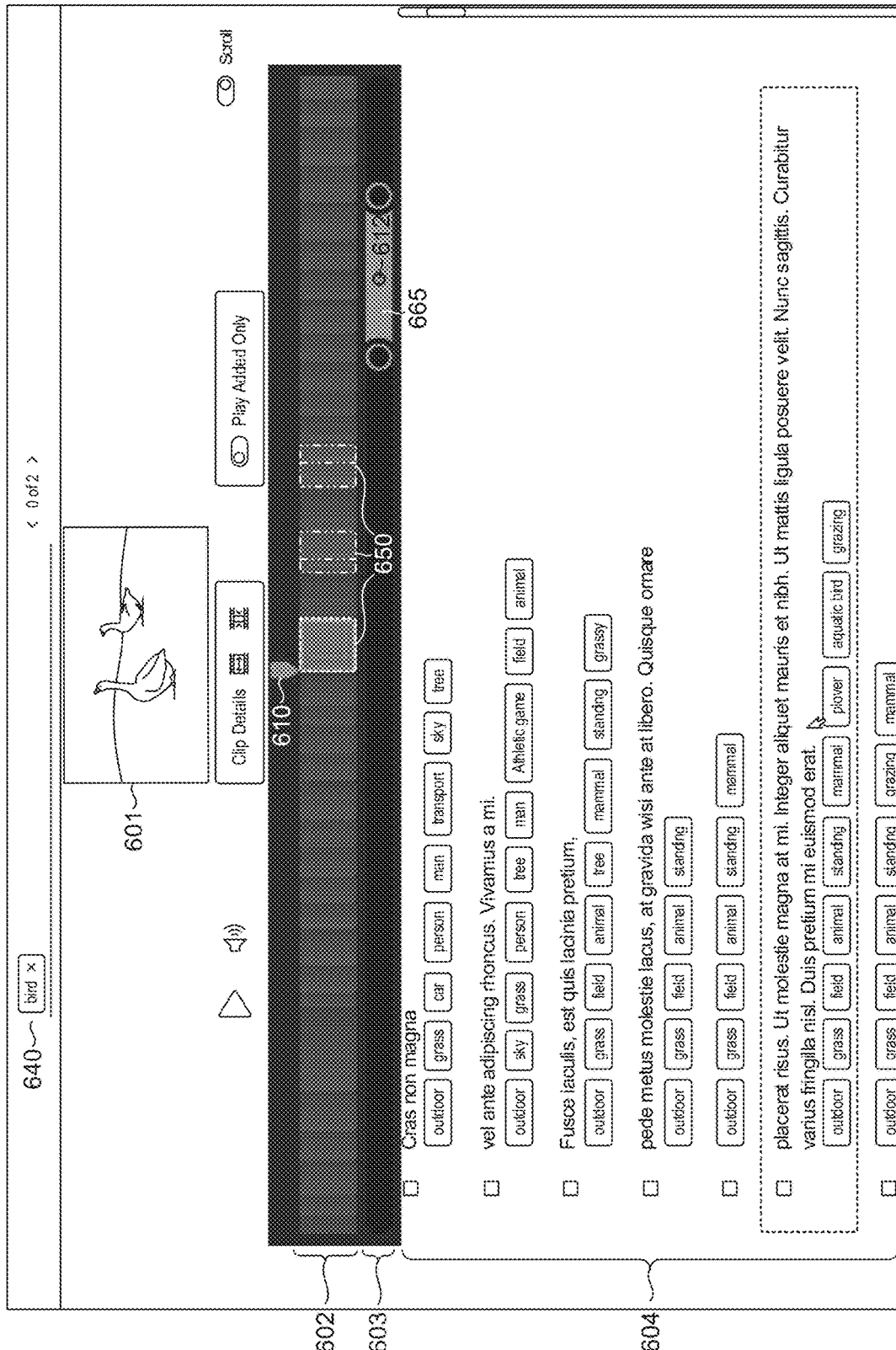

From FIG. 6E to FIG. 6F to FIG. 6G to FIG. 6H, matching video segments 650 and matching metadata segments 655 are split up into smaller segments, enabling the user to view search results and/or define a selection with more precision. For example, in FIG. 6G, notice how matching video segments 650 form a continuous portion of the video timeline, whereas in FIG. 6H, matching video segments 650 are shown with finer clip detail such that they form disjoint clusters of video segments on the video timeline. In FIG. 6I, the user zooms in by resizing thumb 665 on zoom/scroll bar 603 and clicks on the left most matching video segment 650 to pull up a corresponding matching metadata segment in metadata panel 604. As such, the user can navigate the video timeline using video timeline window 602 and zoom/scroll bar 603, and navigate corresponding metadata segments in metadata panel 604, to interact with semantic video segments with a level of granularity defined by a corresponding level of a hierarchical segmentation.

Figure 6J:
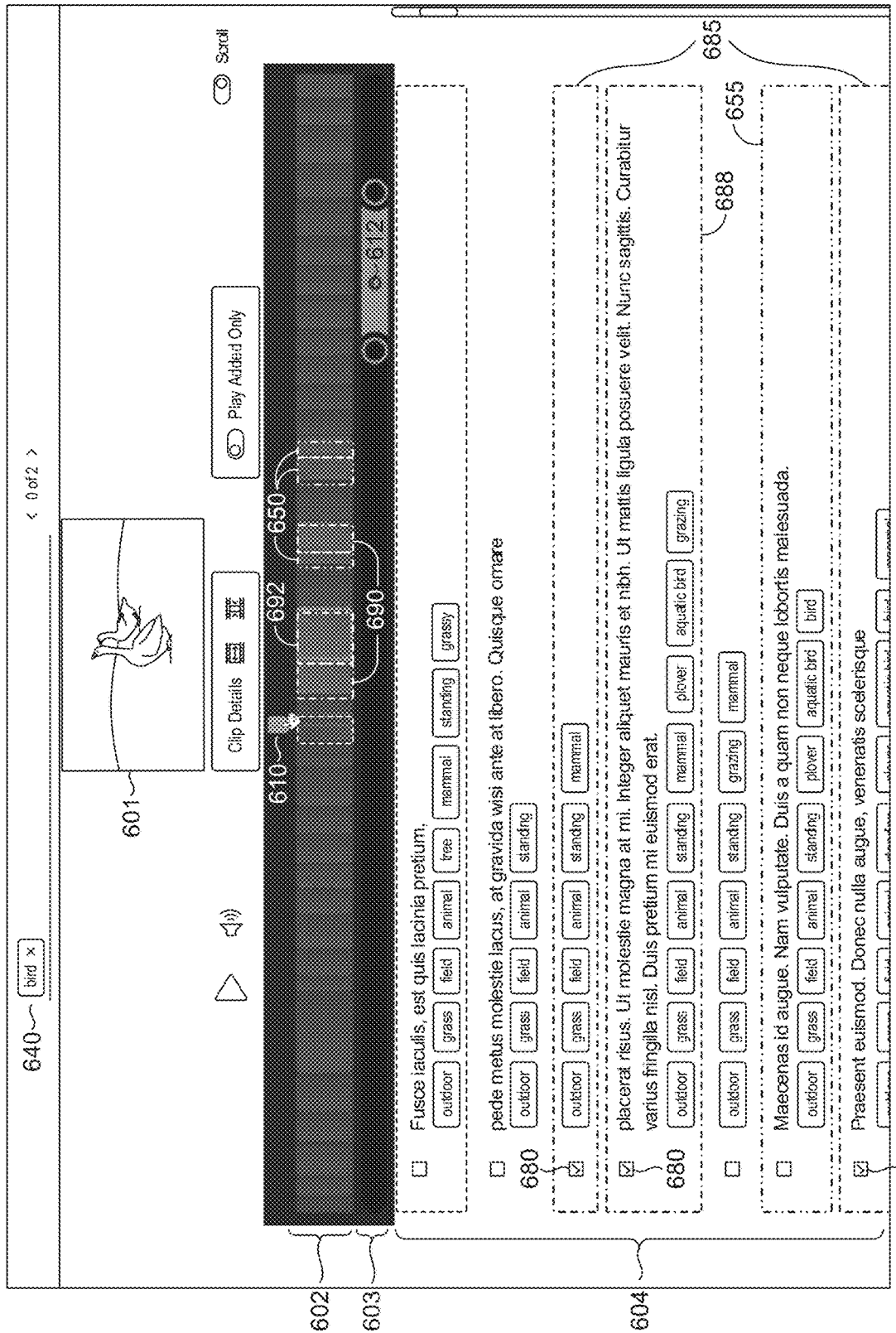

Generally, a user may want to place certain video segments into an operational queue to perform some type of operation on selected video segments. FIG. 6J illustrates an example in which a user assigns video segments to an operational queue by clicking on check boxes 680 in a corresponding metadata segment in metadata panel 604. In this example, the user has activated check boxes 680 for metadata segments 685 and 688. In this example, metadata segments 685 and corresponding video segments 690 are emphasized (e.g., outlined using a particular line type) in a manner that indicates corresponding video segments 690 have been added to the operational queue. Similarly, metadata segment 688 and corresponding video segment 692 are emphasized (e.g., outlined using a particular line type) in a manner that indicates video segment 692 has been added to the operational queue and video segment 692 and/or has metadata segment 688 has been clicked. This example demonstrates a scenario with different selection states for segments that have been selected by clicking or highlighting versus segments that have been selected by activating associated activated check boxes 680. However, in some embodiments, selecting multiple segments from video timeline window 602 (e.g., using a click and drag operation, by toggling a multiple selection and clicking on multiple segments) assigns the selected segments to an operational queue. These are just a few examples, and other selection techniques are possible within the scope of the present disclosure.

Figure 7:
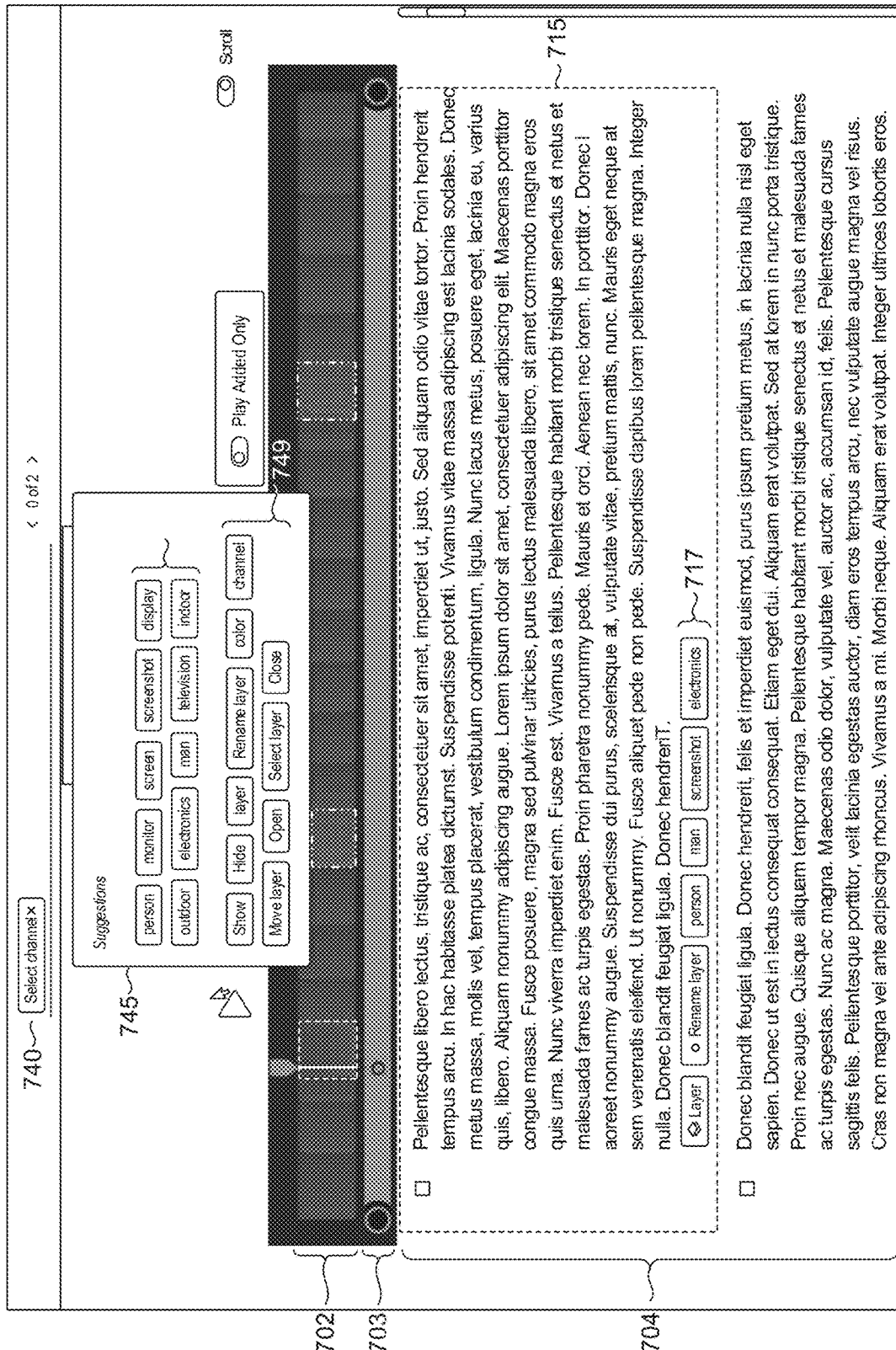
FIG. 7 is an illustration of an example user interface for interacting with hierarchical clusters of video segments based on software log events, in accordance with embodiments of the present invention.

Turning now to FIG. 7, FIG. 7 illustrates an example user interface for interacting with hierarchical clusters of video segments based on software log events, in accordance with embodiments of the present invention. Similar to the examples illustrated in FIGS. 6A-6J, FIG. 7 illustrates an example user interface with video timeline window 702, zoom/scroll bar 703, metadata panel 704, and search bar 740. Whereas the extracted and searchable metadata represented in FIGS. 6A-6J included transcribed audio and visually extracted content or action tags, the extracted and searchable metadata illustrated in FIG. 7 additionally includes action tags corresponding to extracted software events (e.g., software tool events).

In this example, a user has previously recorded a BEHANCE live stream of his PHOTOSHOP usage, which generates a software usage log of the user's actions in PHOTOSHOP. When the recording of the live stream is ingested, the tool events captured in the software usage log are extracted and used to place or otherwise associate searchable action tags (e.g., corresponding to different tool selections, transitions, and/or uses) with corresponding locations on the video timeline. As such, in some embodiments, the action tags (e.g., the locations of the action tags on the video timeline) are associated with corresponding video segments defined by a hierarchical segmentation based on their locations in time. Thus, in some embodiments, the action tags are included in or otherwise associated with the hierarchical segmentation, enabling the action tags to be used as searchable metadata tags to identify matching portions of the video timeline and/or corresponding matching video segments. As such, in this example, metadata segments (e.g., metadata segment 715) are presented in metadata panel 704 with action tags (e.g., action tags 717) corresponding to the tool events that take place in a corresponding video segment.

Similar to the user interface illustrated in FIG. 6C, when a user navigates to search bar 740 and/or starts typing in search bar 740, pop-up 745 is presented with keyword suggestions. In this case, keyword suggestions include separate clusters, cluster 747 of the most frequent n keywords and/or visually extracted tags and cluster 749 of the most frequent n software tool event tags. Whether the user selects one of the suggestions from pop-up 745 or types in keyword and executes the search, the metadata for the video (e.g., the composite list presented in metadata panel 604) is searched for matches. In some embodiments, clicking on a suggestion from pop-up 745 only searches corresponding metadata tags (e.g., selecting a software tool event tag only searches extracted software tool event tags). As such, a metadata search can be used to search any type of extracted metadata and quickly identify matching video segments.

Depending on the implementation, any number and variety of operations are performed on selected video segments (and/or a corresponding portion of the video). For example, video segments selected from a video timeline window (e.g., using a click and drag operation, by toggling a multiple selection and clicking on multiple segments), video segments corresponding to metadata segments selected from a metadata panel (e.g., using a click and drag operation, by toggling a multiple selection and clicking on multiple segments, by checking associated check boxes) are placed in an operational queue. Depending on the implementation, various types of tools are provided to perform a corresponding operation on the video segments in the operational queue. In one example, the video segments in the operational queue are played back (e.g., upon clicking a play button), skipping video segments that are not placed in an operational queue. In another example, the video segments in the operational queue are trimmed (e.g., by removing the unselected video segments), edited in some other way (e.g., by rearranging, cropping, applying transitions or effects, adjusting color, adding titles or graphics), exported, or otherwise. Depending on the implementation, any known tool or technique is used to perform any type of operation on the video segments in the operational queue.

Example Flow Diagrams

With reference now to FIGS. 8-25, flow diagrams are provided illustrating various methods. Each block of the methods 800 through 2500 and any other methods described herein comprise a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

Figure 8:
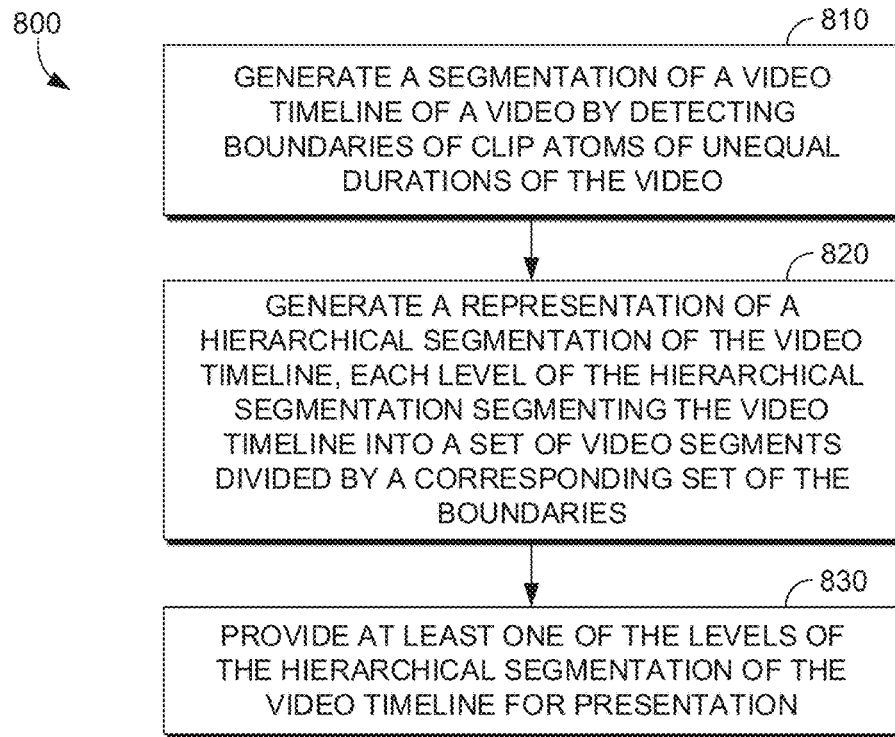
FIG. 8 is a flow diagram showing a method for generating a hierarchical segmentation of a video timeline, in accordance with embodiments of the present invention.

Turning initially to FIG. 8, FIG. 8 illustrates a method 800 for generating a hierarchical segmentation of a video timeline, in accordance with embodiments described herein. Initially at block 810, a segmentation of a video timeline of a video is generated by detecting boundaries of clip atoms of unequal durations of the video. At block 820, a representation of a hierarchical segmentation of the video timeline is generated. Each level of the hierarchical segmentation segments the video timeline into a set of video segments divided by a corresponding set of the boundaries. At block 830, at least one of the levels of the hierarchical segmentation of the video timeline is provided for presentation.

Figure 9:
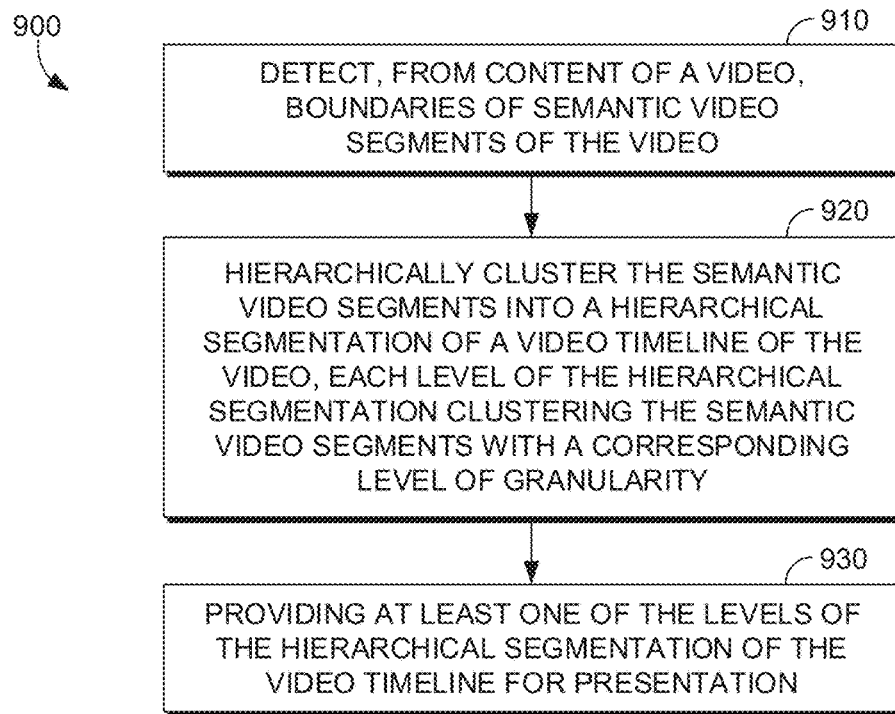
FIG. 9 is a flow diagram showing a method for hierarchically clustering semantic video segments into a hierarchical segmentation, in accordance with embodiments of the present invention.

Turning now to FIG. 9, FIG. 9 illustrates a method 900 for hierarchically clustering semantic video segments into a hierarchical segmentation, in accordance with embodiments of the present invention. Initially at block 910, boundaries of semantic video segments of a video are detected from content of the video. At block 920, the semantic video segments are hierarchically clustered into a hierarchical segmentation of a video timeline of the video. Each level of the hierarchical segmentation clusters the semantic video segments with a corresponding level of granularity. At block 930, at least one of the levels of the hierarchical segmentation of the video timeline is provided for presentation.

Figure 10:
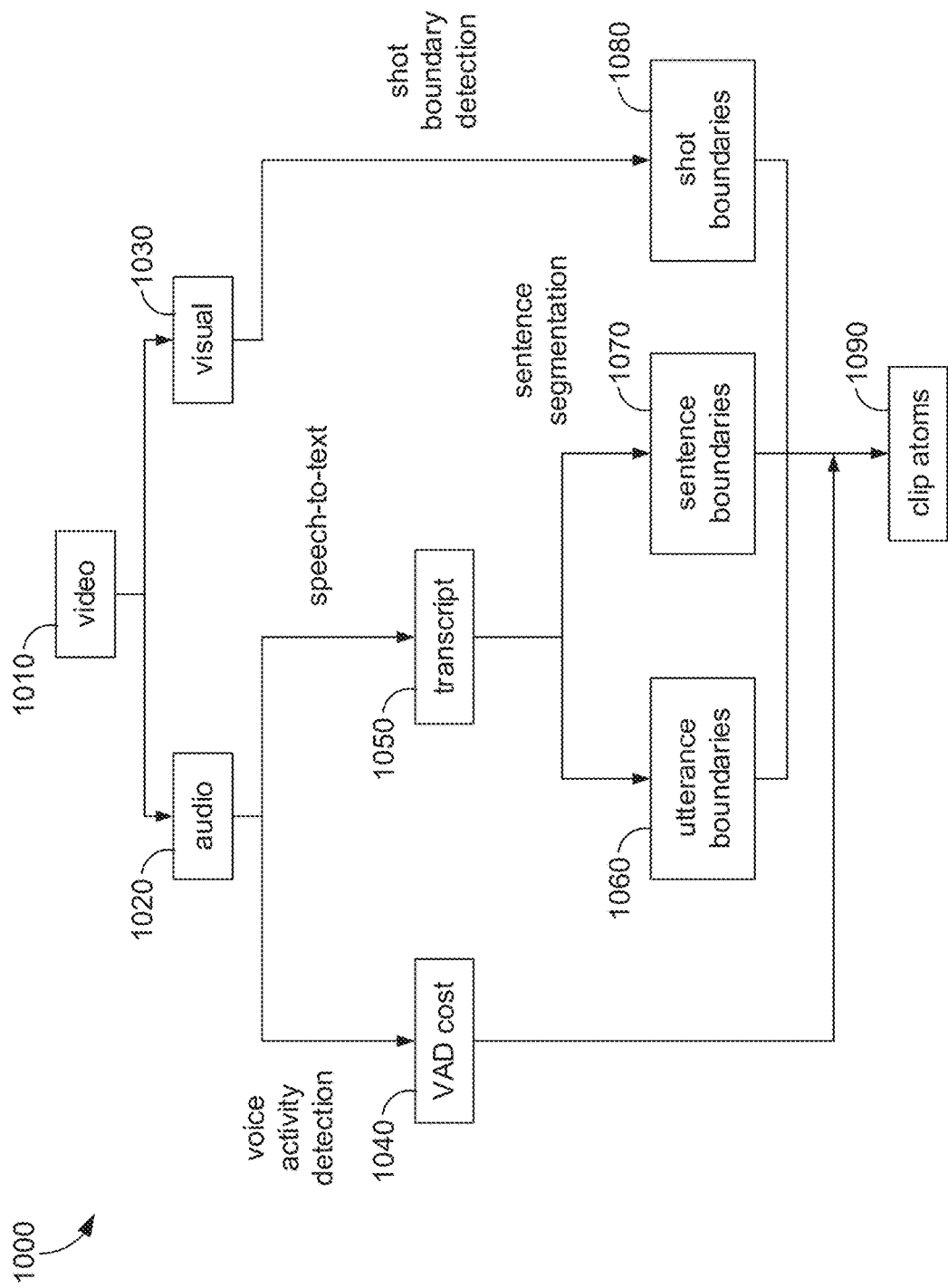
FIG. 10 is a flow diagram showing a method for detecting boundaries of clip atoms, in accordance with embodiments of the present invention.

Turning now to FIG. 10, FIG. 10 illustrates a method 1000 for detecting boundaries of clip atoms, in accordance with embodiments of the present invention. For example, method 1000 illustrates a possible way of performing at least a portion of block 810 of FIG. 8 or block 910 of FIG. 9. Method 1000 starts with video 1010, which is separated into audio component 1020 and visual component 1030 (e.g., an audio track and a video track). Voice activity detection (VAD) is applied to audio component 1020 to generate VAD scores, which are used as VAD cost 1040. Further, audio component 1020 is transcribed using any known speech-to-text algorithm to generate transcript 1050. Transcript 1050 is segmented to identify sentence boundaries 1070 and utterance boundaries 1060 (e.g., word boundaries). The locations of sentence boundaries 1070 and utterance boundaries 1060 in transcript 1050 are mapped to locations on the video timeline of video 1010. On the visual side, visual component 1030 is analyzed to identify shot boundaries 1080 (also called scene boundaries) by detecting abrupt visual changes, and the locations of shot boundaries 1080 are mapped to locations on the video timeline of video 1010. In some embodiments, any number of adjustment rules are applied to move the location of one or more of the boundaries on the video timeline, to merge boundaries, to remove boundaries, or apply some other adjustment. Finally, utterance boundaries 1060, sentence boundaries 1070, and shot boundaries 1080 are used to identify the locations of boundaries for clip atoms of video 1010. In some embodiments, clip atoms 1090 are simply denoted by a list of the boundaries. Additionally or alternatively, clip atoms 1090 are generated as separate video clips.

Figure 11:
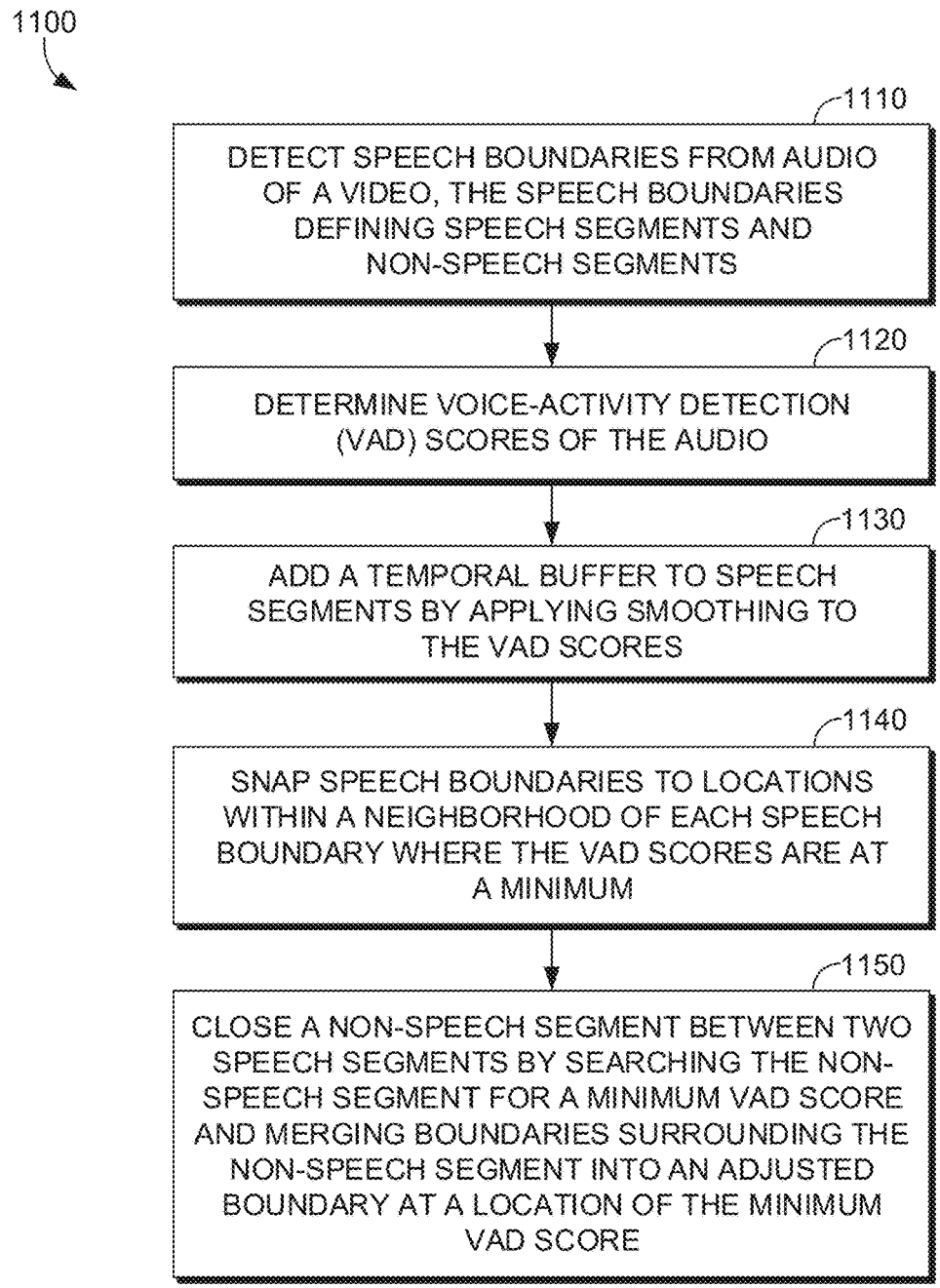
FIG. 11 is a flow diagram showing a method for detecting and adjusting locations of speech boundaries, in accordance with embodiments of the present invention.
Figure 12:
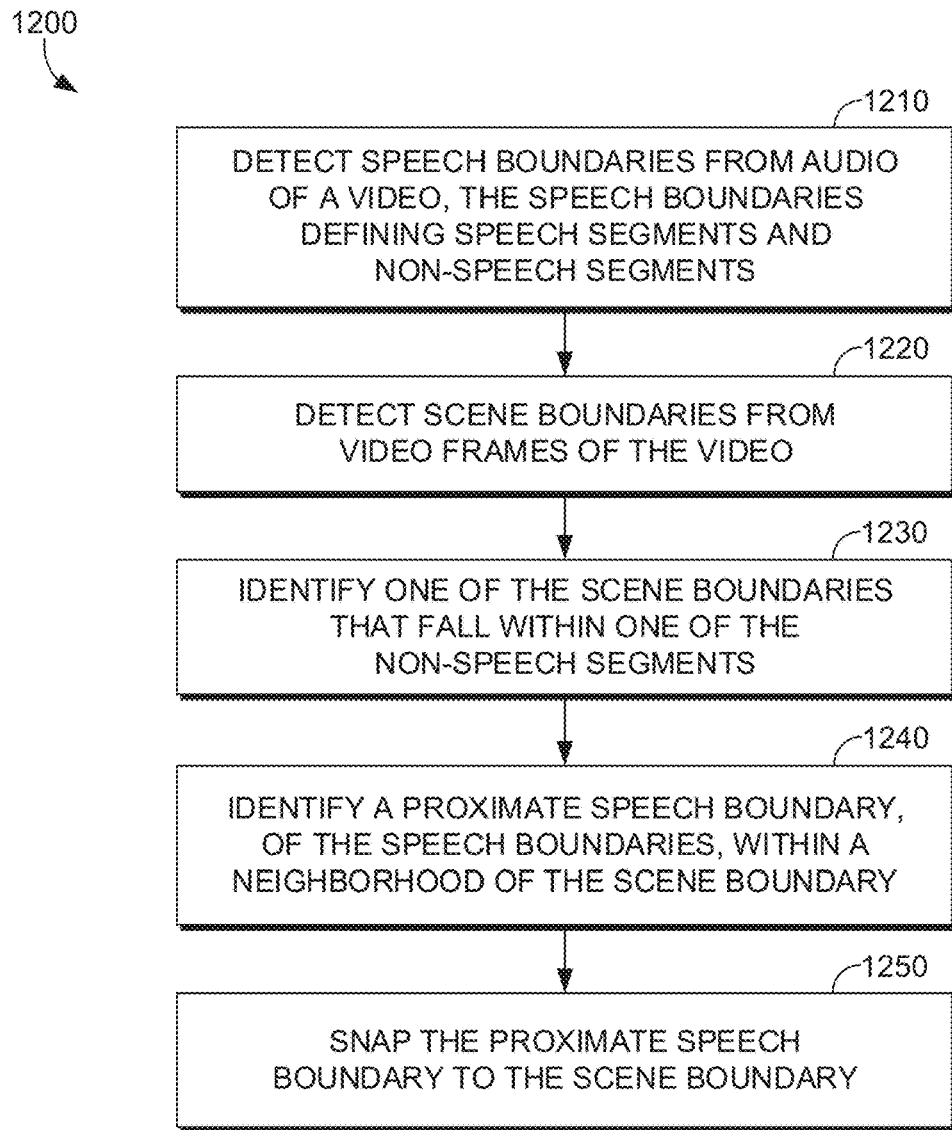
FIG. 12 is a flow diagram showing a method for snapping speech boundaries to proximate scene boundaries, in accordance with embodiments of the present invention.

Turning now to FIG. 11, FIG. 11 illustrates a method 1100 for detecting and adjusting locations of speech boundaries, in accordance with embodiments of the present invention. For example, method 1100 illustrates a possible way of performing at least a portion of block 810 of FIG. 8 or block 910 of FIG. 9. Initially at block 1110, speech boundaries are detected from audio of a video. The speech boundaries define speech segments and non-speech segments. At block 1120, voice-activity detection (VAD) scores of the audio are determined. At block 1130, a temporal buffer is added to the speech segments by applying smoothing to the VAD scores. At block 1140, speech boundaries are snapped to locations within a neighborhood of each speech boundary where the VAD scores are at a minimum. At block 1150, a non-speech segment between two speech segments is closed by searching the non-speech segment for a minimum VAD score and merging boundaries surrounding the non-speech segment into an adjusted boundary at a location of the minimum VAD score Turning now to FIG. 12, FIG. 12 illustrates a method 1200 for snapping speech boundaries to proximate scene boundaries, in accordance with embodiments of the present invention. For example, method 1200 illustrates a possible way of performing at least a portion of block 810 of FIG. 8 or block 910 of FIG. 9. Initially at block 1210, speech boundaries are detected from audio of a video. The speech boundaries define speech segments and non-speech segments. At block 1220, scene boundaries are detected from video frames of the video. At block 1230, one of the scene boundaries that falls within one of the non-speech segments is identified. At block 1240, a proximate speech boundary, of the speech boundaries, that is within a neighborhood of the scene boundary is identified. At block 1250, the proximate speech boundary is snapped to the scene boundary.

Figure 13:
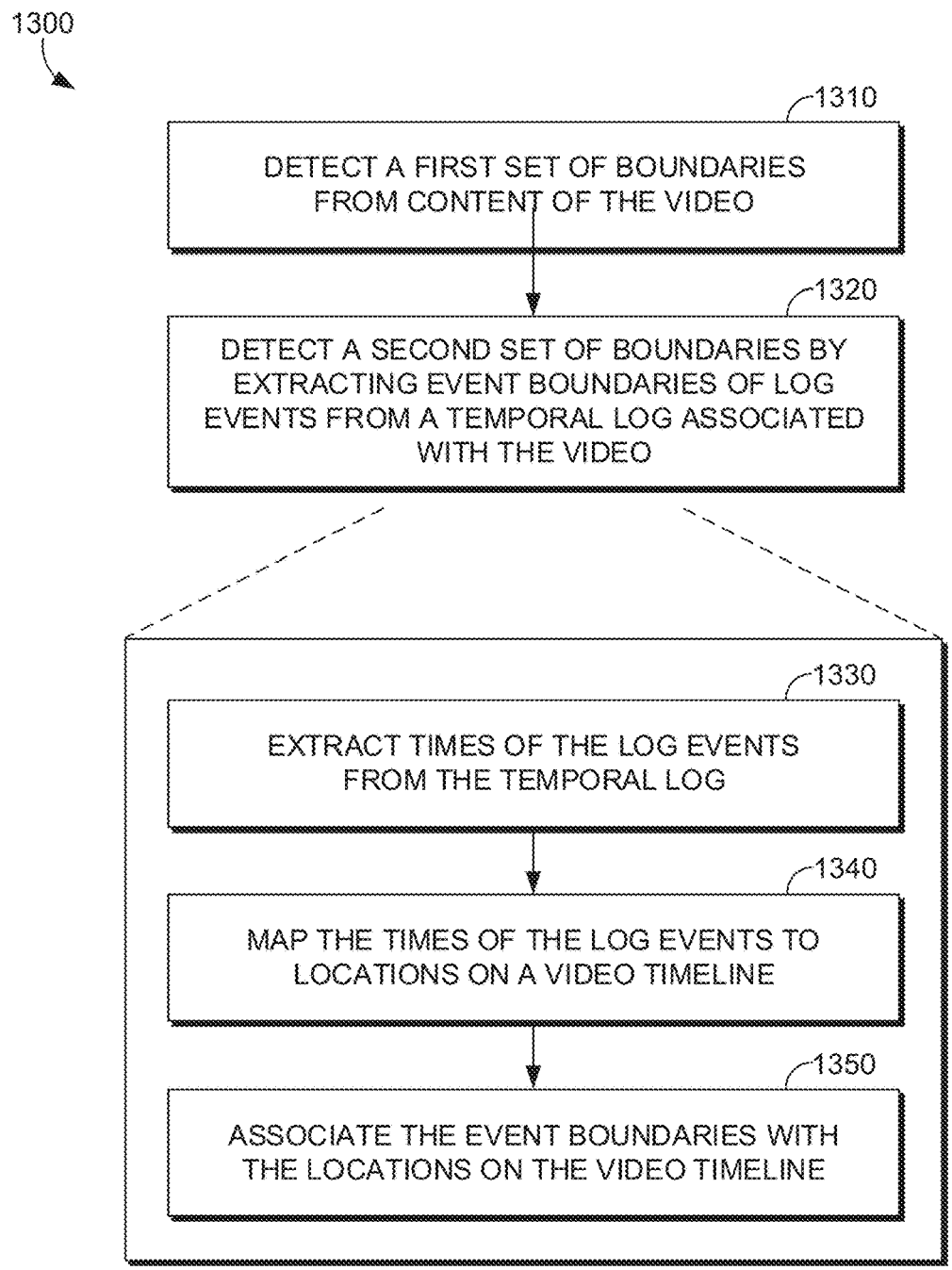
FIG. 13 is a flow diagram showing a method for extracting event boundaries of log events from a temporal log, in accordance with embodiments of the present invention.

Turning now to FIG. 13, FIG. 13 illustrates a method 1300 for extracting event boundaries of log events from a temporal log, in accordance with embodiments of the present invention. For example, method 1300 illustrates a possible way of performing at least a portion of block 810 of FIG. 8 or block 910 of FIG. 9. Initially at block 1310, a first set of boundaries are detected from content of the video. At block 1320, a second set of boundaries are detected by extracting event boundaries of log events from a temporal log associated with the video. In some embodiments, block 1320 is performed using the steps illustrated in blocks 1330-1350. At block 1330, times of the log events are extracted from the temporal log. At block 1340, the times of the log events are mapped to locations on a video timeline. At block 1350, the event boundaries are associated with the locations on the video timeline.

Figure 14:
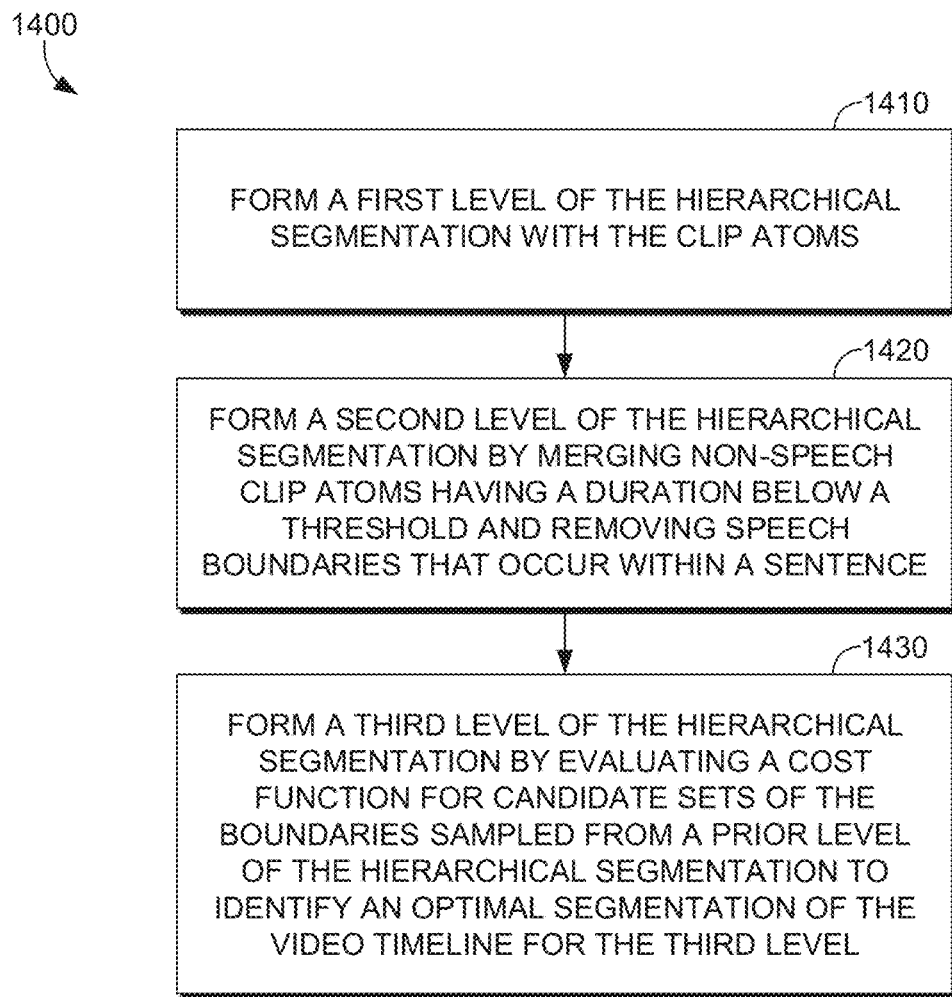
FIG. 14 is a flow diagram showing a method for forming different levels of a hierarchical segmentation, in accordance with embodiments of the present invention.

Turning now to FIG. 14, FIG. 14 illustrates a method 1400 for forming different levels of a hierarchical segmentation, in accordance with embodiments of the present invention. For example, method 1400 illustrates a possible way of performing at least a portion of block 820 of FIG. 8 or block 920 of FIG. 9. Initially at block 1410, a first level of the hierarchical segmentation is formed with the clip atoms. At block 1420, a second level of the hierarchical segmentation is formed by merging non-speech clip atoms having a duration below a threshold and removing speech boundaries that occur within a sentence. At block 1430, a third level of the hierarchical segmentation is formed by evaluating a cost function for candidate sets of the boundaries sampled from a prior level of the hierarchical segmentation to identify an optimal segmentation of the video timeline for the third level.

Figure 15:
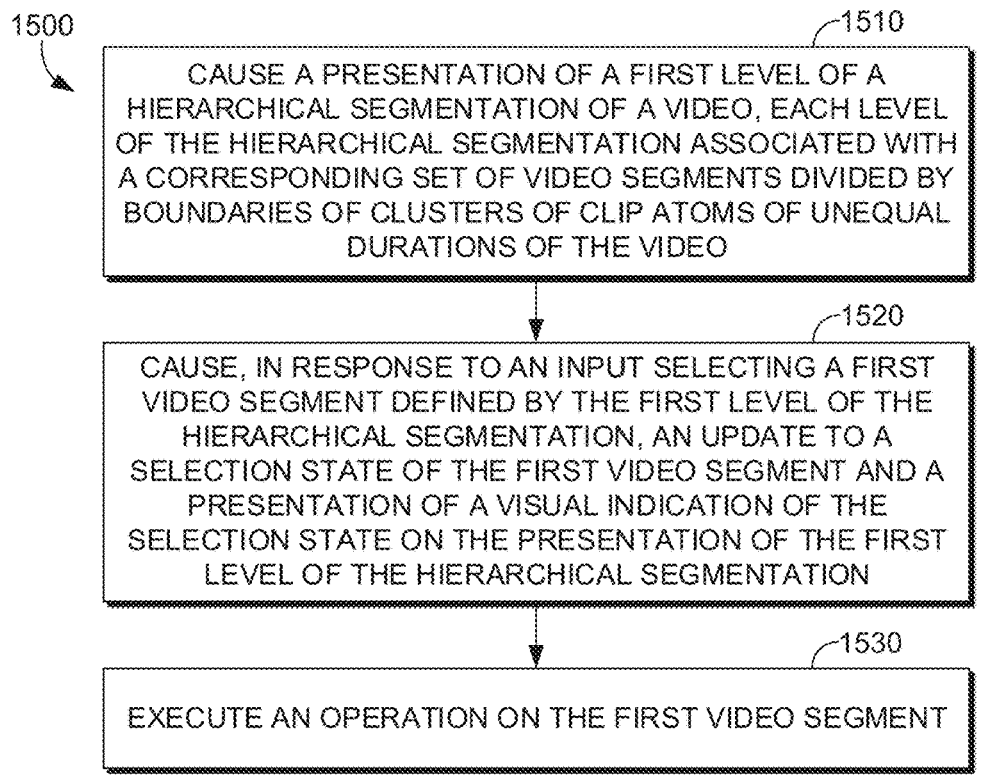
FIG. 15 is a flow diagram showing a method for selecting a video segment defined by a hierarchical segmentation, in accordance with embodiments of the present invention.

Turning now to FIG. 15, FIG. 15 illustrates a method 1500 for selecting a video segment defined by a hierarchical segmentation, in accordance with embodiments of the present invention. Initially at block 1510, a presentation of a first level of a hierarchical segmentation of a video is caused. Each level of the hierarchical segmentation is associated with a corresponding set of video segments divided by boundaries of clusters of clip atoms of unequal durations of the video. At block 1520, in response to an input selecting a first video segment defined by the first level of the hierarchical segmentation, an update to a selection state of the first video segment and a presentation of a visual indication of the selection state on the presentation of the first level of the hierarchical segmentation are caused. At block 1530, an operation is executed on the first video segment.

Figure 16:
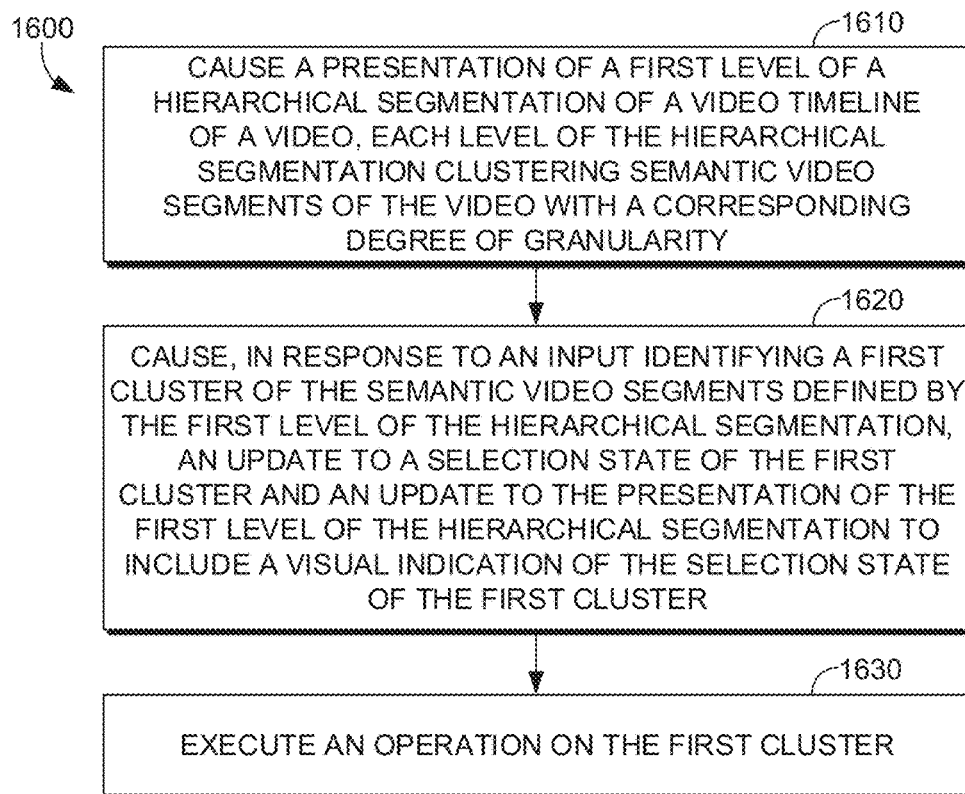
FIG. 16 is a flow diagram showing a method for executing an operation on an identified cluster defined by a hierarchical segmentation, in accordance with embodiments of the present invention.

Turning now to FIG. 16, FIG. 16 illustrates a method 1600 for executing an operation on an identified cluster defined by a hierarchical segmentation, in accordance with embodiments of the present invention. Initially at block 1610, a presentation of a first level of a hierarchical segmentation of a video timeline of a video is caused. Each level of the hierarchical segmentation clusters semantic video segments of the video with a corresponding degree of granularity. At block 1620, in response to an input identifying a first cluster of the semantic video segments defined by the first level of the hierarchical segmentation, an update to a selection state of the first cluster and an update to the presentation of the first level of the hierarchical segmentation to include a visual indication of the selection state of the first cluster are caused. At block 1630, an operation is executed on the first cluster.

Figure 17:
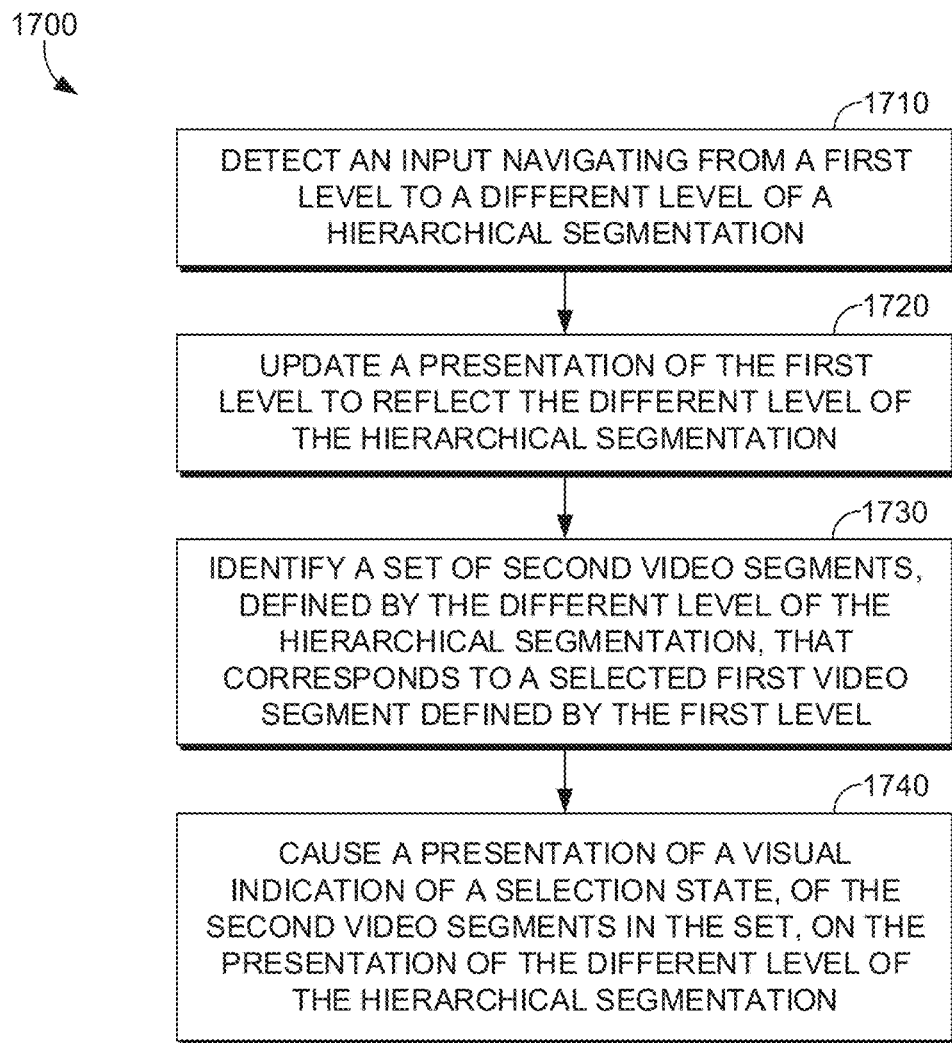
FIG. 17 is a flow diagram showing a method for updating a presentation of a first level of the hierarchical segmentation in response to navigating to a different level, in accordance with embodiments of the present invention.

Turning now to FIG. 17, FIG. 17 illustrates a method 1700 for updating a presentation of a first level of the hierarchical segmentation in response to navigating to a different level, in accordance with embodiments of the present invention. In some embodiments, method 1700 is performed after the steps illustrated in FIG. 15 or FIG. 16. Initially at block 1710, an input navigating from a first level to a different level of a hierarchical segmentation is detected. At block 1720, a presentation of the first level is updated to reflect the different level of the hierarchical segmentation. At block 1730, a set of second video segments, defined by the different level of the hierarchical segmentation, and that corresponds to a selected first video segment defined by the first level is identified. At block 1740, a presentation of a visual indication of a selection state, of the second video segments in the set, on the presentation of the different level of the hierarchical segmentation is caused.

Figure 18:
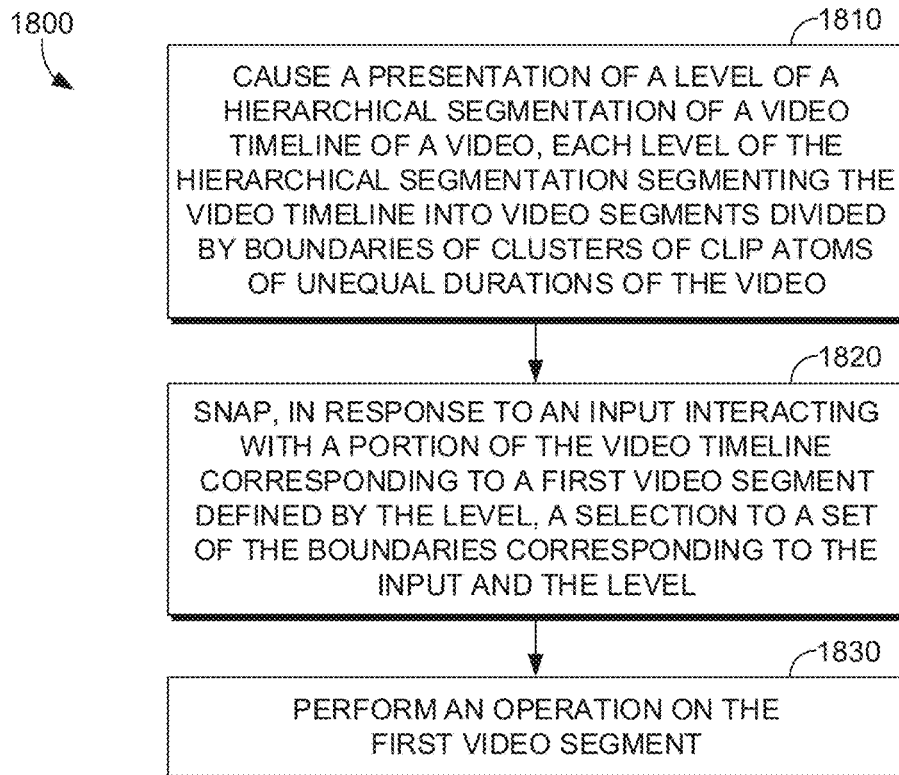
FIG. 18 is a flow diagram showing a method for snapping a selection to boundaries of clusters of clip atoms, in accordance with embodiments of the present invention.

Turning now to FIG. 18, FIG. 18 illustrates a method 1800 for snapping a selection to boundaries of clusters of clip atoms, in accordance with embodiments of the present invention. Initially at block 1810, a presentation of a level of a hierarchical segmentation of a video timeline of a video is caused. Each level of the hierarchical segmentation segments the video timeline into video segments divided by boundaries of clusters of clip atoms of unequal durations of the video. At block 1820, in response to an input interacting with a portion of the video timeline corresponding to a first video segment defined by the level, a selection is snapped to a set of the boundaries corresponding to the input and the level. At block 1830, an operation is performed on the first video segment.

Figure 19:
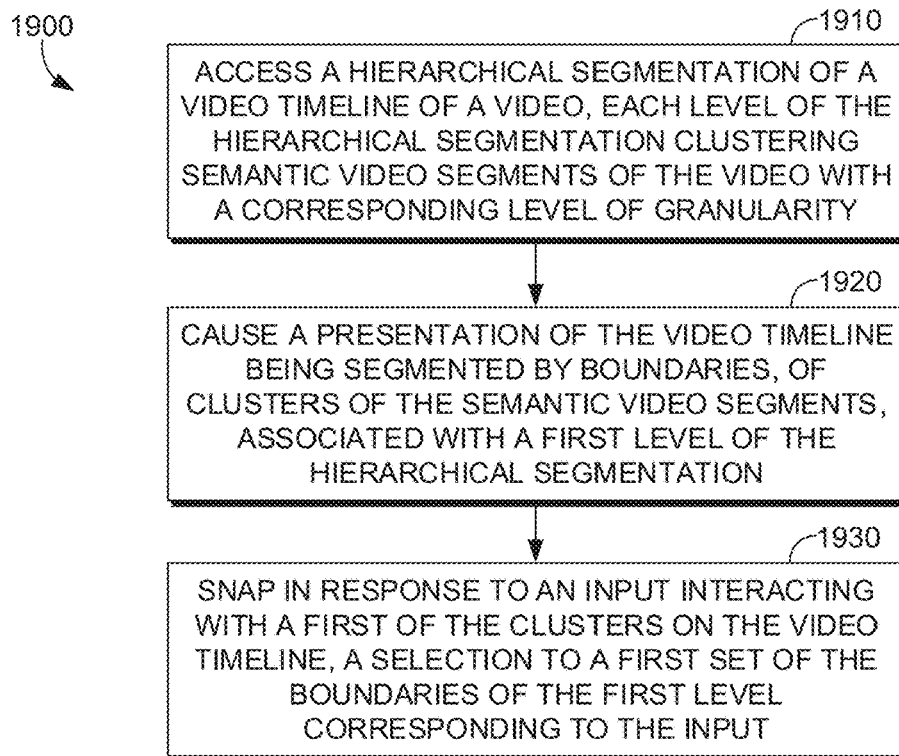
FIG. 19 is a flow diagram showing a method for snapping a selection to boundaries of clusters semantic video segments, in accordance with embodiments of the present invention.

Turning now to FIG. 19, FIG. 19 illustrates a method 1900 for snapping a selection to boundaries of clusters semantic video segments, in accordance with embodiments of the present invention. Initially at block 1910, a hierarchical segmentation of a video timeline of a video is accessed. Each level of the hierarchical segmentation clustering semantic video segments of the video with a corresponding level of granularity. At block 1920, a presentation of the video timeline being segmented by boundaries, of clusters of the semantic video segments, associated with a first level of the hierarchical segmentation is caused. At block 1930, in response to an input interacting with a first of the clusters on the video timeline, a selection is snapped to a first set of the boundaries of the first level corresponding to the input.

Figure 20:
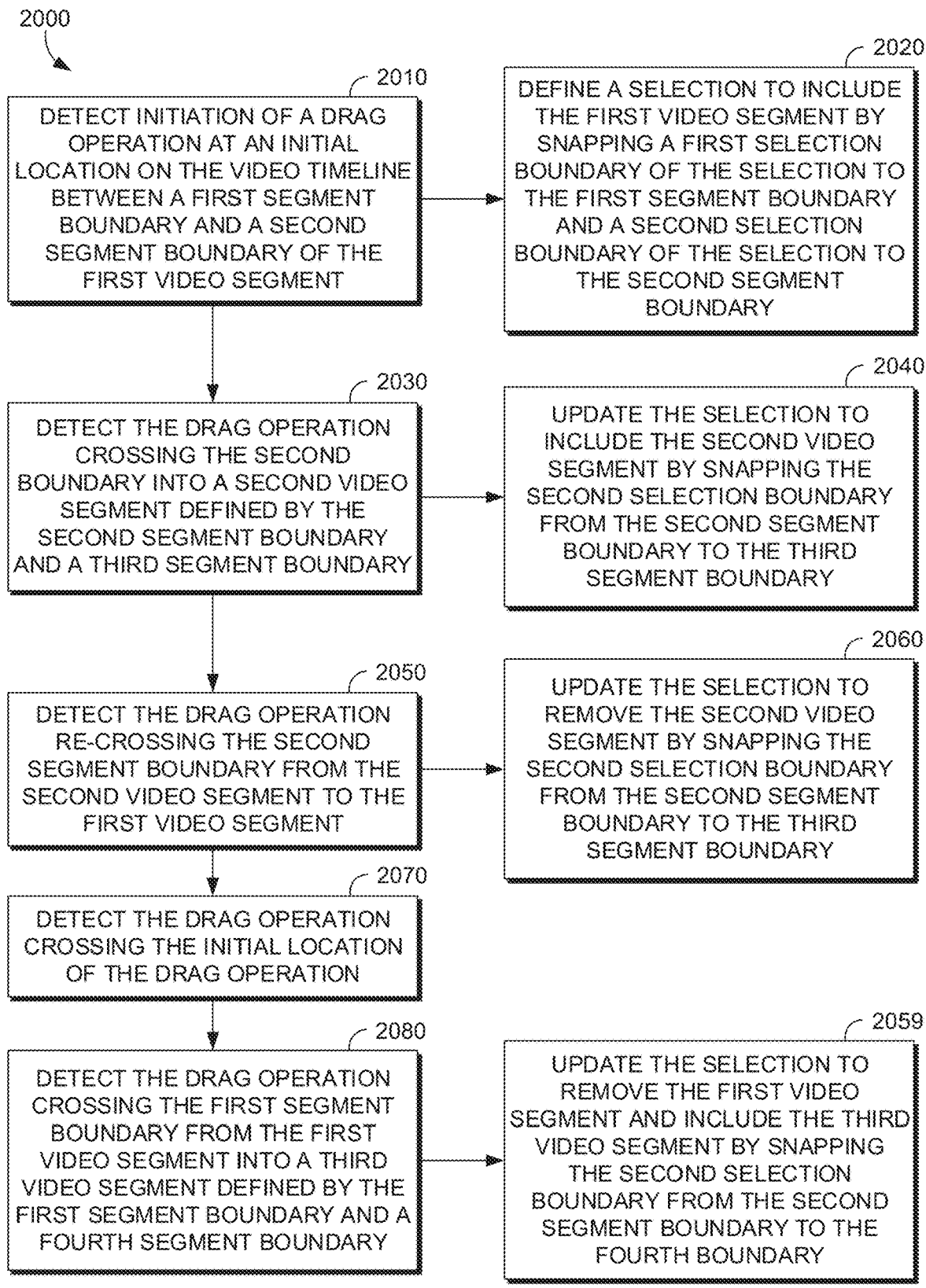
FIG. 20 is a flow diagram showing a method for selecting video segments using a drag operation, in accordance with embodiments of the present invention.

Turning now to FIG. 20, FIG. 20 illustrates a method 2000 for selecting video segments using a drag operation, in accordance with embodiments of the present invention. For example, method 2000 illustrates a possible way of performing at least a portion of block 1820 of FIG. 18 or block 1930 of FIG. 19. Initially at block 2010, initiation of a drag operation is detected at an initial location on the video timeline between a first segment boundary and a second segment boundary of the first video segment. In response, at block 2020, a selection is defined to include the first video segment by snapping a first selection boundary of the selection to the first segment boundary and a second selection boundary of the selection to the second segment boundary. At block 2030, the drag operation is detected crossing the second boundary into a second video segment defined by the second segment boundary and a third segment boundary. In response, at block 2040, the selection is updated to include the second video segment by snapping the second selection boundary from the second segment boundary to the third segment boundary. At block 2050, the drag operation is detected re-crossing the second segment boundary from the second video segment to the first video segment. In response, at block 2060, the selection is updated to remove the second video segment by snapping the second selection boundary from the second segment boundary to the third segment boundary. At block 2070, the drag operation is detected crossing the initial location of the drag operation. At block 2080, the drag operation is detected crossing the first segment boundary from the first video segment into a third video segment defined by the first segment boundary and a fourth segment boundary. In response, at block 2090, the selection is updated to remove the first video segment and include the third video segment by snapping the second selection boundary from the second segment boundary to the fourth boundary.

Figure 21:
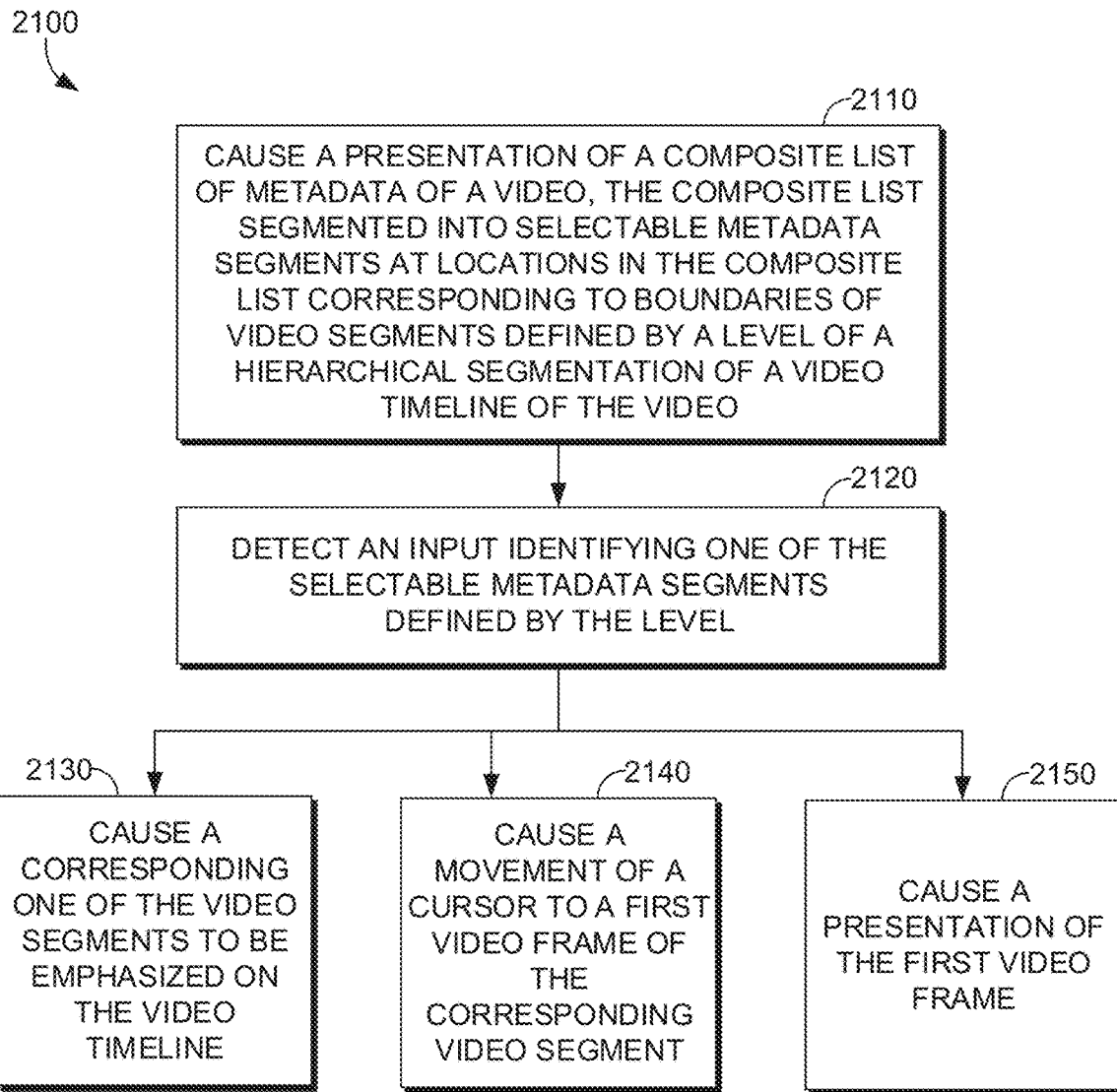
FIG. 21 is a flow diagram showing a method for emphasizing a video segment in response to an input identifying a selectable metadata segment, in accordance with embodiments of the present invention.

Turning now to FIG. 21, FIG. 21 illustrates a method 2100 for emphasizing a video segment in response to an input identifying a selectable metadata segment, in accordance with embodiments of the present invention. Initially at block

2110, a presentation of a composite list of metadata of a video is caused. The composite list is segmented into selectable metadata segments at locations in the composite list corresponding to boundaries of video segments defined by a level of a hierarchical segmentation of a video timeline of the video. At block 2120, an input is detected identifying one of the selectable metadata segments defined by the level. In response, the steps illustrated in blocks 2130-2050 are performed. At block 2130, a corresponding one of the video segments is caused to be emphasized on the video timeline. At block 2140, a movement of a cursor to a first video frame of the corresponding video segment is caused. At block 2150, a presentation of the first video frame is caused.

Figure 22:
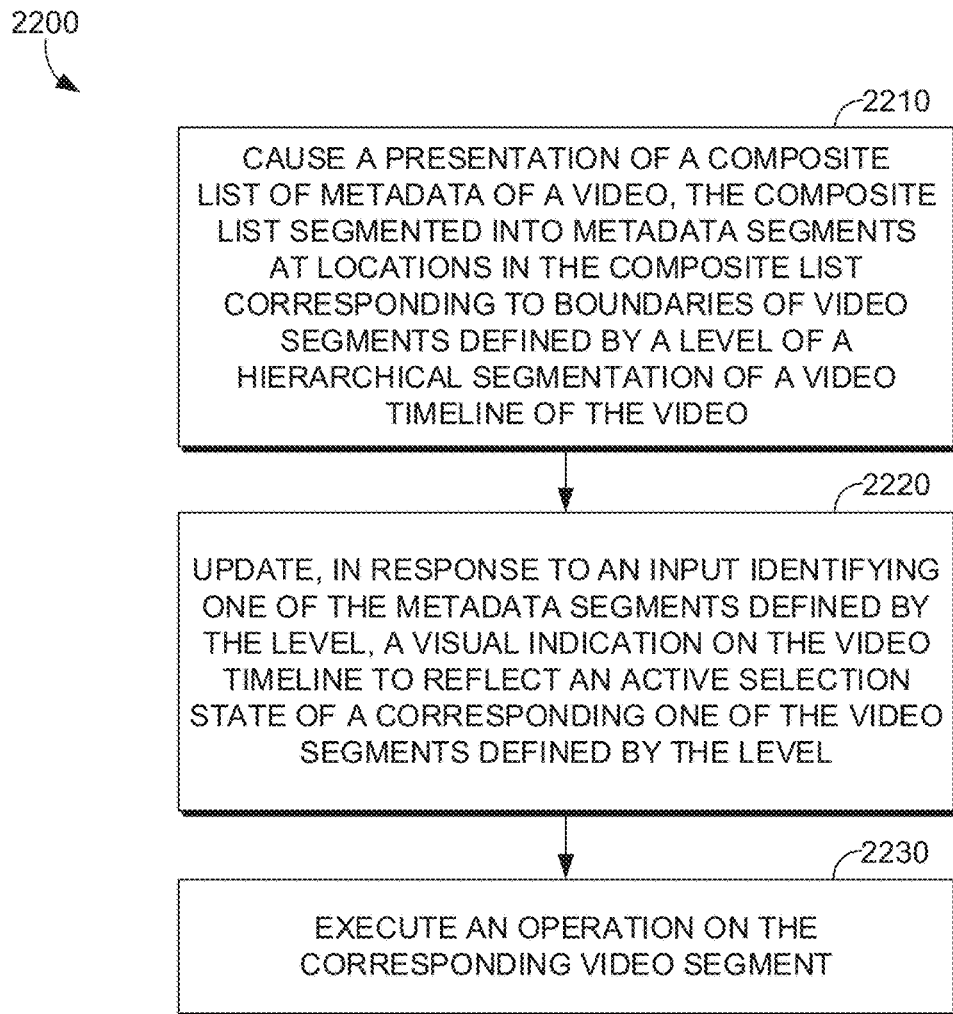
FIG. 22 is a flow diagram showing a method for updating a video timeline in response to an input identifying a metadata segment, in accordance with embodiments of the present invention.

Turning now to FIG. 22, FIG. 22 illustrates a method 2200 for updating a video timeline in response to an input identifying a metadata segment, in accordance with embodiments of the present invention. Initially at block 2210, a presentation of a composite list of metadata of a video is caused. The composite list is segmented into metadata segments at locations in the composite list corresponding to boundaries of video segments defined by a level of a hierarchical segmentation of a video timeline of the video. At block 2220, in response to an input identifying one of the metadata segments defined by the level, a visual indication on the video timeline is updated to reflect an active selection state of a corresponding one of the video segments defined by the level. At block 2230, an operation is executed on the corresponding video segment.

Figure 23:
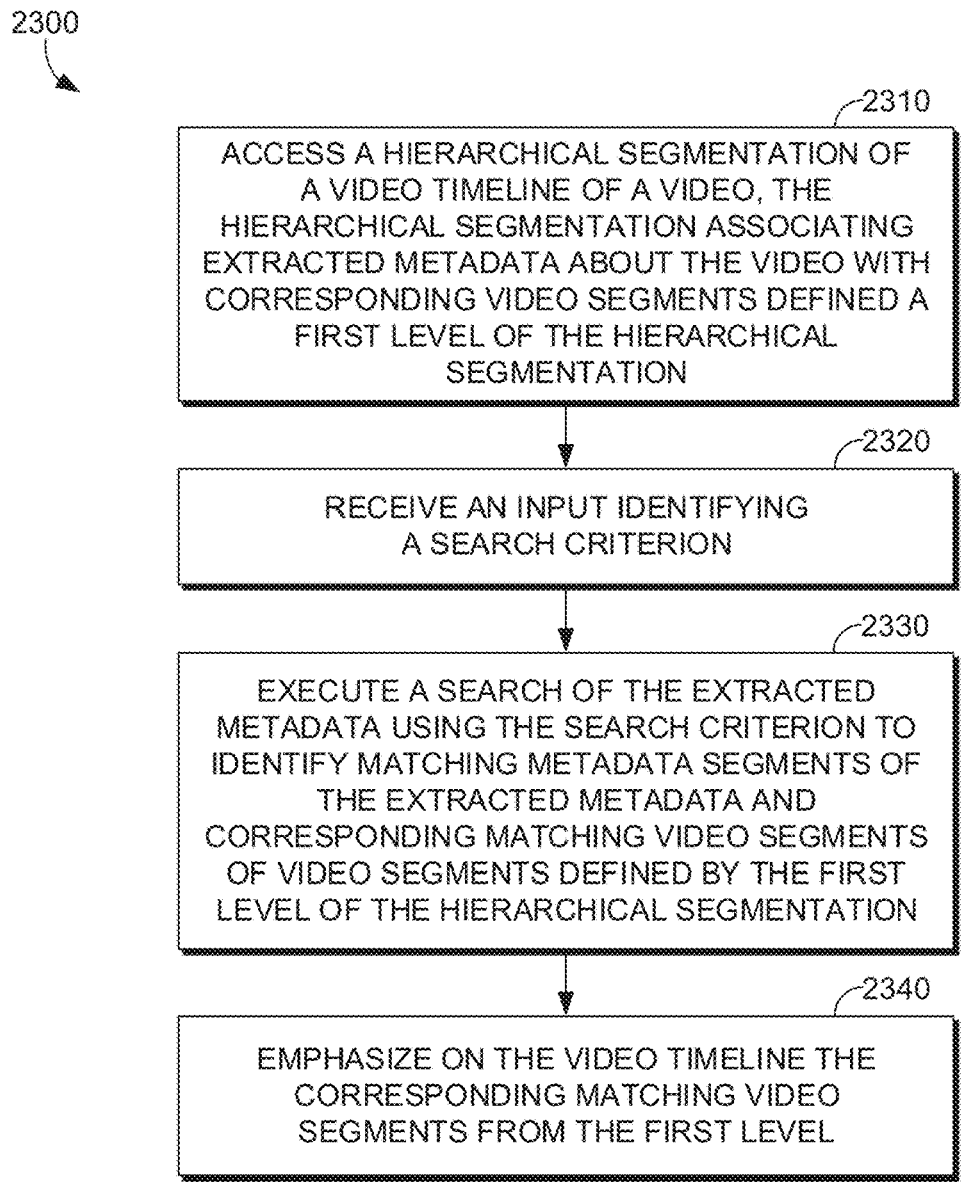
FIG. 23 is a flow diagram showing a method for executing a search of extracted metadata and emphasizing matching video segments on a video timeline, in accordance with embodiments of the present invention.

Turning now to FIG. 23, FIG. 23 illustrates a method 2300 for executing a search of extracted metadata and emphasizing matching video segments on a video timeline, in accordance with embodiments of the present invention. Initially at block 2310, a hierarchical segmentation of a video timeline of a video is accessed. The hierarchical segmentation associates extracted metadata about the video with corresponding video segments defined a first level of the hierarchical segmentation. At block 2320, an input identifying a search criterion is received. At block 2330, a search of the extracted metadata is executed using the search criterion to identify matching metadata segments of the extracted metadata and corresponding matching video segments of video segments defined by the first level of the hierarchical segmentation. At block 2340, the corresponding matching video segments from the first level are emphasizing on the video timeline.

Figure 24:
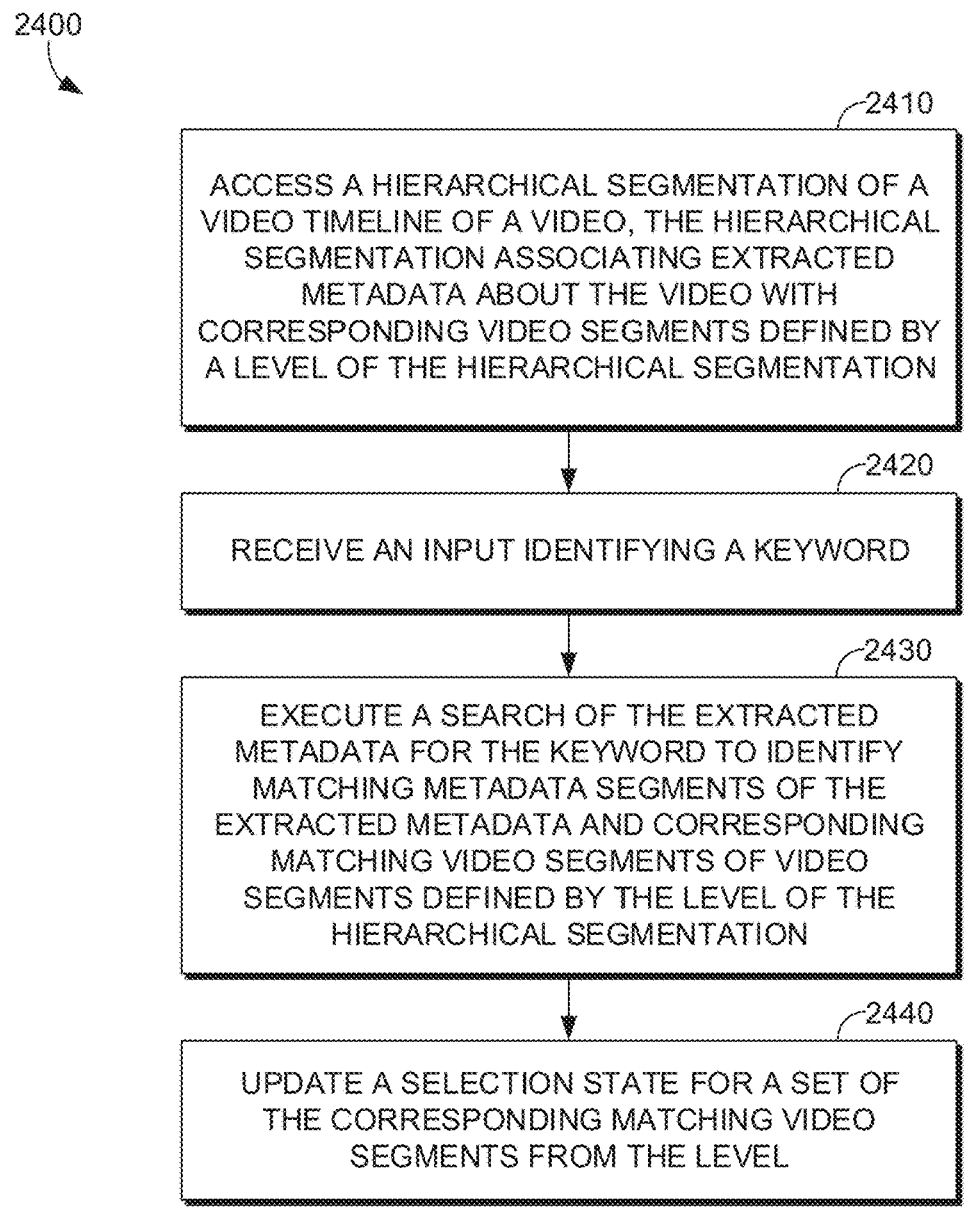
FIG. 24 is a flow diagram showing a method for executing a search of the extracted metadata and updating a selection state for matching video segments, in accordance with embodiments of the present invention.

Turning now to FIG. 24, FIG. 24 illustrates a method 2400 for executing a search of the extracted metadata and updating a selection state for matching video segments, in accordance with embodiments of the present invention. Initially at block 2410, a hierarchical segmentation of a video timeline of a video is accessed. The hierarchical segmentation associates extracted metadata about the video with corresponding video segments defined by a level of the hierarchical segmentation. At block 2420, an input identifying a keyword is received. At block 2430, a search of the extracted metadata is executed for the keyword to identify matching metadata segments of the extracted metadata and corresponding matching video segments of video segments defined by the level of the hierarchical segmentation. At block 2440, a selection state for a set of the corresponding matching video segments from the level is updated.

Figure 25:
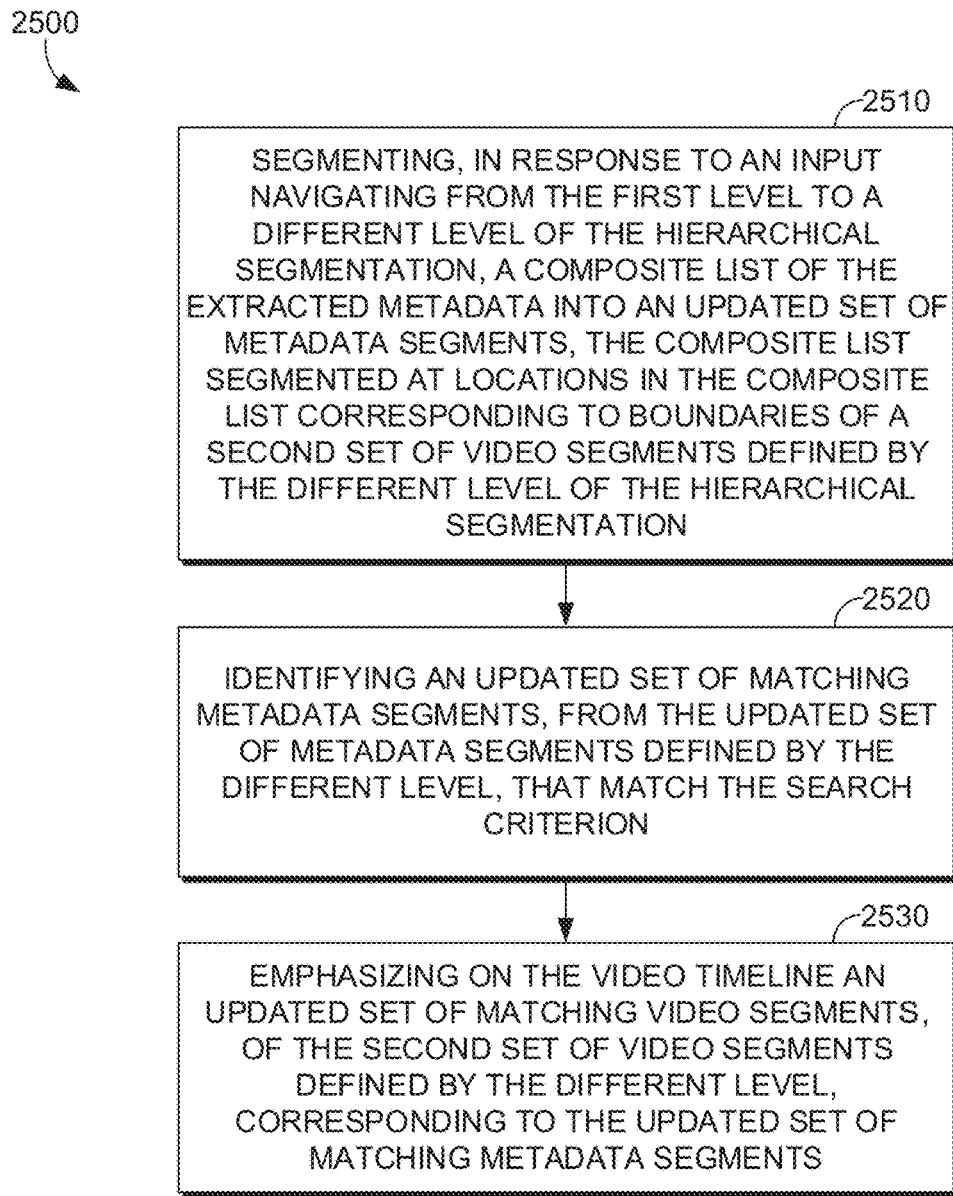
FIG. 25 is a flow diagram showing a method for updating matching and video metadata segments in response to an input navigating to a different level of a hierarchical segmentation, in accordance with embodiments of the present invention.

Turning now to FIG. 25, FIG. 25 illustrates a method 2500 for updating matching and video metadata segments in response to an input navigating to a different level of a hierarchical segmentation, in accordance with embodiments of the present invention. In some embodiments, method 2500 is performed after the steps illustrated in FIG. 23 or FIG. 24. Initially at block 2510, in response to an input navigating from the first level to a different level of the hierarchical segmentation, a composite list of the extracted metadata is segmented into an updated set of metadata segments. The composite list segmented at locations in the composite list corresponding to boundaries of a second set of video segments defined by the different level of the hierarchical segmentation. At block 2520, an updated set of matching metadata segments that match the search criterion is identified from the updated set of metadata segments defined by the different level. At block 2530, an updated set of matching video segments of the second set of video segments defined by the different level, and corresponding to the updated set of matching metadata segments, are emphasized on the video timeline.

Example Operating Environment

Figure 26:
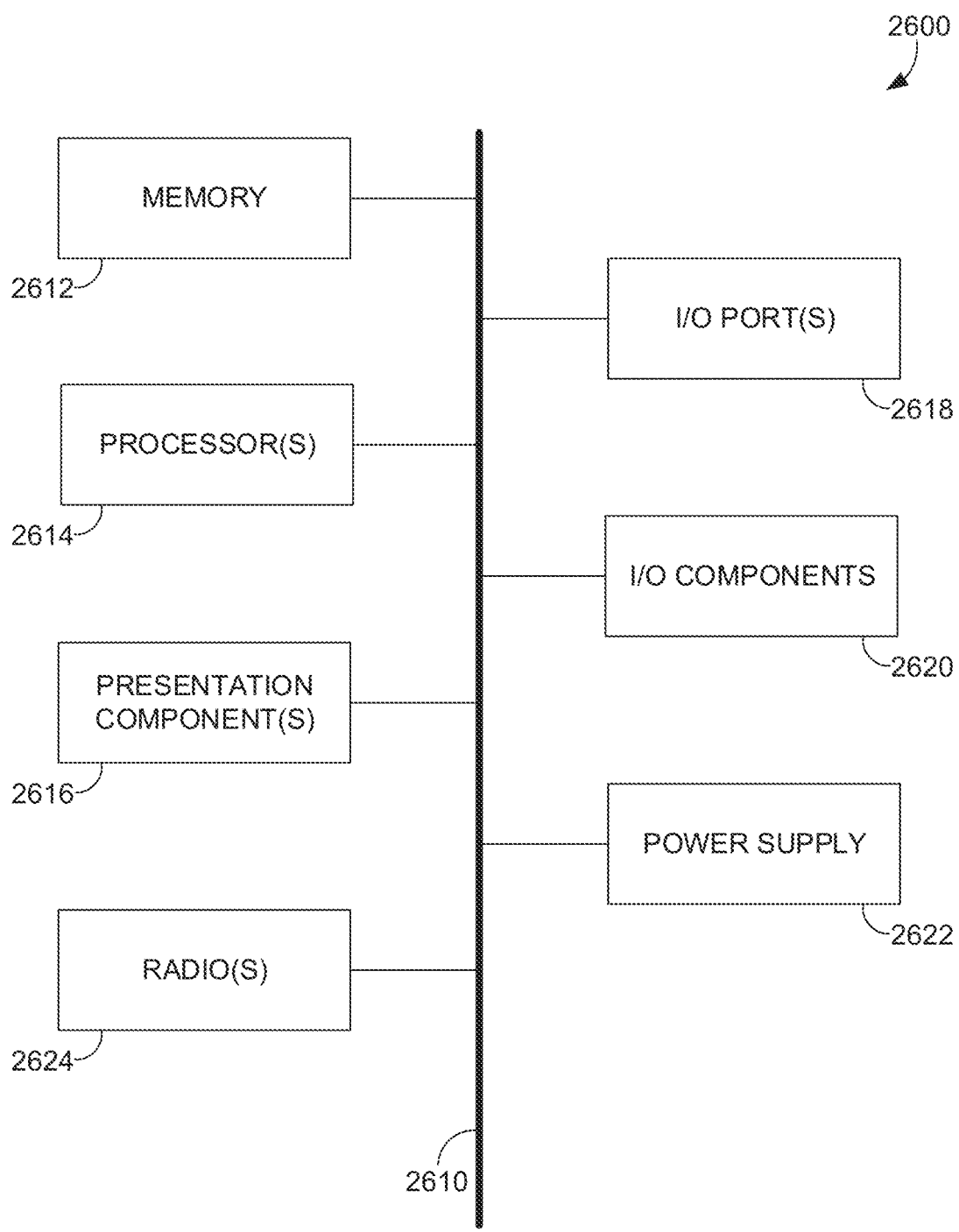
FIG. 26 is a block diagram of an example computing environment suitable for use in implementing embodiments of the present invention.

Having described an overview of embodiments of the present invention, an example operating environment in which embodiments of the present invention may be implemented is described below in order to provide a general context for various aspects of the present invention. Referring now to FIG. 26 in particular, an example operating environment for implementing embodiments of the present invention is shown and designated generally as computing device 2600. Computing device 2600 is but one example of a suitable computing environment and is not intended to suggest any limitation as to the scope of use or functionality of the invention. Neither should computing device 2600 be interpreted as having any dependency or requirement relating to any one or combination of components illustrated.

The invention may be described in the general context of computer code or machine-useable instructions, including computer-executable instructions such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 26, computing device 2600 includes bus 2610 that directly or indirectly couples the following devices: memory 2612, one or more processors 2614, one or more presentation components 2616, input/output (I/O) ports 2618, input/output components 2620, and illustrative power supply 2622. Bus 2610 represents what may be one or more busses (such as an address bus, data bus, or combination thereof). Although the various blocks of FIG. 26 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 26 is merely illustrative of an example computing device that can be used in connection with one or more embodiments of the present invention. Distinction is not made between such categories as "workstation," "server," "laptop," "hand-held device," etc., as all are contemplated within the scope of FIG. 26 and reference to "computing device."

Computing device 2600 typically includes a variety of computer-readable media. Computer-readable media can be any available media that can be accessed by computing device 2600 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 2600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 2612 includes computer-storage media in the form of volatile and/or nonvolatile memory. The memory may be removable, non-removable, or a combination thereof. Example hardware devices include solid-state memory, hard drives, optical-disc drives, etc. Computing device 2600 includes one or more processors that read data from various entities such as memory 2612 or I/O components 2620. Presentation component(s) 2616 present data indications to a user or other device. Example presentation components include a display device, speaker, printing component, vibrating component, etc.

I/O ports 2618 allow computing device 2600 to be logically coupled to other devices including I/O components 2620, some of which may be built in. Illustrative components include a microphone, joystick, game pad, satellite dish, scanner, printer, wireless device, etc. The I/O components 2620 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of computing device 2600. Computing device 2600 may be equipped with depth cameras, such as stereoscopic camera systems, infrared camera systems, RGB camera systems, touchscreen technology, and combinations of these, for gesture detection and recognition. Additionally, the computing device 2600 may be equipped with accelerometers or gyroscopes that enable detection of motion. The output of the accelerometers or gyroscopes may be provided to the display of computing device 2600 to render immersive augmented reality or virtual reality.

Embodiments described herein support video editing or playback. The components described herein refer to integrated components of a video editing system. The integrated components refer to the hardware architecture and software framework that support functionality using the video editing system. The hardware architecture refers to physical components and interrelationships thereof and the software framework refers to software providing functionality that can be implemented with hardware embodied on a device.

The end-to-end software-based video editing system can operate within the video editing system components to operate computer hardware to provide video editing system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the video editing system components can manage resources and provide services for the video editing system functionality. Any other variations and combinations thereof are contemplated with embodiments of the present invention.

Although some implementations are described with respect to neural networks, generally embodiments may be implemented using any type of machine learning model(s), such as those using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Having identified various components in the present disclosure, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations comprising:
    causing a presentation of a level of a hierarchical segmentation of a video, wherein within each child level of the hierarchical segmentation, the child level is associated with a corresponding set of video segments divided by boundaries of clusters of clip atoms of unequal durations of the video;
    causing, in response to an input selecting a first video segment defined by the level of the hierarchical segmentation, an update to a selection state of the first video segment and a presentation of a visual indication of the selection state on the presentation of the level of the hierarchical segmentation; and
    executing an operation on the first video segment.

2. The one or more computer storage media of claim 1, the operations further comprising detecting the input from an interaction with a portion of a video timeline of the video corresponding to the first video segment.

3. The one or more computer storage media of claim 1, wherein the input selecting the first video segment comprises a search criterion that matches first metadata associated with the first video segment, the operations further comprising identifying the first video segment from the input by:
    searching metadata associated with the video for matches with the search criterion to identify the first metadata, and
    determining that the first video segment defined by the level corresponds to the first metadata.

4. The one or more computer storage media of claim 1, the operations further comprising detecting the input from an interaction with a portion of a composite list of metadata of the video corresponding to the first video segment.

5. The one or more computer storage media of claim 1, the operations further comprising, in response to an input clicking or tapping on the first video segment on a video timeline segmented in accordance with the level of the hierarchical segmentation, toggling between adding the first video segment to a selection and removing the first video segment from the selection.

6. The one or more computer storage media of claim 1, the operations further comprising, in response to an input navigating to a different level of the hierarchical segmentation:
    updating the presentation of the level to reflect the different level of the hierarchical segmentation;
    identifying a set of second video segments, defined by the different level of the hierarchical segmentation, that corresponds to the first video segment defined by the level; and
    causing a presentation of a visual indication of a second selection state, of the second video segments in the set, on the presentation of the different level of the hierarchical segmentation.

7. The one or more computer storage media of claim 1, the operations further comprising detecting a selection of a set of disjoint video segments defined by the level of the hierarchical segmentation, the set including the first video segment and excluding unselected video segments defined by the level of the hierarchical segmentation;
    wherein executing the operation on the first video segment comprises, in response to an input interacting with an interaction element, playing back the disjoint video segments without playing back the unselected video segments defined by the level of the hierarchical segmentation, trimming the unselected video segments defined by the level of the hierarchical segmentation, or exporting the disjoint video segments without exporting the unselected video segments defined by the level of the hierarchical segmentation.

8. The one or more computer storage media of claim 1, wherein each level of the hierarchical segmentation defines a set of non-overlapping clusters of the clip atoms covering all of a video timeline of the video.

9. A computerized method comprising:
    causing a presentation of a first level of a hierarchical segmentation of a video timeline of a video, each level of the hierarchical segmentation clustering semantic video segments of the video with a corresponding degree of granularity;
    detecting, from user interaction with the video timeline, a search bar, or a composite list of metadata of the video, one or more inputs identifying a selection of a set of disjoint clusters of the semantic video segments defined by the first level of the hierarchical segmentation; and
    executing an operation on the set of disjoint clusters.

10. The computerized method of claim 9, further comprising detecting the one or more inputs from the user interaction with portions of the video timeline of the video corresponding to the disjoint clusters of the semantic video segments.

11. The computerized method of claim 9, wherein the one or more inputs identifying the set of the disjoint clusters comprise a search criterion that is entered into the search bar and that matches first metadata associated with the disjoint clusters, the computerized method further comprising identifying the disjoint clusters from the one or more inputs by:
    searching metadata associated with the video for matches with the search criterion to identify the first metadata, and
    determining that the disjoint clusters of the semantic video segments defined by the first level correspond to the first metadata.

12. The computerized method of claim 9, further comprising detecting the one or more inputs from the user interaction with portions of the composite list of metadata of the video corresponding to the disjoint clusters of the semantic video segments.

13. The computerized method of claim 9, further comprising, in response to an input navigating to a different level of the hierarchical segmentation:
updating the presentation of the first level to the different level of the hierarchical segmentation;
identifying a set of second clusters of semantic video segments, defined by the different level of the hierarchical segmentation, that corresponds to the disjoint clusters defined by the first level; and
causing a presentation of a visual indication of a selection state, of the second clusters in the set, on the presentation of the different level of the hierarchical segmentation.

14. The computerized method of claim 9, wherein each level of the hierarchical segmentation defines a set of non-overlapping clusters of the semantic video segments covering all of the video timeline of the video.

15. A computer system comprising:
one or more hardware processors and memory configured to provide computer program instructions to the one or more hardware processors;
a video interaction engine configured to use the one or more hardware processors to perform operations comprising:
causing a presentation of a video timeline segmented by boundaries of selectable hierarchical clusters of video segments of a video;
updating, in response to an input identifying a selected hierarchical cluster of the selectable hierarchical clusters, (i) a selection to toggle between adding the selected hierarchical cluster to the selection and removing the selected hierarchical cluster from the selection and (ii) the presentation of the video timeline with a visual indication of a selection state of the selected hierarchical cluster; and
executing an operation on the selected hierarchical cluster.

16. The computer system of claim 15, the operations further comprising detecting the input from an interaction with a portion of the video timeline corresponding to the selected hierarchical cluster.

17. The computer system of claim 15, wherein the input identifying the selected hierarchical cluster comprises a search criterion that matches first metadata associated with the selected hierarchical cluster, the operations further comprising identifying the selected hierarchical cluster from the input by:
searching metadata associated with the video for matches with the search criterion to identify the first metadata, and
determining that the selected hierarchical cluster corresponds to the first metadata.

18. The computer system of claim 15, the operations further comprising detecting the input from an interaction with a portion of a composite list of metadata of the video corresponding to the selected hierarchical cluster.

19. The computer system of claim 15, the operations further comprising, in response to an input navigating from a first level to a different level of the selectable hierarchical clusters:
updating the presentation of the video timeline from representing the first level of the selectable hierarchical clusters to representing the different level of the selectable hierarchical clusters;
identifying a set of second hierarchical clusters, defined by the different level, that corresponds to the selected hierarchical cluster defined by the first level; and
causing a presentation of a visual indication of a second selection state, of the second hierarchical clusters in the set, on the presentation of the video timeline.

20. The computer system of claim 15, wherein each level of the selectable hierarchical clusters includes a set of non-overlapping clusters of the video segments covering all of the video timeline.

* * * * *